(12) United States Patent
Crossley et al.

(10) Patent No.: US 11,775,492 B2
(45) Date of Patent: *Oct. 3, 2023

(54) QUERY-AS-A-SERVICE SYSTEM THAT PROVIDES QUERY-RESULT DATA TO REMOTE CLIENTS

(71) Applicant: Oracle International Corporation, Redwood Shores, CA (US)

(72) Inventors: Peter Crossley, Portland, OR (US); Sean McNamara, Redwood Shores, CA (US)

(73) Assignee: Oracle International Corporation, Redwood Shores (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/401,222

(22) Filed: Aug. 12, 2021

(65) Prior Publication Data

US 2022/0107928 A1 Apr. 7, 2022

Related U.S. Application Data

(63) Continuation of application No. 15/404,152, filed on Jan. 11, 2017, now Pat. No. 11,138,170.

(Continued)

(51) Int. Cl.
*G06F 16/22* (2019.01)
*G06F 16/248* (2019.01)
(Continued)

(52) U.S. Cl.
CPC ............ *G06F 16/221* (2019.01); *G06F 16/22* (2019.01); *G06F 16/248* (2019.01);
(Continued)

(58) Field of Classification Search
CPC .. G06F 16/221; G06F 16/24568; G06F 16/22; G06F 16/24561; G06F 16/24554;
(Continued)

(56) References Cited

U.S. PATENT DOCUMENTS 11,138,170 B2 10/2021 Crossley et al.
2003/0204741 A1 10/2003 Schoen et al.
(Continued)

FOREIGN PATENT DOCUMENTS

CN 101188572 5/2008
CN 101373474 2/2009
(Continued)

OTHER PUBLICATIONS

Amazon Webservices, "delete-stream", snapshotted Oct. 7, 2014, https://docs.aws.amazon.com/cli/latest/reference/kinesis/delete-stream.html (Year: 2014).*

(Continued)

*Primary Examiner* — Allen S Lin
(74) *Attorney, Agent, or Firm* — Mughal Gaudry & Franklin PC

(57) ABSTRACT

The current document is directed to a query-as-a-service system ("QAAS system") that collects enormous volumes of data from network-connected entities, referred to as "Things" in the phrase "Internet of Things," persistently stores the collected data and provides a distributed-query-execution engine that allows remote clients to continuously execute queries against the collected data. In a described implementation, both the raw data and query results are persistently stored in the QAAS system, with the raw data stored for significantly longer periods of time. Query results generated by the query-processing engine are securely transmitted to QAAS remote clients for distribution to file systems, storage.

20 Claims, 62 Drawing Sheets

Related U.S. Application Data

(60) Provisional application No. 62/277,417, filed on Jan. 11, 2016.

(51) Int. Cl.

| | | |
|---|---|---|
| *G06F 16/2455* | (2019.01) | |
| *H04L 9/40* | (2022.01) | |
| *G06F 16/33* | (2019.01) | |
| *H04L 65/612* | (2022.01) | |
| *H04L 67/1097* | (2022.01) | |
| *H04L 67/02* | (2022.01) | |
| *H04L 67/10* | (2022.01) | |

(52) U.S. Cl.
CPC .. *G06F 16/24554* (2019.01); *G06F 16/24561* (2019.01); *G06F 16/24568* (2019.01); *G06F 16/3349* (2019.01); *H04L 63/0442* (2013.01); *H04L 65/612* (2022.05); *H04L 67/02* (2013.01); *H04L 67/10* (2013.01); *H04L 67/1097* (2013.01)

(58) Field of Classification Search
CPC ... G06F 16/248; G06F 16/3349; H04L 67/02; H04L 67/04; H04L 67/06; H04L 67/08; H04L 67/10; H04L 67/1001; H04L 67/1004; H04L 67/1006; H04L 67/1008; H04L 67/101; H04L 67/1012; H04L 67/1014; H04L 67/1017; H04L 67/1019; H04L 67/1021; H04L 67/1023; H04L 67/1025; H04L 67/1027; H04L 67/1029; H04L 67/1031; H04L 67/1034; H04L 67/1036; H04L 67/1038; H04L 67/104; H04L 67/1042; H04L 67/1044; H04L 67/1046; H04L 67/1048; H04L 67/1051; H04L 67/1053; H04L 67/1055; H04L 67/1057; H04L 67/1059; H04L 67/1061; H04L 67/1063; H04L 67/1065; H04L 67/1068; H04L 67/107; H04L 67/1072; H04L 67/1074; H04L 67/1076; H04L 67/1078; H04L 67/108; H04L 67/1082; H04L 67/1085; H04L 67/1087; H04L 67/1089; H04L 67/1091; H04L 67/1093; H04L 67/1095; H04L 67/1097; H04L 67/12; H04L 67/125; H04L 67/131; H04L 67/133; H04L 67/1396; H04L 67/2866; H04L 67/2869; H04L 67/2871; H04L 67/2876; H04L 67/288; H04L 67/2885; H04L 67/289; H04L 67/2895; H04L 67/30; H04L 67/303; H04L 67/306
See application file for complete search history.

(56) References Cited

U.S. PATENT DOCUMENTS

| | | |
|---|---|---|
| 2004/0034875 A1 | 2/2004 | Bulkowski et al. |
| 2004/0060425 A1* | 4/2004 | Puryear ............... G10H 7/002 84/626 |
| 2008/0298219 A1 | 12/2008 | Yamagata et al. |
| 2009/0043734 A1 | 2/2009 | Barsness et al. |
| 2009/0172014 A1* | 7/2009 | Huetter ............... G06F 16/2477 |
| 2009/0292775 A1 | 11/2009 | Flenniken |
| 2011/0087685 A1 | 4/2011 | Lin et al. |
| 2012/0124096 A1 | 5/2012 | Krishnamurthy et al. |
| 2013/0018918 A1 | 1/2013 | Peek |
| 2014/0122791 A1 | 5/2014 | Fingerhut et al. |
| 2015/0074388 A1 | 3/2015 | Josa |
| 2015/0078393 A1 | 3/2015 | Melick et al. |
| 2015/0095325 A1 | 4/2015 | Kim et al. |
| 2015/0293955 A1 | 10/2015 | Dickey |
| 2016/0004751 A1 | 1/2016 | Lafuente Alvarez et al. |
| 2016/0179894 A1 | 6/2016 | Gupta et al. |
| 2016/0205106 A1* | 7/2016 | Yacoub ............... H04W 12/041 726/28 |
| 2016/0378751 A1 | 12/2016 | Kamath et al. |
| 2017/0193041 A1 | 7/2017 | Fuchs |
| 2017/0220612 A1 | 8/2017 | Crossley |
| 2018/0293906 A1* | 10/2018 | Chen ............... H04N 21/47217 |

FOREIGN PATENT DOCUMENTS

| | | |
|---|---|---|
| CN | 101576921 | 11/2009 |
| CN | 101675433 | 3/2010 |
| CN | 102117302 | 7/2011 |
| CN | 103595800 | 2/2014 |
| WO | 2006098395 | 9/2006 |

OTHER PUBLICATIONS

Shende et al., *Ranking Retrieved Data Through Advance Search Mechanism Over Distributed Cloud: A Review*, 2015 International Conference on Pervasive Corrputing (ICPC), Apr. 16, 2015, pp. 1-4.
Wang et al., *Relational Query Techniques for Distributed Data Streem: a Survey*, Journal of Corrputer, vol. 39, No. 1, Jan. 2016, 17 pages. (1 page English Abstract, 16 pages of Original Document)
Chinese Application No. 201780006203.3, Office Action dated Jul. 22, 2021, 18 pages (10 pages of Original Document and 8 pages of English Translation).
European Application No. 177388832, Extended European Search Report dated Aug. 7, 2019, 8 pages.
European Application No. 177388832, Office Action dated Jan. 29, 2021, 7 pages.
International Application No. PCT/US2017/013067, International Preliminary Report on Patentability dated Jul. 26, 2018, 6 pages.
International Application No. PCT/US2017/013067, International Search Report and Written Opinion dated Mar. 31, 2017, 7 pages.
U.S. Appl. No. 15/404,152, Final Office Action dated May 16, 2019, 22 pages.
U.S. Appl. No. 15/404,152, Final Office Action dated May 4, 2020, 23 pages.
U.S. Appl. No. 15/404,152, Non-Final Office Action dated Jan. 2, 2020, 23 pages.
U.S. Appl. No. 15/404,152, Non-Final Office Action dated Jan. 11, 2019, 31 pages.
U.S. Appl. No. 15/404,152, Notice of Allow ability dated Apr. 21, 2021, 2 pages.
U.S. Appl. No. 15/404,152, Notice of Allow ance dated Apr. 7, 2021, 16 pages.
Chinese Application No. 201780006203.3, Notice of Decision to Grant dated Jan. 13, 2022, 2 pages.
Chinese Application No. 201780006203.3, Office Action dated Oct. 26, 2021, 8 pages (4 pages of Original Document and 4 pages of English Translation).

* cited by examiner

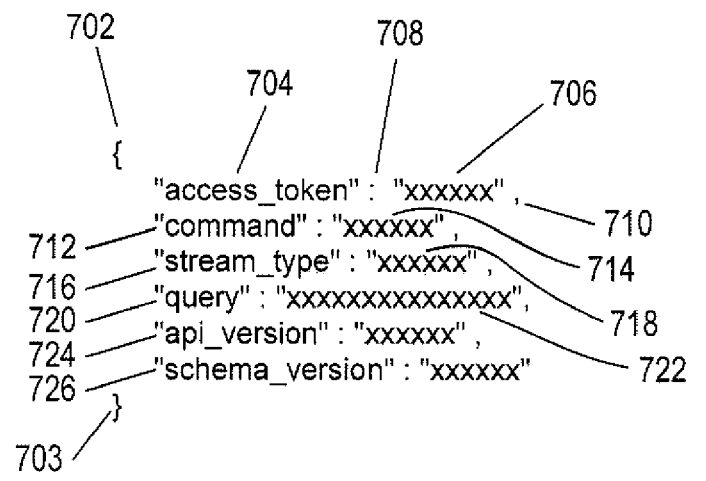
connection request
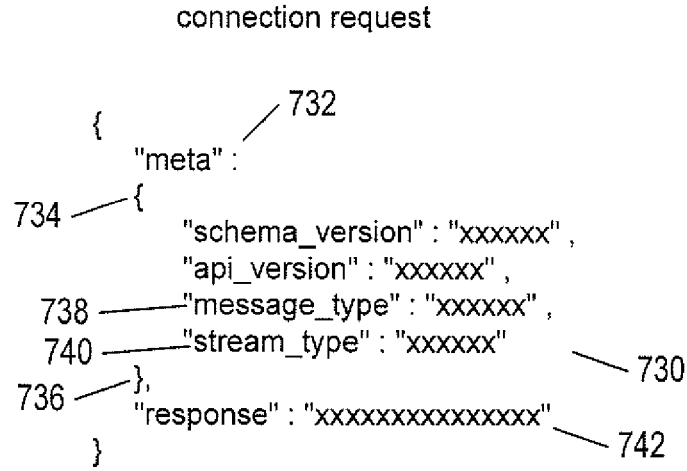
connection response
FIG. 7

```
"meta" :                              ╱ 840
{
    "schema_version" : "2.0",
    "api_version" : "2.0",
    "message_type" : "event",
    "stream_type" : "content"
},
"data" :
{
    "k1" : "xxxxxx",        ╱ 842
    "k2" : "xxxxxx",
    "wt" : "xxxxxx",
    {
        "k3" : [ "xxxxxx" ],
        "k4" : "xxxxxx",
        "k5" : [ "xxxxxx", "xxxxxx", "xxxxxx" ],
    }
},
"ext" :
{                                     ╱ 844
    "geo" :
    {
              "k20" : "xxxxxx",
    846 ╱     "k21" : "xxxxxx",
    },           ⋮
    "device" :
    {
              "k30" : " xxxxxx",
    848 ╱     "k31" : " xxxxxx",
    },           ⋮
    "browser" :
    {
              "k40" : "xxxxxx",
    850 ╱     "k41" : "xxxxxx",
    }
}           ⋮
}
```

FIG. 8C

```
{
  "meta" :                                      ← 860
  {
     "schema_version" : "2.0",
     "api_version" : "2.0",
     "message_type" : "xxxxxx",
     "stream_type" : "xxxxxx"
  },
  "session_id" : "1353515717173",           ⎫
  "visitor_id" : "216.64.169.240-4057458896.30216649",  ⎬ 862
  "session_closed" : false,                  ⎪
  "session_summary" :                         ⎭
  {
     "events" :
864 ─ {
        "k1" : "xxxxxx",
        "k2" : "xxxxxx"
     },
     "k10" :
     {
        "k11" : "xxxxxx",
        "k12" : "xxxxxx"
     },
     "k20"
     {
        "k21" : "xxxxxx"
     }                               ← 866
  },
  "events" : [
     {
```

FIG. 8D-1

```
"k30" : "xxxxxx",
        "k31" : ["xxxxxx", "xxxxxx", "xxxxxx"],
        "data" :
        {
            "k32" : ["xxxxxx", "xxxxxx", "xxxxxx"],
            "wt" :
            {
                "k33" : ["xxxxxx", "xxxxxx", "xxxxxx"],
                "k34" : ["xxxxxx", "xxxxxx", "xxxxxx"],
            }
        },
        "ext" :
        {
            "geo"
            {
                "k35" : ["xxxxxx", "xxxxxx", "xxxxxx"],
                "k36" : ["xxxxxx", "xxxxxx", "xxxxxx"]
            },
            "source" :
            {
                "k38" : ["xxxxxx", "xxxxxx", "xxxxxx"],
                "k39" : ["xxxxxx", "xxxxxx", "xxxxxx"]
            },
            "device":
            {
                "k41" : "xxxxxx", "xxxxxx", "xxxxxx"],
                "k42" : ["xxxxxx", "xxxxxx", "xxxxxx"]
            },
            "browser":
            {
                "k44" : ["xxxxxx", "xxxxxx", "xxxxxx"],
                "k45" : ["xxxxxx", "xxxxxx", "xxxxxx"]
            }
        }
    },
    {
```

FIG. 8D-2

```
"k50" : "xxxxxx",
    "k51" : ["xxxxxx", "xxxxxx", "xxxxxx"],
    "data" :
    {
        "k52" : ["xxxxxx", "xxxxxx", "xxxxxx"],
        "wt" :
        {
            "k53" : ["xxxxxx", "xxxxxx", "xxxxxx"],
            "k54" : ["xxxxxx", "xxxxxx", "xxxxxx"]
        }
    },
    "ext" :
    {
        "geo"
        {
            "k55" : ["xxxxxx", "xxxxxx", "xxxxxx"],
            "k56" : ["xxxxxx", "xxxxxx", "xxxxxx"]
        },
        "source" :
        {
            "k58" : ["xxxxxx", "xxxxxx", "xxxxxx"],
            "k59" : ["xxxxxx", "xxxxxx", "xxxxxx"]
        },
        "device":
        {
            "k61" : "xxxxxx", "xxxxxx", "xxxxxx"],
            "k62" : ["xxxxxx", "xxxxxx", "xxxxxx"]
        }
        "browser":
        {
            "k64" : ["xxxxxx", "xxxxxx", "xxxxxx"],
            "k65" : ["xxxxxx", "xxxxxx", "xxxxxx"]
        }
    }
}
    ]
}
```

FIG. 8D-3

870 {
- meta.schema_version
- meta.api_version
- meta.message_type
- meta.stream_type 872 {
- data.k1
- data.k2
- data.wt.k3 ⎫
- data.wt.k4 ⎬ 876
- data.wt.k5 ⎪
- data.wt.k6 ⎭
- ⋮

874 {
- ext.geo.k20
- ext.geo.k21
- ext.geo.k22
- ⋮
- ext.device.k30
- ext.device.k31
- ⋮
- ext.browser.k40
- ext.browser.k41
- ⋮

FIG. 8E

```
select *                                                              ⎯ 1020
select event.data.wt.k1, event.data.wt.k2, . . .
select event.data.*, event.ext.geo.*                                  ⎯ 1024
select session.visitor_id, session.time_on_site, session.events.*     ⎯ 1026
  where session.closed = 'true'
where session.closed = 'true' AND session.session_summary.purchase.event_count = 0   ⎯ 1028
```

FIG. 10B

```
function WebTrends() { var that = this; this.dcsid =
"dcscyjdor000004fu02p6j55k_7z2q"; this.domain = "statse.webtrendslive.com";
this.timezone = -8; this.fpcdom = ".motorcycle-superstore.com";
this.onsitedoms = (function () { return (window.RegExp ? new
RegExp(".*motorcycle-superstore.com", "i") : ""); })();this.downloadtypes =
"xls,doc,pdf,txt,csv,zip"; this.navigationtag = "div,table"; this.adclickparam
= "WT.ac"; this.trackevents = true; this.trimoffsiteparams = true;
this.enabled = true; this.i18n = false; this.fpc = "WT_FPC";
this.paidsearchparams = "gclid"; this.splitvalue = ""; this.preserve = true;
this.vid = { params: "WT.dcsvid,WT.i_e_dcsvid", name: "WT_VID", path: ";
path=/", expiry: "; expires=" + (function () { var cur = new Date(); var exp =
new Date(cur.getTime() + 315360000000); return exp.toGMTString(); })(),
domain: "; domain=" + this.fpcdom }; this.DCS = {}; this.WT = {}; this.DCSext
= {}; this.images = []; this.index = 0; this.qp = []; this.exre = (function ()
{ return (window.RegExp ? new
RegExp("dcs(uri)|(ref)|(aut)|(met)|(sta)|(sip)|(pro)|(byt)|(dat)|(p3p)|(cfg)|(
redirect)|(cip)", "i") : ""); })(); this.re = (function () { return
(window.RegExp ? (that.i18n ? { "%25": /\%/g, "%26": /\&/g} : { "%09": /\t/g,
"%20": / /g, "%23": /\#/g, "%26": /\&/g, "%2B": /\+/g, "%3F": /\?/g,
"%5C": /\\/g, "%22": /\"/g, "%7F": /\x7F/g, "%A0": /\xA0/g }) : ""); })(); }

1318
WebTrends.prototype.dcsCreateImage = function (dcsSrc) {
    if (document.images) { this.images[this.index] = new Image();
1316  this.images[this.index].src = dcsSrc; this.index++; }
    else { document.write('<img alt="" border="0" name="DCSIMG" width="1"
height="1" src="' + dcsSrc + '">'); }
}

WebTrends.prototype.dcsTag = function () {
    if (document.cookie.indexOf("WTLOPTOUT=") != -1) { return; }
    var WT = this.WT; var DCS = this.DCS; var DCSext = this.DCSext; var i18n =
this.i18n; var P = "http" + (window.location.protocol.indexOf('https:') == 0 ?
's' : '') + "://" + this.domain + (this.dcsid == "" ? '' : '/' + this.dcsid) +
"/dcs.gif?"; if (i18n) { WT.dep = ""; }
    for (var N in DCS) { if (DCS[N] && (typeof DCS[N] != "function")) { P +=
1312  this.dcsA(N, DCS[N]); } }
    for (N in WT) { if (WT[N] && (typeof WT[N] != "function")) { P +=
this.dcsA("WT." + N, WT[N]); } }
    for (N in DCSext) {
        if (DCSext[N] && (typeof DCSext[N] != "function")) {
            if (i18n) { WT.dep = (WT.dep.length == 0) ? N : (WT.dep + ";" +
N); } }
```

FIG. 13A

```
            P += this.dcsA(N, DCSext[N]);
        }
    }
    if (i18n && (WT.dep.length > 0)) { P += this.dcsA("WT.dep", WT.dep); }
    if (P.length > 2048 && navigator.userAgent.indexOf('MSIE') >= 0) { P =
P.substring(0, 2040) + "&WT.tu=1"; }
    this.dcsCreateImage(P); this.WT.ad = "";              — 1314
}
WebTrends.prototype.dcsCollect = function () {
    if (this.enabled) {
        this.dcsVar(); this.dcsMeta(); this.dcsAdv(); if (typeof
(this.dcsCustom) == "function") { this.dcsCustom(); }
        this.dcsTag();
    }                        — 1310
}
```

1308

```
    <script type="text/javascript">      var _tag = new WebTrends();
_tag.dcsGetId();</script>
    <script type="text/
javascript">_tag.trackAllEvents=true;_tag.dcsCollect();</script>
```

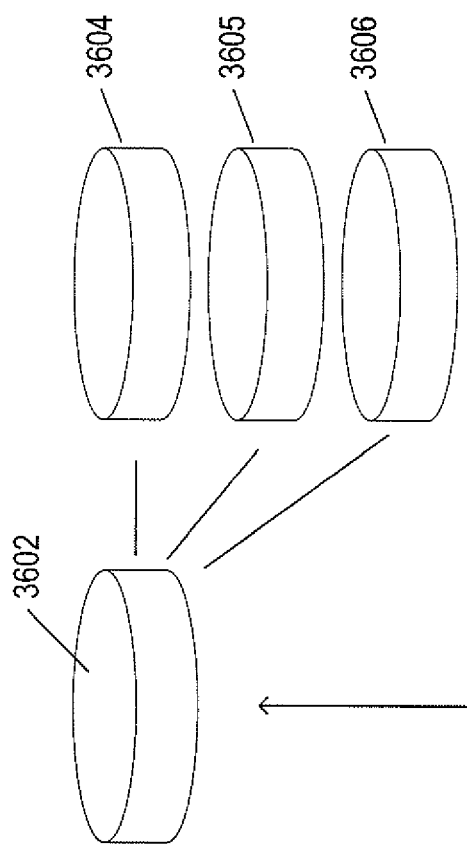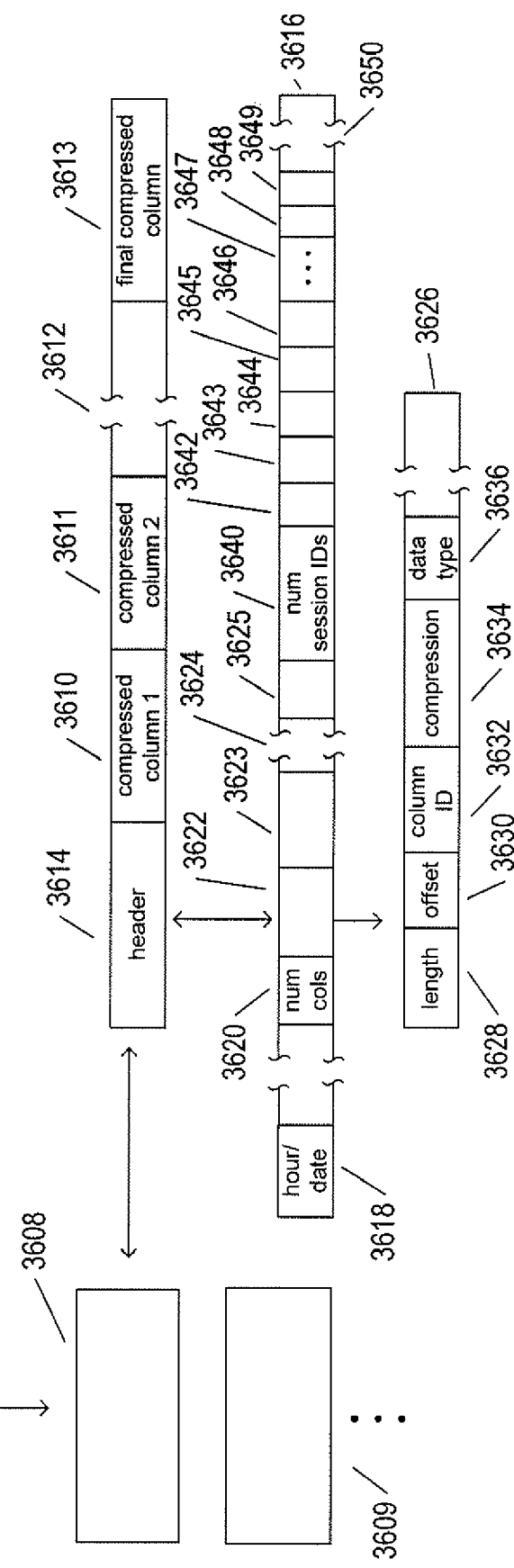
FIG. 36

Aggregate (
    "Distinct Visitors" = distinct values (visitor_ID))
    dimension (values(ext_geo_city))
order by "Distinct Visitors" desc limit 50

FIG. 38

QUERY-AS-A-SERVICE SYSTEM THAT PROVIDES QUERY-RESULT DATA TO REMOTE CLIENTS

CROSS-REFERENCE TO RELATED APPLICATION

This application is a continuation of U.S. patent application Ser. No. 15/404,152, filed Jan. 11, 2017, which claims priority to Provisional U.S. Patent Application No. 62/277,417, filed Jan. 11, 2016, the entire disclosures of which are hereby incorporated by reference, for all purposes, as if fully set forth herein.

TECHNICAL FIELD

The current document is directed to a query-as-a-service system that continuously executes queries on behalf of remote client computers against processed data provided by a real-time, processed-data-streaming-system subcomponent that generates processed data from an enormous number of remote processor-controlled and network-connected objects and entities.

BACKGROUND

The bandwidths, complexities, and capacities of modern distributed computer systems have increased enormously during the past several decades. Millions of personal computers, mobile devices, and other processor-controlled user appliances are currently interconnected with one another by the Internet, on a global scale, and interconnected with thousands of distributed-computing systems that provide entertainment content, information, services, retailer transactions, and other services to users of processor-controlled user appliances. Electronic commerce and electronic marketplaces have grown from relatively small and crude initial retailing websites, that first appeared in the 1990's, to handling a significant percentage of retail and commercial transactions.

The rise and rapid evolution of distributed-computing-implemented services and retailing has generated many additional types of electronic services and service-provision systems. As one example, electronic retailers routinely employ third-party web-analytics services in order to collect data with regard to user interaction with web sites and to analyze the data in order to improve the retailing efficiency of websites. In certain cases, the third-party web-analytics services instrument the HTML files, script files, and other types of encodings of web pages and then receive and process data forwarded by the instrumentation, executed within user browsers on remote user appliances, to web-analytics-service-provider data centers. The web-analytics service providers also generally provide clients with the ability to design and run various types of experiments within the context of which the instrumentation-produced data is collected and subsequently used to design, refine, and deploy various types of effective and efficient web sites. E-commerce retailers and electronic service providers continue to seek new types of data-collection and data-analysis methods and systems to further their goals in electronic commerce and other types of electronic services.

The advent of the Internet of Things has created a large demand for efficient processing of enormous volumes of data generated by many different types of entities that communicate data with data-processing systems. The real-time, processed-data-streaming subsystem developed for providing data to e-commerce retailers and electronic service providers provides only a portion of the functionality needed for handling enormous data volumes generated by the Internet of Things. Therefore, researchers, developers, system designers, and application designers involved with the Internet of Things continue to seek data-collection solutions with sufficient capacity and bandwidth to handle the enormous data volumes generated by the Internet of Things and that can provide data-processing functionalities needed to use the enormous volumes of data for analytics, real-time control, and for other practical purposes.

SUMMARY

The current document is directed to a query-as-a-service system ("QAAS system") that collects enormous volumes of data from network-connected entities, referred to as "Things" in the phrase "Internet of Things," persistently stores the collected data and provides a distributed-query-execution engine that allows remote clients to continuously execute queries against the collected data, including both real-time data streams as well as persistently stored data. In a described implementation, both the raw data and query results are persistently stored in the QAAS system, with the raw data stored for significantly longer periods of time. Query results generated by the query-processing engine are securely transmitted to QAAS remote clients for distribution to file systems, storage appliances, applications, and other data sinks within client systems.

BRIEF DESCRIPTION OF THE DRAWINGS

FIG. 7 illustrates JSON encodings of a connection request sent by an application to the processing center as part of the opening of a communications socket and a response message sent by the processing center back to the application program in response to a connection request.

FIGS. 8A-E illustrate the various types of data messages that are transmitted between computers in the example system shown in FIG. 5.

FIGS. 10A-B illustrate query-based filtering of the data stream by the processing center prior to directing the data stream to a client application.

FIGS. 13A-B provide an example of the instrumentation inserted within a web page that carries out data collection.

FIGS. 34-36 illustrate how session-message streams produced by the processing center are stored, or archived, for subsequent use in query processing.

FIG. 35 illustrates the archived session-message data stored within the QAAS system.

FIG. 36 illustrates details of data storage within each of the disks or virtual disks discussed above with reference to FIGS. 34-35.

FIG. 38 shows an example aggregation-type query.

FIG. 42 illustrates merging of a local hash map with a global hash map.

FIG. 43 shows a hierarchical hash map merging.

DETAILED DESCRIPTION

Figure 1:
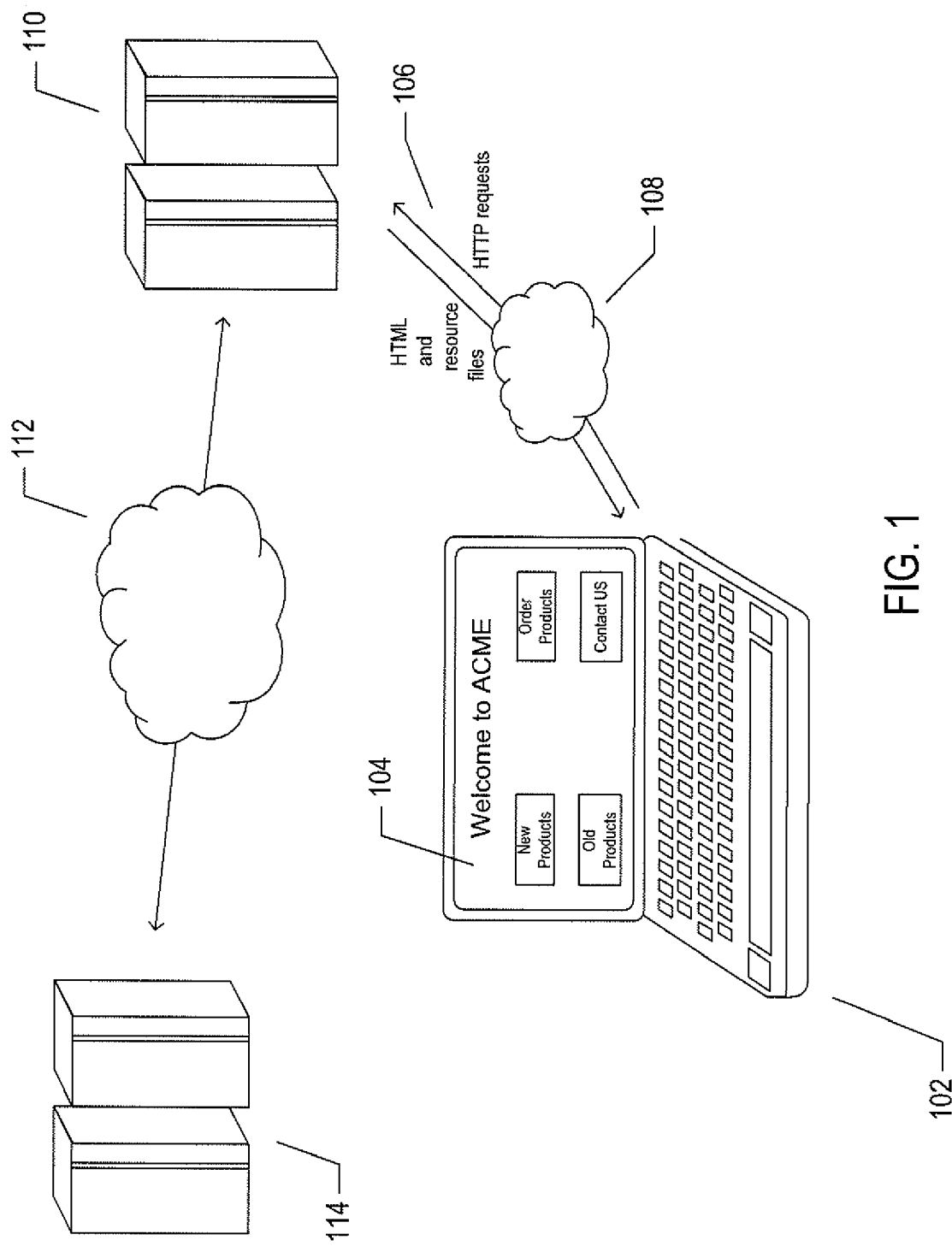
FIG. 1 illustrates an electronic-commerce environment in which methods and systems to which the current document is directed may be employed.

Web-analytics service providers and various types of web-analysis tools, which are currently used by e-commerce retailers and other electronic-service providers to analyze the performance of web sites and the characteristics of user interaction with web sites in order to design better web sites and refine existing web sites to achieve particular goals, provide one example of data-consuming systems. As one example, analysis of user interaction with electronic-retailing web sites may allow electronic retailers to design web sites that result in a higher percentage of users accessing the web site purchasing products and/or services. Currently, data produced by instrumentation within web-site encodings, such as HTML files and JavaScript routines, is collected by data-collection systems, electronically stored, and then processed offline by a variety of different analytical tools and applications to produce reports and analyses. These reports and analyses have provided enormously valuable feedback to electronic retailers and other electronic-service providers. However, because the reports and analyses are produced and distributed offline, many current web analysis services and tools are limited and constrained with respect to the types of information that they provide to e-commerce clients and other electronic-services providers. Furthermore, while electronic commerce and electronic services are quite dynamic, the significant lag times associated with producing reports and analyses currently prohibit the provision of real-time, dynamic feedback based on collected data.

The current document is directed to a QAAS system that includes, as a component subsystem, a processed-data-streaming subsystem that streams real-time data from remote processor-controlled appliances, including from web browsers executing in remote user-processor control devices, to data consumers, including application programs that process and render the data for real-time display to web-site owners, electronic-commerce organizations, to other electronic-services providers and other types of clients, and to query-processing functionality within the QAAS system. The processed-data-streaming subsystem of the QAAS system enables a large variety of different types of real-time consoles and monitors that display, to clients, visual representations of the highly dynamic and highly geographically dispersed operation of web sites used for electronic commerce and other electronic-services provision. The processed-data-streaming subsystem closes the latency gap inherent in current off-line analytics processing, allowing for various types of real-time analysis of web-site operation. There are, in addition, many other types of consumers of real-time, processed data, including automated systems that monitor usage of websites, modify and tailor the web site for individual users and groups of users, and provide modified and tailored web pages and other types of information in real time. Additional data consumers include automated decision systems that may initiate many different types of automated processes in response to real-time decisions made from real-time, streaming data.

By "real-time," the current document refers to a data-collection, data-processing, and processed-data-streaming subsystem that collects data on hundreds, thousands, millions, or more remote, geographically disperse processor-controlled user appliance and that streams processed-data that includes the collected data to a data-consuming application, system, or device within an average time interval of two seconds. In certain implementations, the average interval from data collection on the remote processor-controlled user appliances to reception of a processed-data message containing the data by a real-time, data-stream consumer is one and a half seconds or less. In certain implementations, the average interval from data collection on the remote processor-controlled user appliances to reception of a processed-data message containing the data by a real-time, data-stream consumer is one second or less. The data-collection, data-processing, and processed-data-streaming subsystems may concurrently direct one or more data streams of one or more types to tens, hundreds, thousands, or more data consumers.

FIG. 1 illustrates an electronic-commerce environment in which methods and systems to which the current document is directed may be employed. In FIG. 1, a web browser executing within a processor-controlled user appliance, in this case a laptop computer 102, processes hypertext markup language ("HTML") files and other resource files to display a web page 104 on a display device of the processor-controlled user appliance. The HTML and other resource files are requested by the browser, via hypertext-transfer-protocol ("HTTP") requests 106 transmitted from the processor-controlled user appliance 102 via the Internet 108 to a web-server system 110. The web-server system 110 returns the requested HTML files and other resource files to the browser executing within the processor-controlled user appliance, which executes and processes the HTML files and other resource files to produce the displayed web page 104. The web-server system 110 may additionally acquire information, via the Internet 112, from one or more remote computer systems 114 for forwarding to the web browser. In order to render a particular web page, a web browser may direct HTTP requests to multiple web-server systems. In electronic commerce, a displayed web page or web pages that together comprise a web site may allow the user to view photographs and descriptions of products, carry out text-based searching for products and services, and to purchase products and services through secure e-commerce transactions, among other activities. Web sites may also allow for exchange of information between users and a web site and may serve as a portal, or jumping point, through which users navigate to other web sites.

FIG. 1 is one example of many different types of processor-controlled user appliances from which the currently described system can acquire data. These include systems that execute applications that render HTML-encoded information for display to a user, other than web browsers, and many other types of information-rendering and information-transmitting systems, the control subsystems for which include processor-executed instructions into which data-collection instrumentation is introduced. Instrumentation can be introduced into instructions produced from compilation or interpretation of any of a large number of different types of programming, scripting, and other types of languages. The processor-controlled appliances may include desktop computers, mobile computers, such as laptops and tablets, mobile phones, processor controlled consumer appliances and vehicles, and system components, but may also include much lower-end devices, such as radio-frequency identification ("RFID") tags, and many other types of devices that execute simple routines stored in small flash memories or other types of non-volatile memories. In certain low-end devices, which lack processors and processor instructions, hardware logic circuits may be instrumented to transmit information collected by the data-collection subsystem. In general, the processor-controlled appliance needs to be communicatively interconnected with a data-collection subsystem. Frequently, the interconnection is a communications system that connects the processor-controlled appliance to the Internet.

Figure 2:
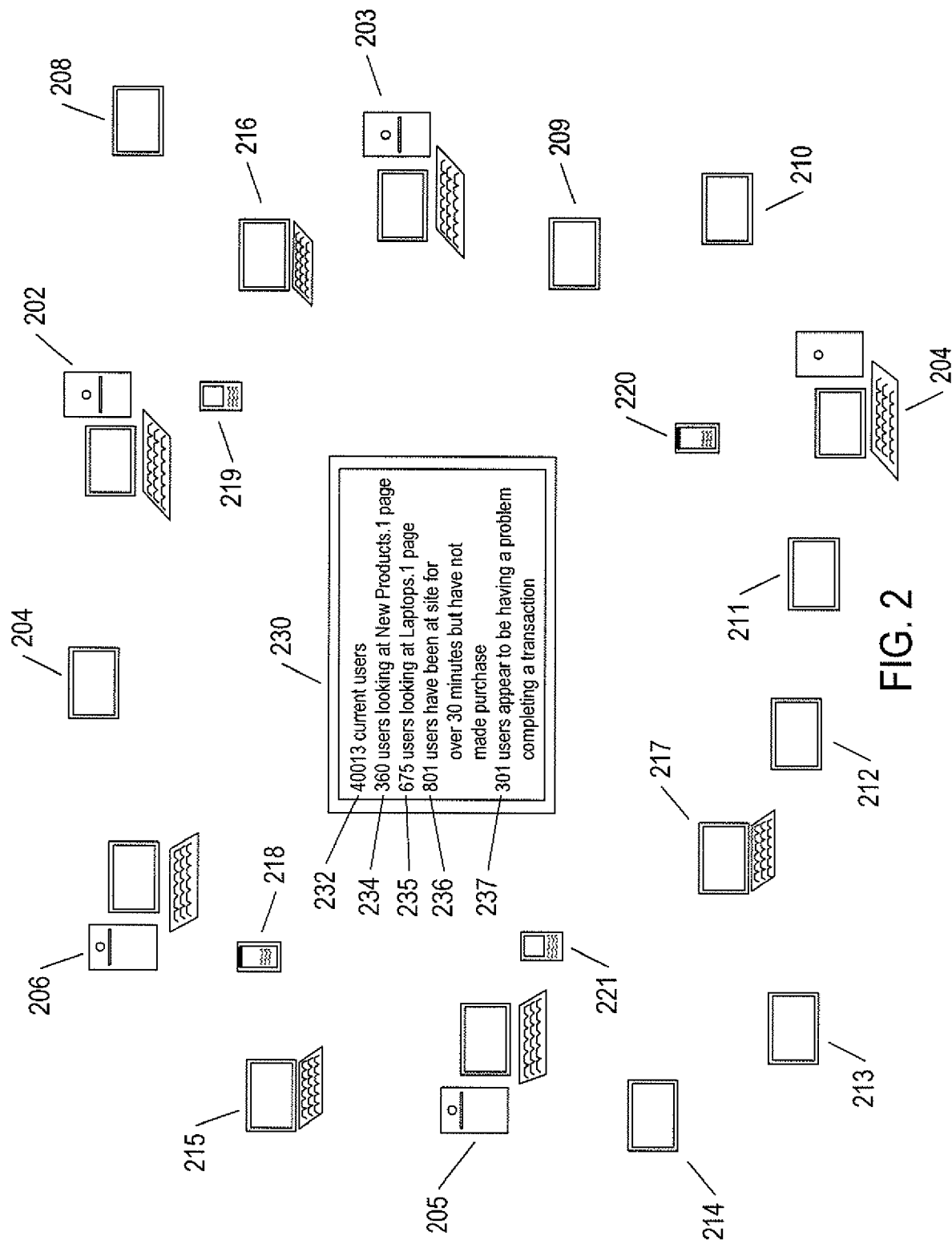
FIG. 2 illustrates an example of the type of application programs made possible by processed-data-streaming subsystem of the currently disclosed QAAS system.

The processed-data-streaming subsystem provides real-time, streaming, processed data from remote processor-controlled user appliances and accessing the web pages of a web site to one or more application programs, as one example, or other types of information provided by instrumentation added to sequences of processor instruction or logic circuitry. FIG. 2 illustrates an example of the type of application programs made possible by processed-data-streaming subsystem of the currently disclosed QAAS system. In FIG. 2, a web site is currently being accessed by a large number of different, geographically disperse users interacting with processor-controlled user appliances, including personal computers 202-206, electronic tablets 207-214, laptop computers 215-217, and mobile phones 218-221. The processor-controlled user appliances shown in FIG. 2 are a tiny subset of the potentially thousands or more processor-controlled user appliances through which users may be currently accessing the web site from all over the world. Data collected in real time from instrumentation within the HTML files and other resource files executed and rendered by browsers within the user appliances is processed and streamed to an application program running within a computer system that produces a console-or-monitor-like display 230. The application program renders the streaming data to produce a dynamic, constantly changing console or monitor 230 that indicates, in the example shown in FIG. 2, the number of current users accessing the website 232, the number of users looking at a particular web page within the web site 234-235, and the number of users in each of various different classes of users 236-237. The console-or-monitor-like display 230 provided by an application program receiving real-time, processed, streaming data allows a client to view characteristics of the world-wide operation of a web site in real time. This is an extraordinarily dynamic and powerful tool for understanding the function and operation of a web site at any particular instant in time. These types of application-program-implemented consoles and monitors may allow a web-site owner, developer, administrator, or other client to track the activities of individual web-site users at any location in the world, as one example. This provides the ability for real-time adaptation of a web site in order to address needs of individual users in real time.

Figure 3:
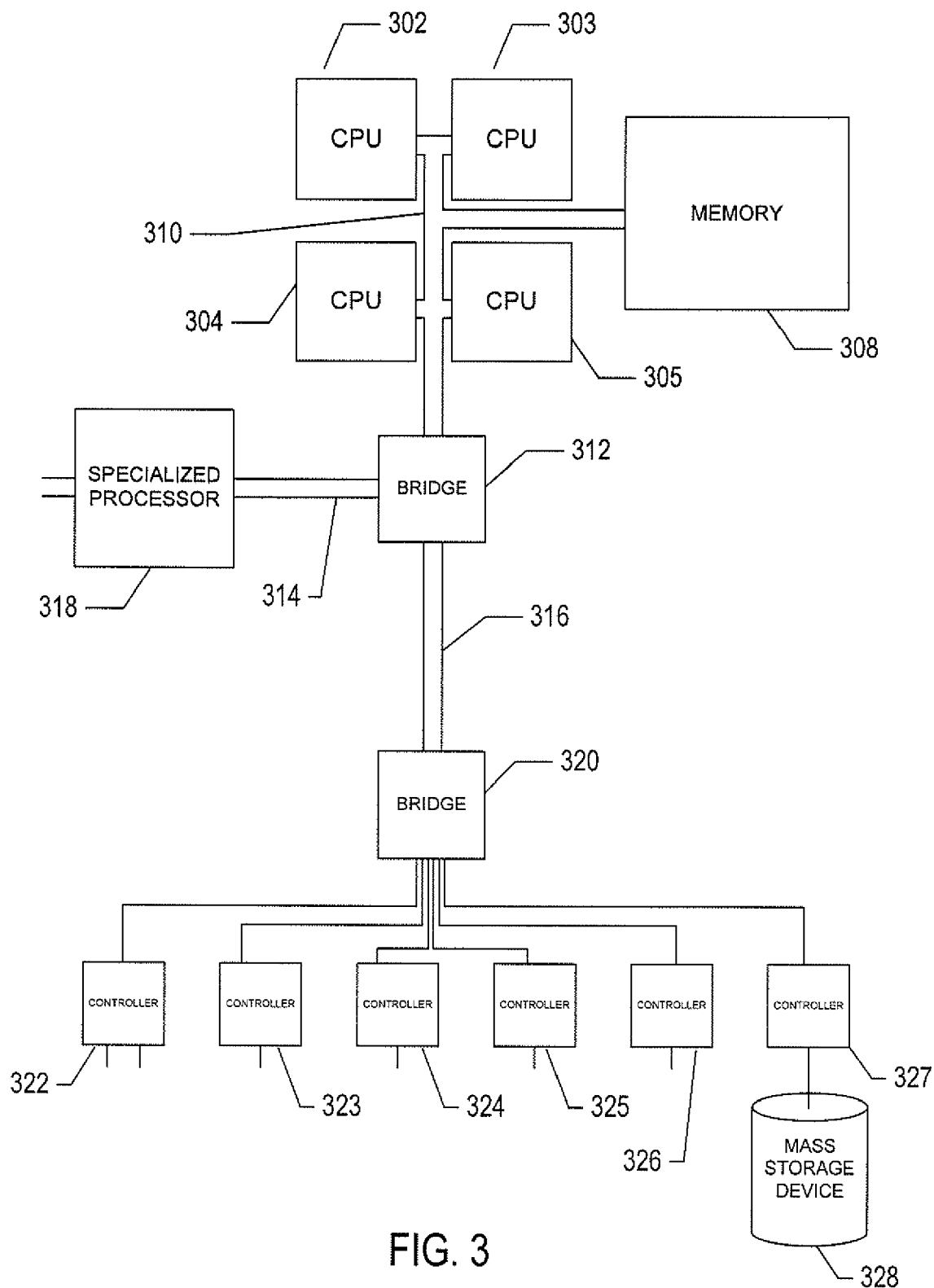
FIG. 3 provides a high-level architectural diagram of a typical computer system, such as a processor-controller user appliance or a server within a data-processing center.

FIG. 3 provides a high-level architectural diagram of a typical computer system, such as a processor-controller user appliance or a server within a data-processing center. The computer system contains one or multiple central processing units ("CPUs") 302-305, one or more electronic memories 308 interconnected with the CPUs by a CPU/memory-subsystem bus 310 or multiple busses, a first bridge 312 that interconnects the CPU/memory-subsystem bus 310 with additional busses 314 and 316, or other types of high-speed interconnection media, including multiple, high-speed serial interconnects. These busses or serial interconnections, in turn, connect the CPUs and memory with specialized processors, such as a graphics processor 318, and with one or more additional bridges 320, which are interconnected with high-speed serial links or with multiple controllers 322-327, such as controller 327, that provide access to various different types of mass-storage devices 328, electronic displays, input devices, and other such components, subcomponents, and computational resources.

It should be noted, at the onset, that the current document is directed to tangible, physical systems and methods carried out by tangible, physical systems rather than to some type of abstract concept. The physical systems and methods to which the current document is directed include user computers, web browsers executing within user computers that comprise computer instructions stored in physical memories and/or mass-storage devices, communications systems that implement Internet communications, data-collection subsystems, consolidation computer systems, data-processing centers, and, ultimately, client computers that execute application programs which receive streaming data and render the streaming data for display on electronic display devices to clients. As those familiar with science and technology well understand, these complex systems are not abstract, and the activities carried out by these complex systems could not possibly be carried out manually by human beings. While portions of these complex systems are implemented by stored computer instructions, these systems cannot be characterized as software or abstractions. It should also be noted that, as well understood by those familiar with science and technology, computer instructions cannot be stored in electromagnetic radiation, such as communications signals. Computer instructions and digitally encoded data can only be stored in physical data-storage devices, such as electromagnetic disks, optical disks, electronic memories, and other such physical data-storage devices. Electronic signals and electromagnetic radiation are instead used to transmit computer instructions from one computer to another.

Figure 4A:
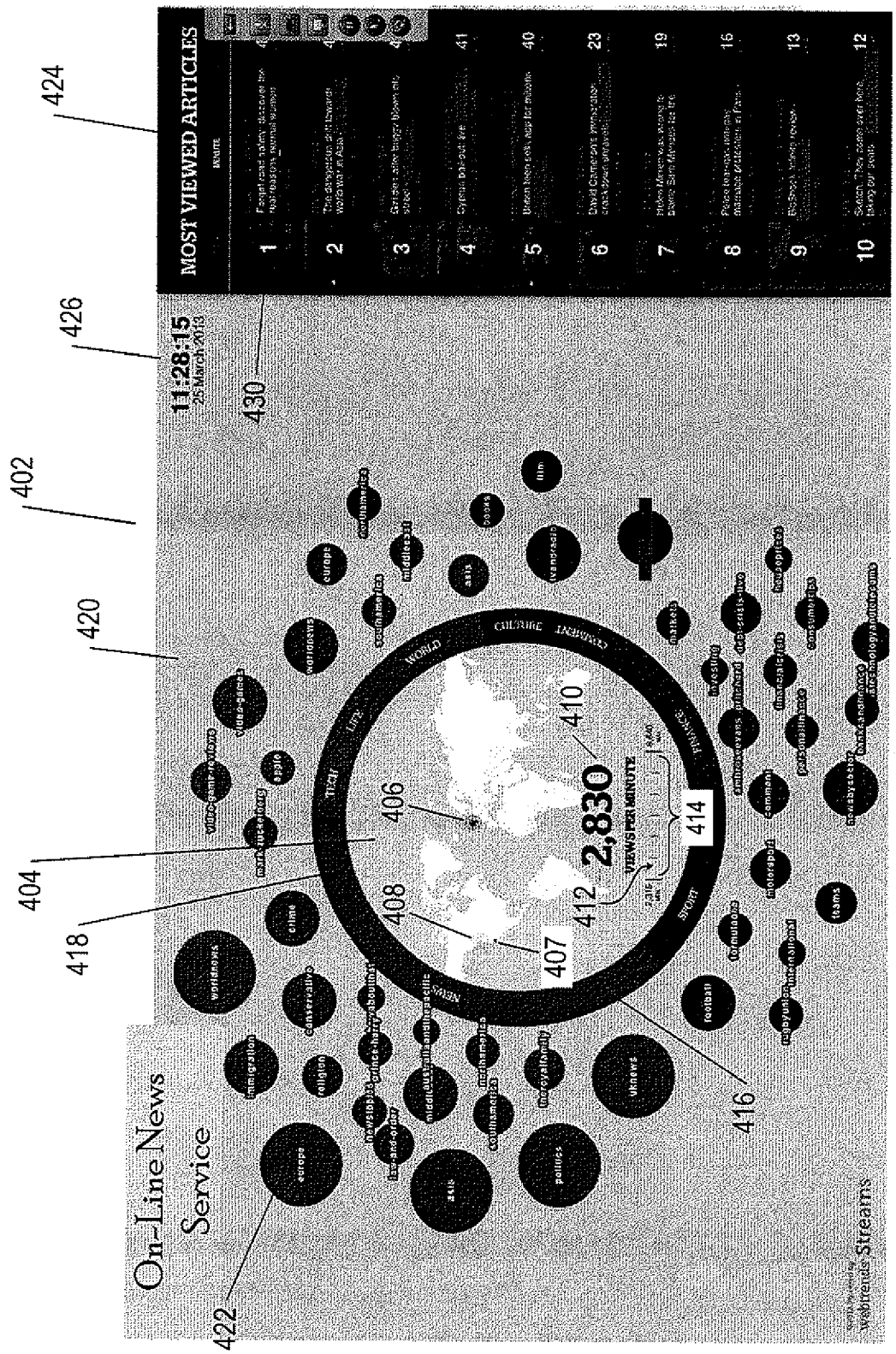
FIGS. 4A-D illustrate a console-or-monitor-type application that receives and renders real-time, processed, streaming data provided by the processed-data-streaming subsystem.

FIGS. 4A-D illustrate a console-or-monitor-type application that receives and renders real-time, processed, streaming data provided by the processed-data-streaming subsystem. As shown in FIG. 4A, the displayed console or monitor 402 displays real-time readership information for a news website. A central, disk-shaped section 404 of the displayed monitor shows a map of the world, with regions featuring the largest number of current viewers indicated by darkened pixels and shaded disks, such as regions 406-408. A large numeric value 410 indicates the current number of viewers per minute on the web site, also indicated by an arrow-like icon 412 within a range of views-per-minute values 414 that have been displayed during the current instantiation of the monitor.

An annular section display bar 416 indicates the portion of viewers currently viewing a page within various sections of the web site, with the number of viewers proportional to the area assigned to the section. For example, the largest number of current viewers are viewing the "news" section 418. Other sections include "tech," "life," "world," "culture," "comments," "finance," and "sport." In the main panel 420 of the monitor display, outside the annular display band 416, the number of current readers within each of various subsections of the above-discussed sections are represented by the areas of labeled disks, such as disk 422 labeled "europe." In a right-hand panel 424 of the monitor display, the top ten most currently viewed articles are shown, in descending order, in entries that include a photograph, section, title, and author, and the current number of readers. The current time and date are displayed in the upper right-hand corner of the main panel 426.

Figure 4B:
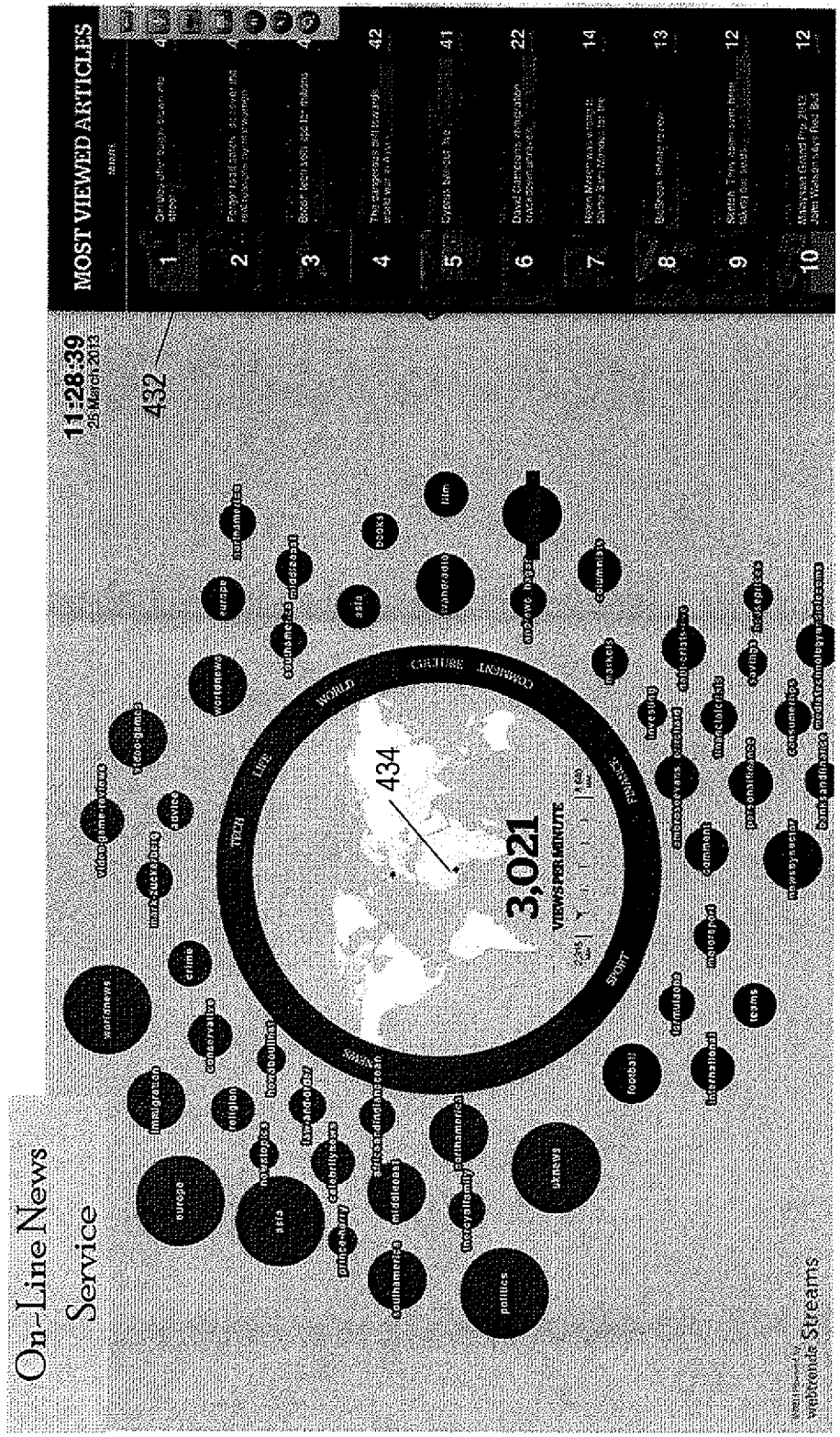
Figure 4C:
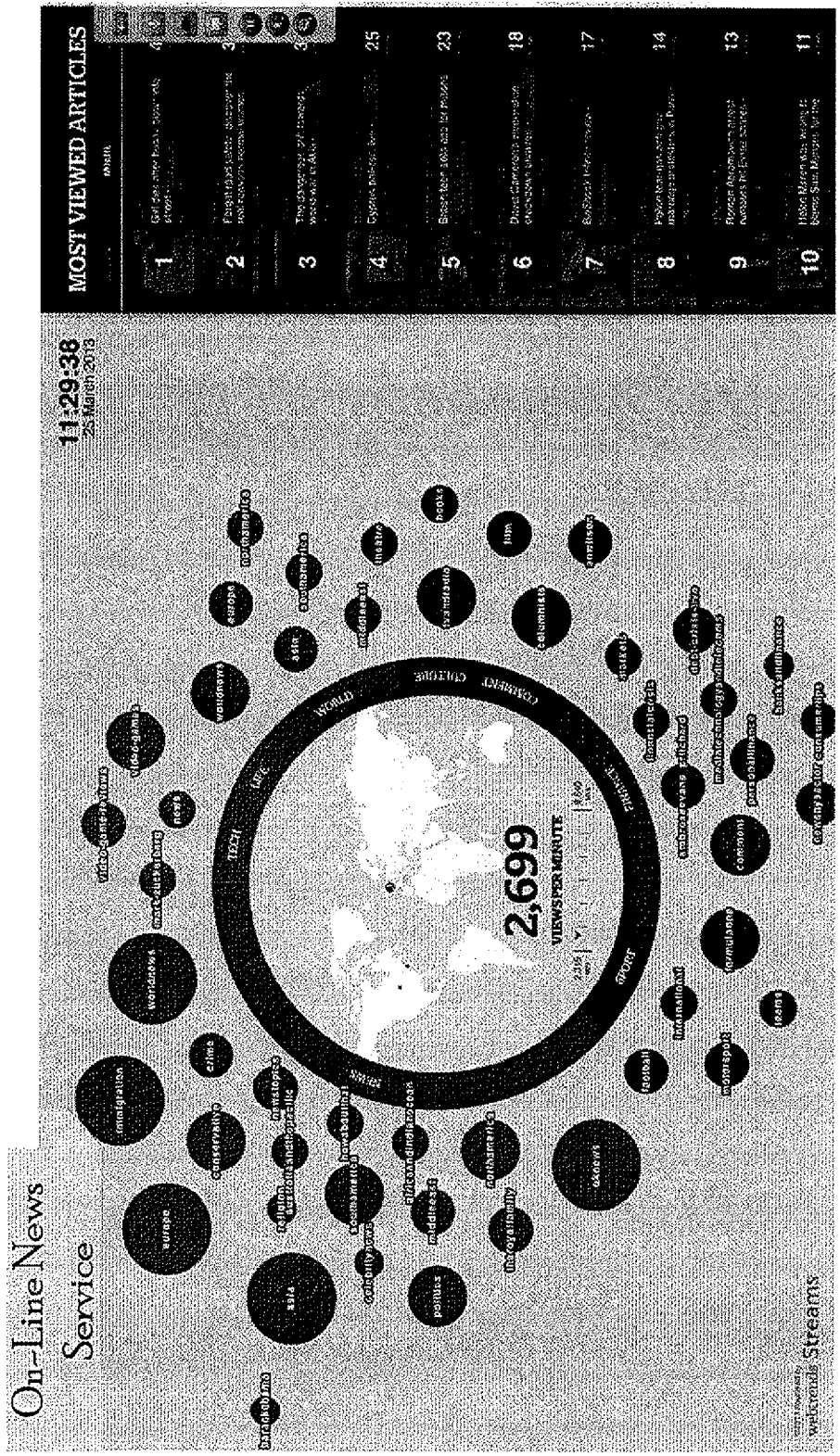
Figure 4D:
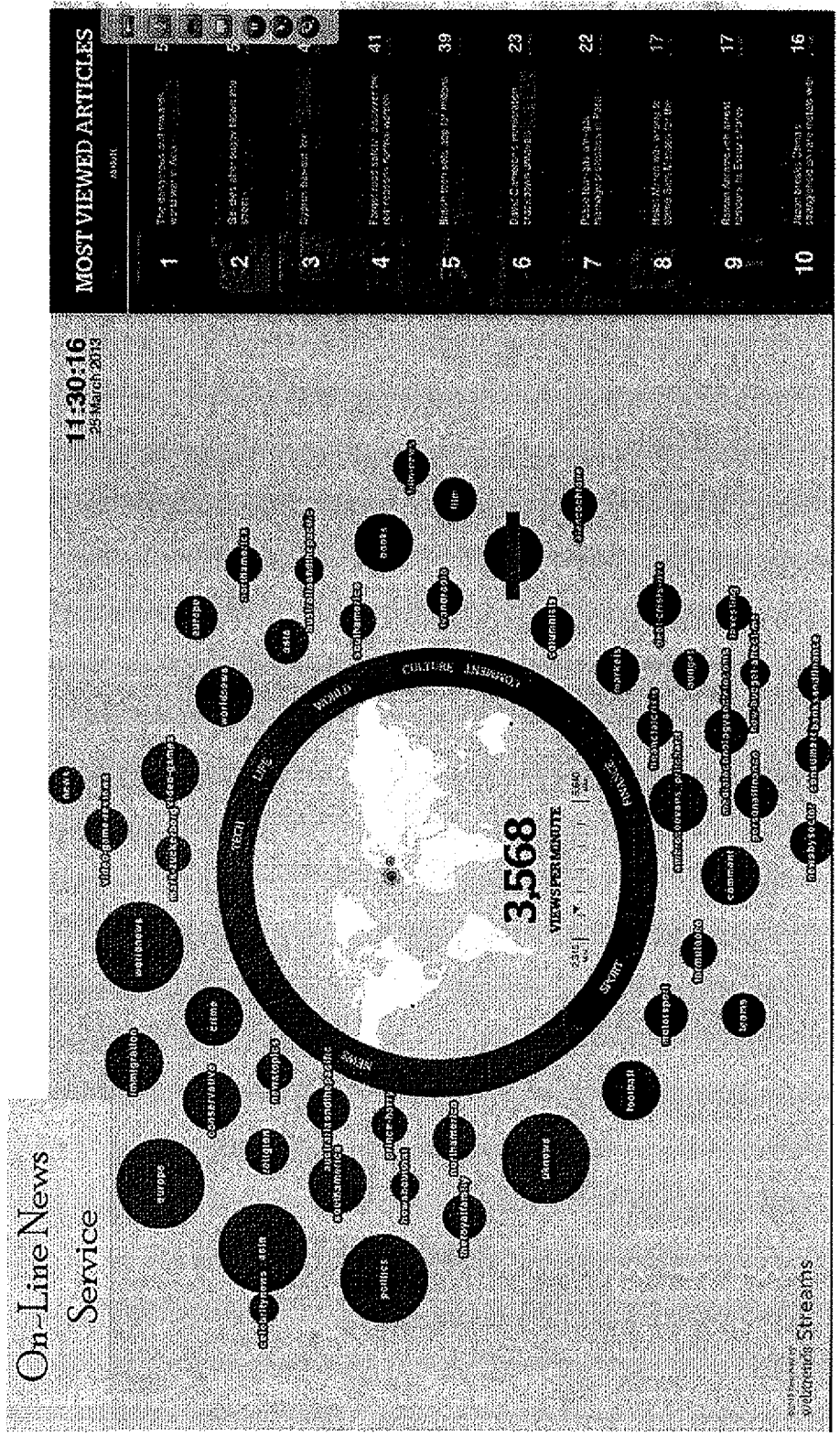

FIGS. 4B-D show screen captures of the same monitor display at various points in time following the time 11:28:15 at which the screen shot of the monitor display shown in FIG. 4A was recorded. FIGS. 4A-D illustrates the dynamic nature of the monitor display. For example, at the point in time represented by FIG. 4A, the most viewed article was a women's-section article about road safety 430. By contrast, 24 second later, as shown in FIG. 4B, the most viewed article is a weather-section article about the death of a girl during a windstorm 432. Another difference is the identification of a region in Africa 434 as one of the regions with the most current viewers while, in FIG. 4A, that region of Africa was not so identified. Many other changes can be observed in the sequence of FIGS. 4A-D.

The display monitor illustrated in FIGS. 4A-D thus provides immediate, real-time data, in a visually compelling, dynamic, easy-to-understand format, related to current viewers of the news web site across the world. This type of information may be used for selecting articles for the web site, for targeting particular geographical areas, for targeting advertisements, and for many other such purposes.

Figure 5:
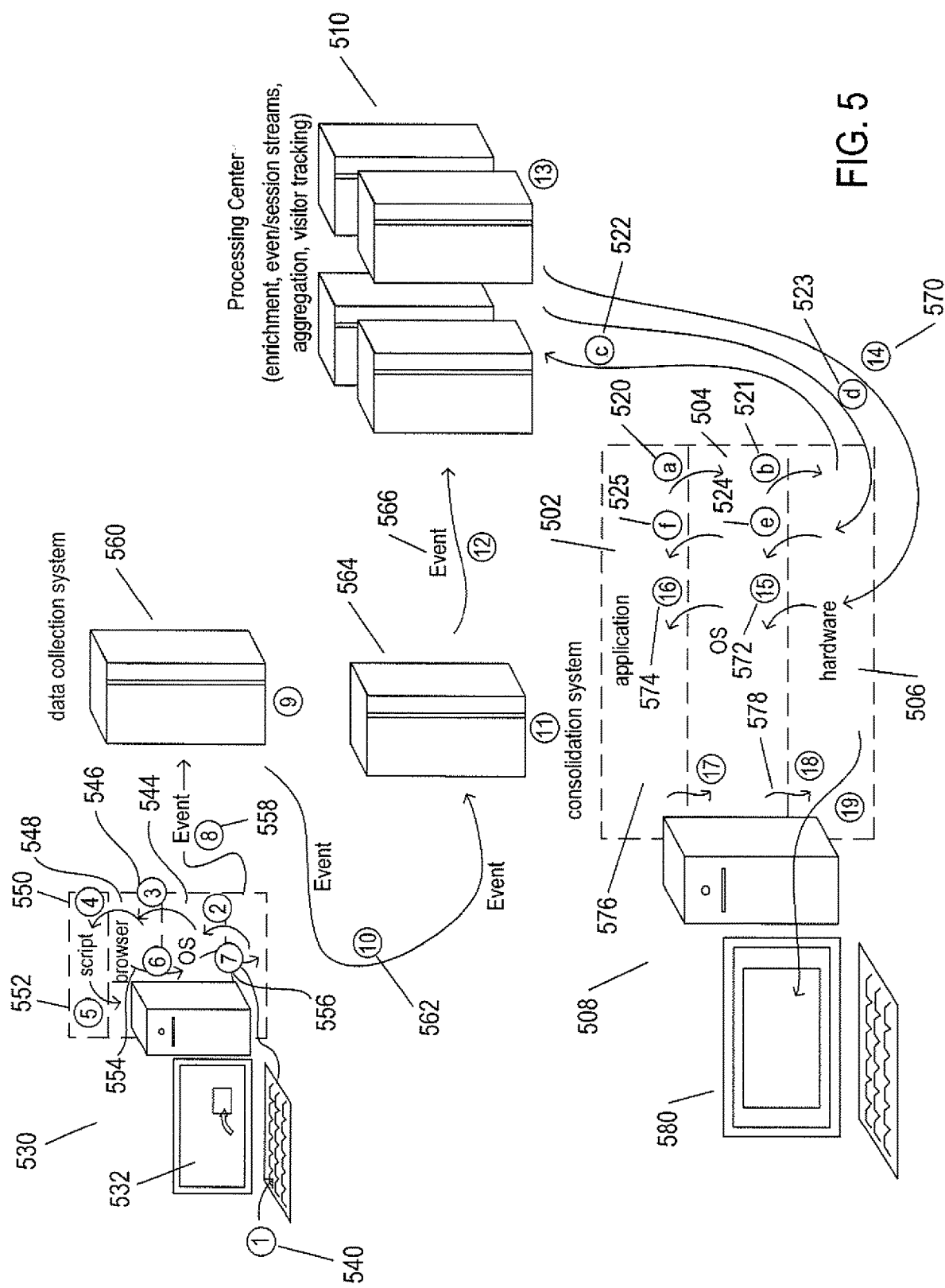
FIG. 5 illustrates the high-level components and data paths within one implementation of the subsystem that streams real-time, processed data from web browsers executing on processor-controlled user appliances to a console-or-monitor-type application, such as that discussed above with reference to FIGS. 2 and 4A-D.

FIG. 5 illustrates the high-level components and data paths within one implementation of the subsystem that streams real-time, processed data from web browsers executing on processor-controlled user appliances to a console-or-monitor-type application, such as that discussed above with reference to FIGS. 2 and 4A-D. Initially, when the application begins to execute, the application initializes various data structures and then opens at least one communications socket to a processing center. In FIG. 5, the console-or-monitor-like application 502 executes within an execution environment provided by an operating system 504 that executes above the hardware platform 506 within a computer system 508. The processing center 510 is generally a remote, distributed computer system that includes tens to hundreds of server computers and other types of processor-controlled devices, systems, and subsystems. In order to open a communications socket and communicate with the processing center, the following high-level steps occur: (a) the application executes an open-socket system call 520; (b) in response to the system call, the operating system creates an open-socket-request message and, via a device driver, queues the message to the input queue of a communications controller and signals the communications controller to transmit the message to the processing center 521; (c) the communications controller controls a transceiver to transmit the open-socket-request message to a listening process executing on a computer within the processing center 522; (d) the processing center returns an acknowledgement message to the transceiver 523 within computer system 508; (e) the operating system 504 within computer 508 is notified of the reception of the acknowledgement message and retrieves the acknowledgement message from a memory buffer 524; and (f) the acknowledgement message is passed to the application program to indicate successful opening of the communications socket 525. Various different types of socket requests and underlying communications protocols may be used to establish a communications link between the processing center and the application. Certain of these protocols may involve three or more different messages that implement a handshake operation. Furthermore, in most communications systems, various different types of information are exchanged between different levels of the communications stack. Errors may occur when the application program attempts to open a socket, with the type of error often indicated by return of an error message by the processing center to the application or return of an error indication by the operating system within computer system 508 to the application.

Once the socket is opened, or, in other words, a protocol-based communications link is established between the application 502 and the processing center 510, the processing center begins to send a stream of data messages to the application program through the communications socket.

This stream continues until the occurrence of some type of stream-ending event, such as closing of the socket via a system call by the application program, termination of the application program, or various types of failures and computational discontinuities. The application program may choose to open two or more different sockets to the processing center in order to concurrently receive two or more different streams of data messages.

Continuing with FIG. 5, the process by which a data message is created and transmitted to the application program is next described. The system depends on instrumentation introduced into HTML files and/or other resources that are used by a web browser or other type of application program or control program. In the example shown in FIG. 5, the instrumentation is included in HTML files that are processed by a web browser 548 to render and display web pages to a remote user on a remote computer system 530. In the example, a user is viewing a currently displayed web page 532. The following events occur, in this example: (1) the user depresses a key or clicks a mouse button 540 in order to input a command, make a selection, or carry out some other such input to the web browser; (2) the user input is sensed by the hardware of the remote computer system 542, which generates an interrupt or other signal to the operating system 544 within the remote computer system; (3) the operating system receives the interrupt and notifies 546 the browser 548 within the remote computer system of the input event; (4) as a result of receiving the input, the browser executes a script routine 550 within which instrumentation has been embedded for collecting data; (5) instrumentation within the script collects data programmatically 552, encodes the data within a uniform resource locator ("URL"), and requests that the browser retrieve a remote resource specified by the URL; (6) the browser executes an HTTP request for the resource 554 that results in a system call to the operating system 544; (7) the operating system creates a request message and passes the request message to a communications-device controller 556 for transmission 558 to a data-collection subsystem 560; (8) the data-collection subsystem retrieves the encoded data from the URL request and packages the data in a JSON-encoded event message; (9) the event message is transmitted by the data-collection subsystem 562 to a consolidation system 564; (10) the consolidation system consolidates event messages received from many different data-collection subsystems in temporary storage, with a temporary storage area allocated for the event messages corresponding to each of one or more different clients; (11) upon request from the processing center 510, the consolidation system forwards 566 a next set of events to the processing center for processing; (12) a processing center 510 processes received event messages by adding derived and calculated data to the event messages and, in certain cases, aggregating and coalescing individual event messages into higher-level messages as well as filtering the messages for output to each connection/stream; (13) those processed messages that belong to the stream requested by the application program are forwarded 570 by the processing center to the computer system 508; (14) the hardware layer of the computer system notifies the operating system and passes the received processed message or messages to the operating system 572; (15) the operating system notifies and passes the received processed messages to the application program 574; (16) the application program then uses the data to generate and update to the monitor display or console display based on the received data and passes this update 576 to the operating system; (17) the operating system controls a graphics processor and other video components of the hardware level 578 to update the monitor display or console display; and (18) update operations are transferred from the graphics subsystem to the display device 580 resulting in an update of the monitor display or console display. The consolidation systems may store collected data for a specified period of time, in certain cases, for a week or more, allowing the stored data to be subsequently streamed or re-streamed for various purposes. Data may be additionally archived for subsequent retrieval, processing, and streaming, either within consolidation systems or processing centers.

Figure 6:
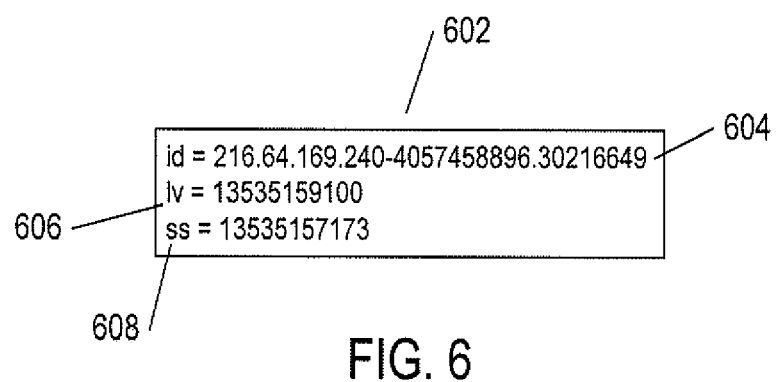
FIG. 6 shows a cookie, or small data structure, that is stored within the memory of each remote computer system that is instrumented for data collection by the data-collection subsystem.

The data-collection subsystem generally maintains state information within remote computer systems to facilitate data collection and processing. FIG. 6 shows a cookie, or small data structure, that is stored within the memory of each remote computer system that is instrumented for data collection by the data-collection subsystem. The cookie 602 includes a unique identifier for the user/processor-controlled appliance 604, a system time stamp 606 that indicates the most recent event detected by the instrumentation, and a session-start time stamp 608 that indicates the time at which a session that includes the most recent event began. The identification of the user/processor-controlled appliance, id, is generally a combination of an IP address and other numbers that uniquely identify the user/processor-controlled appliance. The time stamps that indicate the last detected event, or last visit, lv, and the start of the session, ss, are generally system time values that indicate the number of seconds or fractions of seconds that have elapsed since some arbitrary point in time. The data contained in the cookie is used by the instrumentation for encoding data within a URL for transmission to a data-collection subsystem and subsequent downstream processing of the data.

FIG. 7 illustrates JSON encodings of a connection request sent by an application to the processing center as part of the opening of a communications socket and a response message sent by the processing center back to the application program in response to a connection request. In FIG. 7 and in subsequent figures, a pair of quotation marks enclosing a series of "x" symbols indicates where a symbol-string encoding of a data value occurs in the JSON encoding. The connection request and connection response include numerous key/value pairs. In the connection request, the outer brackets 702-703 indicate a JSON object composed of one or more key/value pairs. The first key is "access token" 704 and a value 706 corresponding to the key occurs, within a pair of quotation marks, following a colon delimiter 708. Each key/value pair, other than the final key/value pair, is separated from subsequent key/value pairs by a comma, such as comma 710 following the first key/value pair 704, 706, and 708. The access token is a symbol string that is obtained from a data-streaming service as a credential that allows access to data streams by application programs. The key "command" 712 is associated with a symbol-string value 714, such as the symbol string "stream," that requests a particular type of action or service from the processing center. The key "stream type" 716 is associated with a value 718 that indicates one of various types of streams that the application program wishes to receive through the communications socket. Examples include event streams and session streams. The key "query" 720 is associated with a symbol-string value 722 that specifies a structured-query-language-("SQL")-like query that is used, by the processing center, to filter data messages and the contents of data messages prior to directing a filtered stream of data messages to the application program. The "api_version" key/value pair 724 and "schema version" key/value pair 726 specify a streams application program interface ("API") version and a query-language version to the processing center. Because the streams API and query language may be revised and updated to generate a series of versions with increasing version numbers, these key value pairs inform the processing center of the API version being used by the application program and the query language version used by the application program to create the queries included as the value of the "query" key/value pair, allowing the processing center to appropriately respond to a connection request.

The connection response message 730 has the form of a JSON-encoded data message. In all JSON-encoded data messages, in one implementation, the message object includes an initial "meta" object specified by the symbol string "meta" 732 and a number of key/value pairs within the meta object delimited by brackets 734 and 736. The meta object includes the above-discussed "api_version" key/value pair and "schema version" key/value pair. In addition, the meta object includes a "message type" key/value pair 738, example values of which include "success" and "error," and a "stream type" key/value pair 740, the value of which specifies the type of data stream that has been opened, examples including "event" and "session." Following the meta object, the connection response includes a response key/value pair 742 with values indicating either success or providing an explanation of an error that has occurred. A JSON-encoded connection request is transmitted to the processing center as part of the open-socket request and a JSON-encoded connection response message is returned by the processing center in response to the open-socket request.

Figures 8A, 8B:
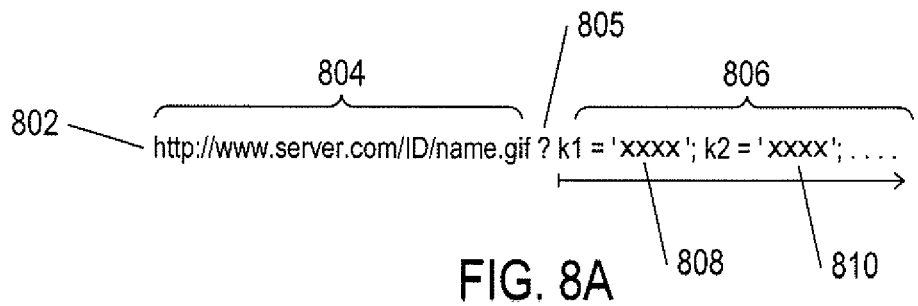

FIGS. 8A-E illustrate the various types of data messages that are transmitted between computers in the example system shown in FIG. 5. As discussed above, the data initially collected by instrumentation within the web browser is encoded as a series of key/value pairs within a URL. FIG. 8A illustrates the encoding of key/value pairs generated by instrumentation within a URL. The URL 802 includes a path name to a resource stored on a data-collection server 804 followed by a question mark 805 and then a series of semi-colon-delimited key/value pairs 806. In FIG. 8A, and in subsequent figures, the symbol strings "k1," "k2," . . . are used to indicate different keys and the corresponding values are generally indicated by a series of "x" symbols between pairs of single quotes or double quotes, such as "x" symbol strings 808 and 810 in FIG. 8A indicating the values corresponding to keys "k1" and "k2." The values may be any alphanumeric symbol string and the key names may also be arbitrary alphanumeric symbol strings.

FIG. 8B illustrates a JSON-encoded event message that is generated by a data-collection subsystem, transmitted to a consolidation system for storage, and pulled from storage and transmitted to the processing center. A JSON-encoded event message includes a "meta" object 812, previously discussed with reference to FIG. 7, and a "data" object introduced by the symbol string "data" 814 and including key/value pairs and objects within the bracket pair 816-817. A "data" object may include key/value pairs, such as key/value pairs 818 and 820, and objects, such as the object named "wt" 822 that includes key/value pairs within brackets 824-825. Key/value pairs may include two symbol strings separated by a colon, such as key/value pair 826 or may comprise a key followed by a colon that is in turn followed by an array of symbol strings, such as key/value pair 828. Arrays of symbol strings are delimited by square brackets, such as the pair of square brackets 830. Event messages generally include a "meta" object and a "data" object.

FIG. 8C illustrates an enriched event message that is produced within the processing center (510 in FIG. 5). An enriched event message includes a "meta" object 840, a "data" object 842, and an "ext" object 844. The "ext" object includes three lower-level objects "geo" 846, "device" 848, and "browser" 850. The geo object contains key/value pairs that describe the geographical location of a user/processor-controlled user appliance. The device object 848 includes key/value pairs that characterize the user/processor-controlled appliance. The browser object 850 includes key/value pairs that characterize the type of browser used by the user. The data values included in the "ext" object 844 are derived from the data values included in the "meta" and "data" objects as well as additional calculated values and data sources accessible to the processing center and used for event-message enrichment. Many types of enrichments are possible. For example, an enriched event message may include indications of the current weather at a user's location, the size of the town or city in which the user is located, public data related to the user, and many other types of information.

FIGS. 8D1-D3 illustrates a session message. A session message is a higher-order message that includes session information as well as a "session_summary" object and an array of "event" objects. The "meta" object 860 is the same as the "meta" object in previously described event messages. A number of key/value pairs 862 describe session-related information. The "session_summary" object describes the number of events included in the session message and other information related to the session 864. Finally, the key/array pair "events" 866 includes the traditional enriched-event data for each of a series of events.

The data within a JSON-encoded data message may alternatively be described using a hierarchical notation. The alternate hierarchical notation for the extended event message shown in FIG. 8C is provided in FIG. 8E. The keys within the "meta" object are specified by strings that begin with the substring "meta" 870. The keys contained in the data object 842 are specified with strings that begin with the substring "data" 872. The keys contained within the "ext" object 844 are specified by symbol strings that begin with the substring "ext" 874. Periods are used to delimit hierarchical levels. For example, there is only a single hierarchical level within the meta object and thus all of the keys within the meta object of FIG. 8E include a single period between the substring "meta" and the names of the keys of the key/value pairs contained in the meta object. By contrast, the keys that occur within the "wt" object that, in turn, lies within the "data" object 842 include two periods 876 to indicate two hierarchical levels. The hierarchical key names shown in FIG. 8E can be thought of as the names of variables, and the corresponding values are the values stored in the variables.

Figure 9A:
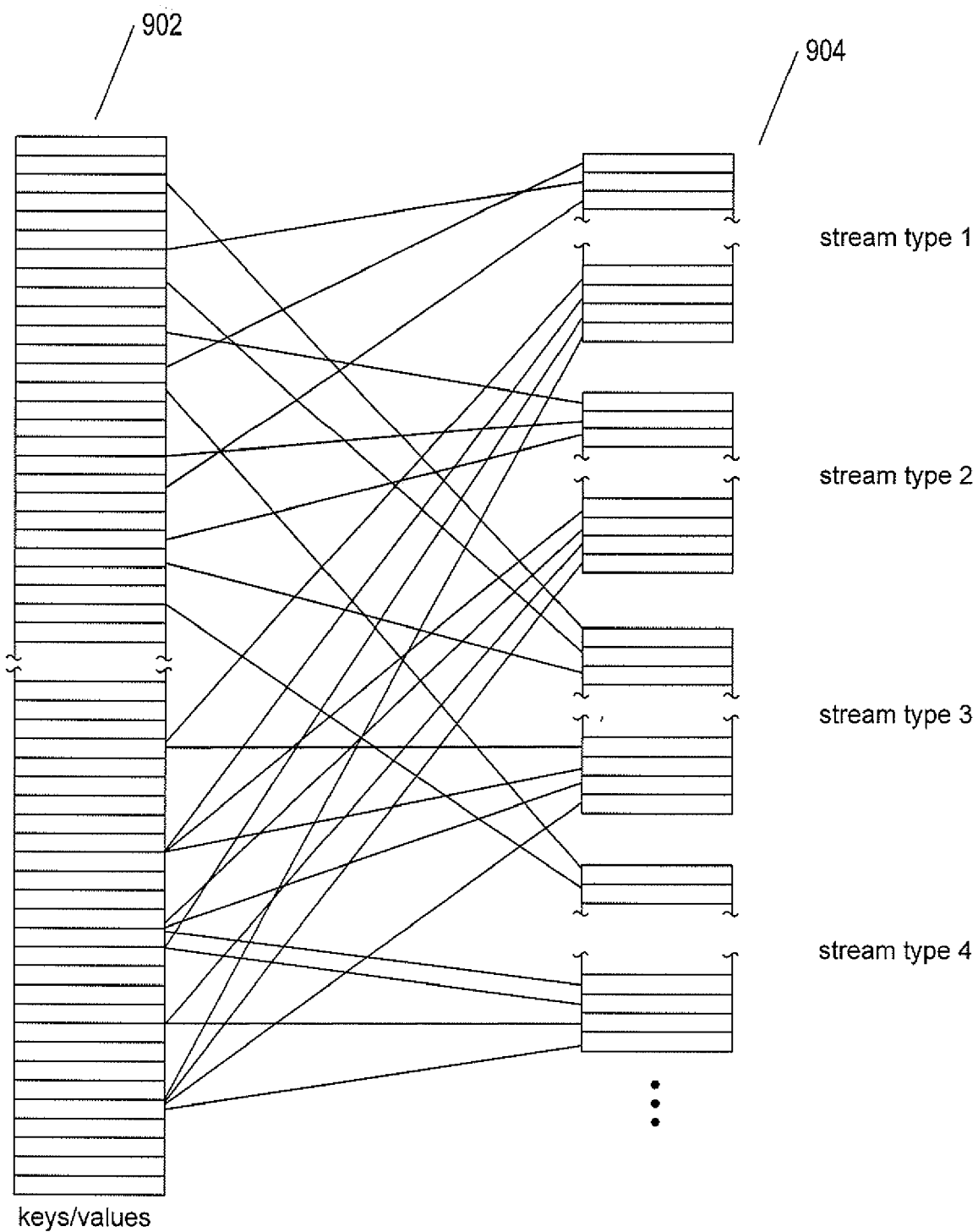
FIGS. 9A-B illustrate the data that is collected by instrumentation and eventually passed to consumers of data messages produced by the processing center.
Figure 9B:
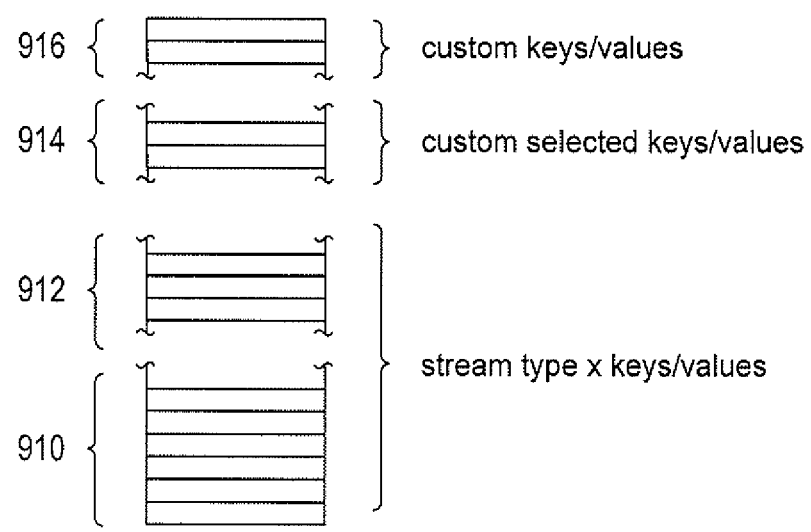

FIGS. 9A-B illustrate the data that is collected by instrumentation and eventually passed to consumers of data messages produced by the processing center. In FIG. 9, a left-hand column 902 represents a very large number of different types of data values that may be collected within a script executing within an execution environment provided by a web browser by instrumentation code. Each cell within the column represents a different data value. Almost any type of data value that can be accessed from the script or computed by the script is a candidate for data collection by instrumentation. The data values may be values produced by system calls, such as a call to a system-time routine or a call to retrieve the IP address of the computer within which the web browser is executing. Other values include data values that indicate a particular state of a displayed web page within the context of a web site, such as indications of pages, sections, and subsections currently accessed by a user, indications of various types of input events to web pages, indications of other web sites through which a user passed in navigating to the current web site, information requested by and displayed to a user, and many other types of information related to a user's interaction with the web site. The data values are named hierarchically, as discussed above with reference to FIG. 8E, or, equivalently, associated with key symbol sequences encoded within a JSON-encoded message. In either case, each data value is uniquely named and can be extracted from the parameters within a URL passed to a data-collection subsystem by a web browser executing on a remote user computer.

As discussed above, with reference to FIG. 7, a client of the real-time, processed-data streaming system may open up a communications socket to receive a stream of processed data messages. Different types of streams may be requested. As shown in FIG. 9, each different stream type, such as stream type 1 904, represents a subset of the data values that may be collected by instrumentation. Each different stream type therefore identifies a different subset of data values and therefore represents a type of data filtering that results in streaming only a desired subset of the possible data types to a particular client through a particular communications socket, rather than streaming all possible collected data and requiring the client to expend communications and processing bandwidths to receive and process a large amount of data in each data message in order to obtain a desired subset of the data values.

FIG. 9B illustrates the types of data values that may be included in a data message streamed to a client. These data values may include a set of data values common to all data messages 910, a set of data values unique to a particular stream type 912, additional, custom-selected data values selected from the set of data values represented by column 902 in FIG. 9A 914, and additional data values specified by a particular client 916. In the case of the latter data values, instrumentation is modified in order to collect the client-specified data values 916 not included in the data values that may be collected by existing instrumentation within the real-time, processed-data-streaming service, represented by column 902 in FIG. 9A.

Figure 10A:
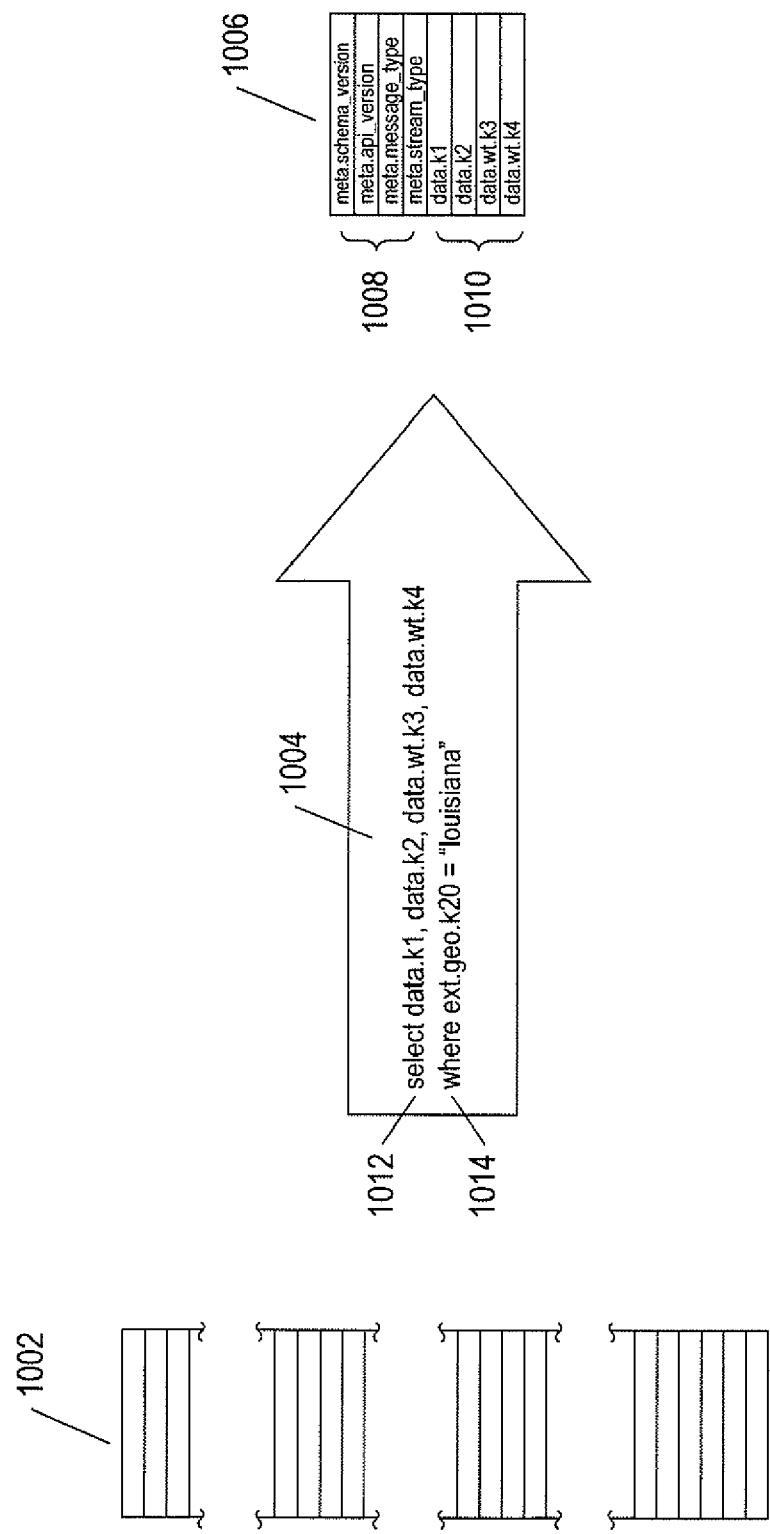

FIGS. 10A-B illustrate query-based filtering of the data stream by the processing center prior to directing the data stream to a client application. In FIG. 10A, the collection of data values that together represent those data values specified by a stream type as well as by custom selection or definition by a client are represented by column 1002, as they are represented in FIG. 9B. The processing center applies a client-specified query 1004 to each data message, prior to transmitting the data message into the stream of data messages directed to a client. The query represents a second-level filter that may filter out entire data messages or portions of data messages. In the example shown in FIG. 10A, as a result of query 1004, the final data message 1006 added to the stream directed to the client includes only the meta-object data values 1008 and four additional data values 1010 selected by the query 1004. Queries may include a "select" clause, a "where" clause, or both a "select" and a "where" clause. Query 1004 includes a "select" clause 1012 that selects four specific data values to include in data messages streamed to the client as well as a "where" clause 1014 that filters out data messages other than data messages that contain the data value "louisiana" associated with the key "ext.geo.k20."

FIG. 10B illustrates a number of different queries. The query 1020 selects all data values included in incoming data messages of a particular stream type and selects all of the incoming data messages, since there is no "where" clause associated with the query. The "*" symbol, in a query, is a wild-card symbol and, in query 1020, stands for all possible keys. Query 1022 selects a number of specific data values to include in data messages streamed to the client who issued the query in a connection request. Query 1024 is similar, but selects, using the wild-card symbol, all of the data values in the object "data" and the object "geo" within an event message. Query 1026 selects specific session-related data values and all of the events within a session message, but only for those session messages that represent a complete session, as specified by the "where" clause "where session.closed='true.'" Query 1028 includes only a "where" clause and selects only closed session messages that represent sessions in which users did not purchase anything from a web site. The query language is SQL like, supporting a variety of Boolean connectors, parentheses, comparison operators, and other common SQL-like query language features. Thus, the processing center represents a first level of query processing that may occur in the QAAS system.

Figure 11:
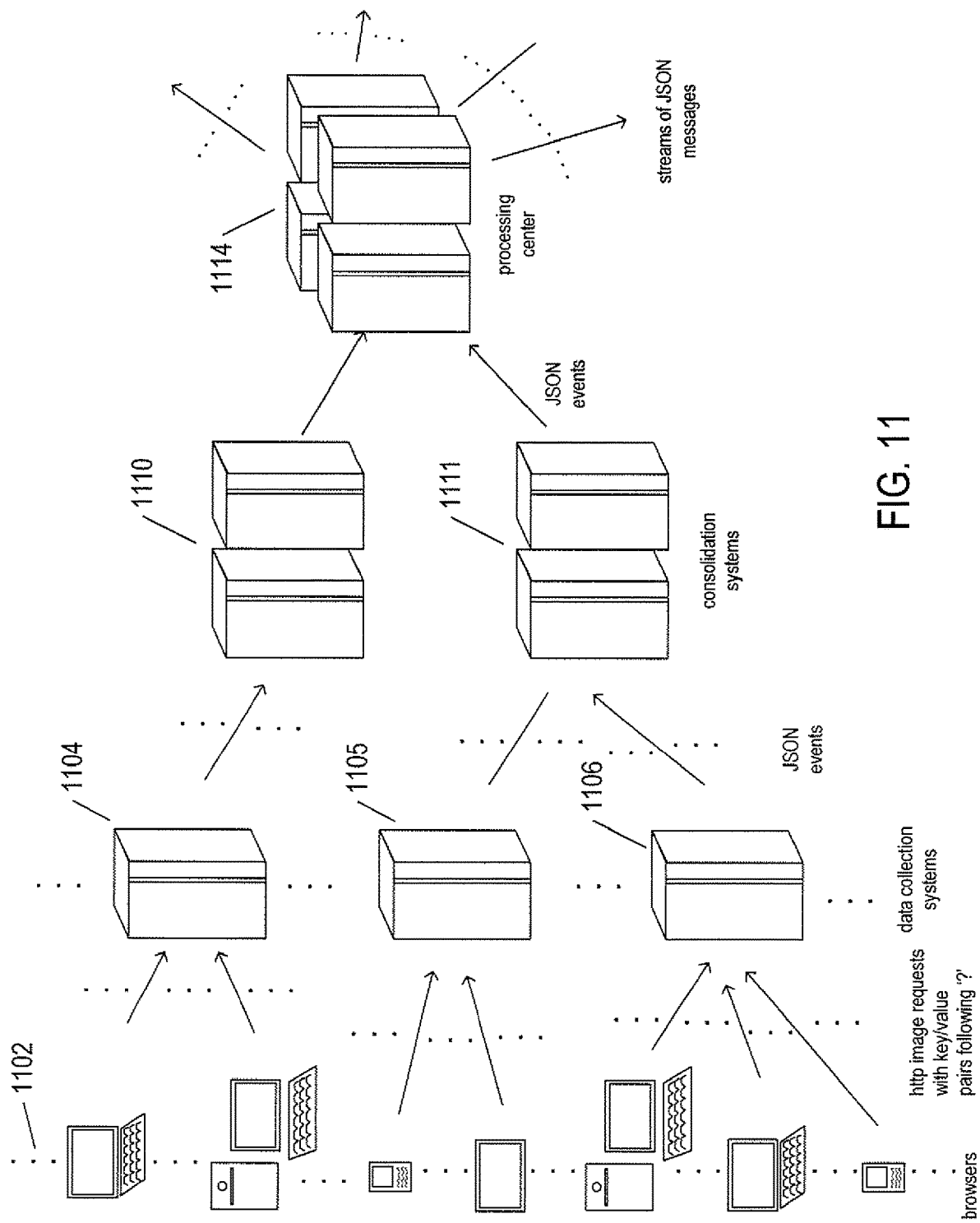
FIG. 11 illustrates, in a fashion similar to FIG. 5, an example of the real-time, processed-data streaming subsystem.

FIG. 11 illustrates, in a fashion similar to FIG. 5, an example of the real-time, processed-data streaming subsystem. As discussed previously, data collection occurs within HTML files or scripts executed by browsers running within the remote processor-controlled user appliances shown in column 1102. Web browsers make HTTP requests for resources, specified by URLs, that are directed to various different geographically dispersed data-collection subsystems 1104-1106. Listener processes within the data-collection subsystems receive the parameter string following the "?" symbol in the URL specification of a resource, generate, from the key/value pairs in the parameter string, a JSON-encoded event message, and transmit the JSON-encoded event messages to a consolidation system 1110 and 1111.

In one implementation, the consolidation systems comprise a large number of servers that execute, in a distributed fashion, the Kafka distributed messaging system. Kafka is a distributed messaging system developed for collecting and delivering high volumes of log data with low latency. Kafka processes streams of incoming messages, dividing the incoming messages into messages belonging to each of a number of categories, referred to as "topics." The real-time, processed-data streaming subsystem may, for example, partition collected data into topics that each corresponds to a different client organization. Kafka further partitions topics into topic partitions, each of which comprises a set of segment files stored in memory and/or mass-storage devices. Kafka also defines brokers, which are distributed processes, each of which may process incoming messages for a particular set of topics and topic partitions. Messages are input to Kafka by producers, and thus the data-collection subsystems represent the producers. The Kafka system aggregates the incoming messages for each topic and stores the messages in segment files for subsequent retrieval by consumers. The processing center or processing centers 1114 are the consumers of messages consolidated by the Kafka distributed messaging system. Incoming messages are appended to a current in-memory segment file. Once the segment file fills up, it is flushed to mass storage, at which point the messages are made available to consumers. Kafka stores messages for a defined period of time, often on the order of a week.

During that time, consumers may repeatedly access messages. In general, the Kafka distributed message system acts as a kind of very large input/output queue, with the lag time between message input and message consumption on the order of seconds or fractions of seconds, when used in the real-time processed-data streaming system.

In one implementation, the real-time processed-data streaming system employs a Storm big-data processing system within the processing center. Storm is an open-source system originally developed for handling Twitter messages. Storm is fully distributed and features high performance, fault-tolerance, and guaranteed message processing. The conceptual model for Storm is a graph representing interconnections between spouts, which are data sources, and bolts, which are data-processing entities. Spouts pull data messages from the consolidation systems and pass the data messages on to one or more bolts, each of which performs processing activities, including enrichment, query filtering, and other such processing. The spouts and bolts are interconnected by communications paths, with the furthest-downstream bolts emitting processed data messages through communications sockets to client applications.

Figure 12:
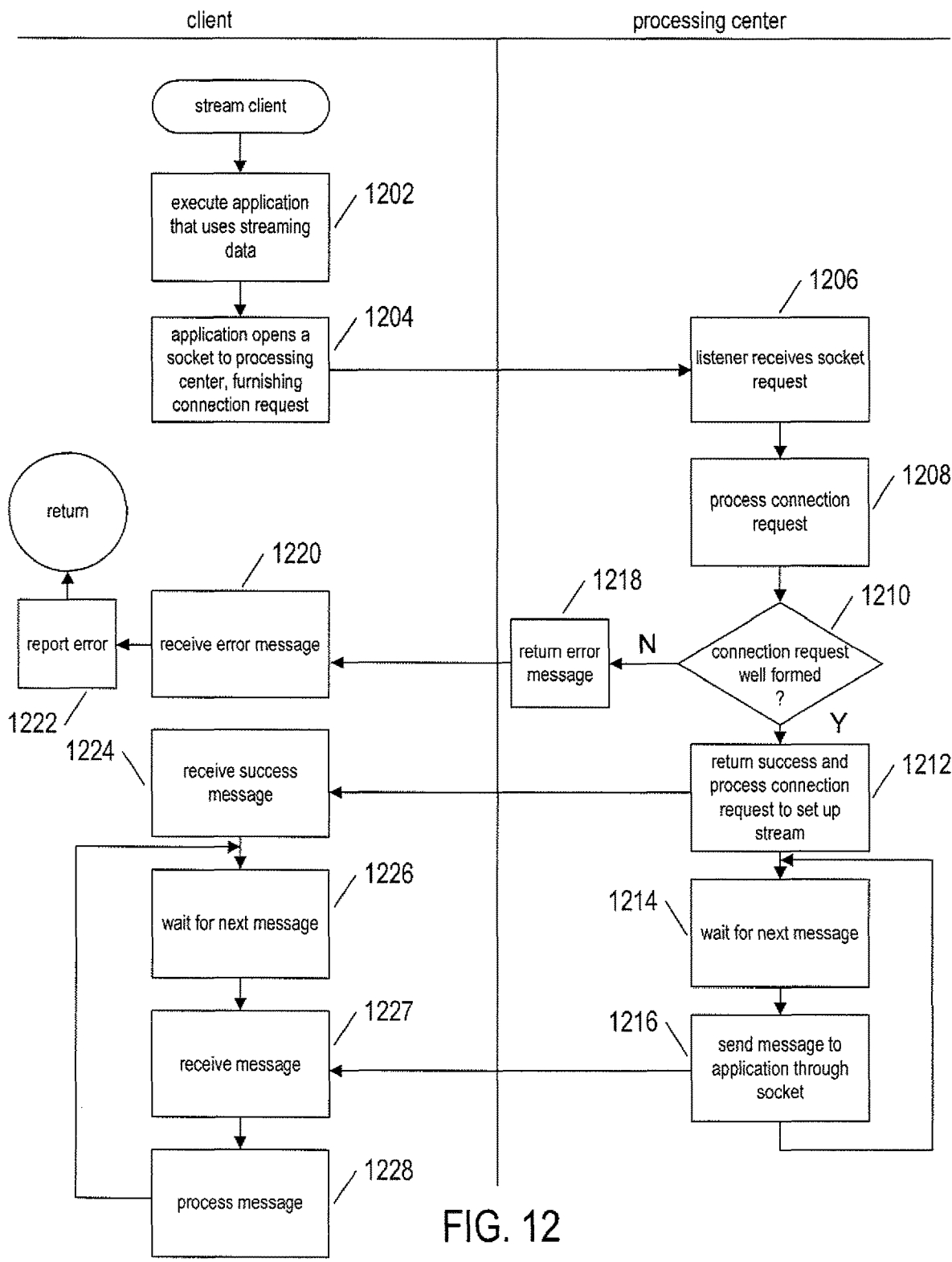
FIG. 12 illustrates the interaction between a client of the data-streaming system and the processing center in the implementation shown in FIGS. 5 and 11.

Next, operation of the real-time processed-data streaming system is discussed with reference to numerous control-flow diagrams. FIG. 12 illustrates the interaction between a client of the processed-data-streaming subsystem and the processing center in the implementation shown in FIGS. 5 and 11. As discussed above, the client is generally an application program that runs on a client computer system and that renders incoming, streaming processed-data messages for visual display in the context of a monitor display or console display. In FIG. 12, client activities are shown on the left-hand side of the diagram and processing-center activities are shown on the right-hand portion of the diagram. In step 1202, the client executes the application program that uses streaming data. In step 1204, the application program executes an open-socket command, furnishing to the command a JSON-encoded connection request, as discussed above with reference to FIG. 7. In step 1206, a listener process within a processing center receives the socket request and, in step 1208, processes the connection request. Processing involves authorizing the access using the access token supplied in the connection and parsing the connection request. When the connection request is well formed, as determined in step 1210, then, in step 1212, the processing center processes the connection request to set up a stream of processed-data messages for transmission to the client application through the communications socket. This may involve initializing data structures, launching one or more streaming processes, and other such initialization activities. Then, in the continuous loop of steps 1214 and 1216, the one or more streaming processes wait for a next processed-data message for transmission through the communications socket to the application program, in step 1214, and transmit the message to the application program in step 1216. Otherwise, in step 1218, when the connect request is ill-formed, the processing center returns an error message to the client. In step 1220, the client application receives the error message and, in general, reports the error to a client user or administrator, in step 1222. In certain cases, the application program may attempt to correct or change the connection request and resubmit it, automatically, in a new connection request in order to continue execution. When the processing center returns a success message, in step 1212, the client application receives the success message in step 1224 and then enters a continuous loop in which the application program waits for a next processed-data message, in step 1226, receives the message in step 1227, and processes the message in step 1228. As discussed above, processing of processed-data messages generally results in an update of the internal application state and internal data that is either immediately or subsequently reflected in changes in the control display or monitor display viewed by a client user.

Of course, in actual implementations, multiple different cooperating processes may collaborate to carry out the activities described with reference to FIG. 12. Furthermore, any of many different buffering techniques, asynchronous-event handling techniques, and other techniques may be employed to implement stream processing both in the processing center and in the client computer system.

FIGS. 13A-B provide an example of the instrumentation inserted within a web page that carries out data collection. The data collection is initiated, from a web page, by a script (1302 in FIG. 13B) embedded within an HTML file that specifies a particular web page displayed to a user. The script creates a new tag object 1304 and then calls a "dcsCollect" tag member function to collect data and transfer the data to a data-collection subsystem 1306. The "dcsCollect" member function 1308 calls a "dcsTag" function 1310. The "dcsTag" function 1312 creates a URL for a one-pixel resource image and then embeds in the URL, following the "?" symbol, a list of key/value pairs. The URL is contained within the symbol-string variable P which is passed to the "dcsCreateImage" routine 1314. The "dcsCreateImage" routine 1316 makes an assignment to an image variable 1318 which is processed by the browser by using an HTTP request and the URL created by the "dcsTag" routine to fetch the one-pixel image. The one-pixel image is not used for display, but is merely a vehicle for transmitting the key/value pairs encoding in the parameters within the URL to the data-collection subsystem.

It should be noted that the data collected by instrumentation is unstructured. The value of a key/value pair can be an arbitrary symbol string or an array of symbol strings. Multiple values may be later combined to create longer symbol strings. The data collected is specified by the instrumentation code or circuitry. The data processing, query-based filtering and selection of data, and data enhancement generally take place downstream, in a processing center or other system remote from where the instrumentation is executed to collect data. There are many advantages to downstream data processing, including the ability of the processing center to emit many different types of data streams from a common collection of data, separately applying different types of queries, filtering, and enhancement to the collected data to generate separate data streams. Furthermore, the instrumentation remains simple and efficient, and does not introduce potentially disruptive computational burdens on processor-controlled user appliances. The data collected via the instrumentation is also relatively independent of the remaining system components. For example, the instrumentation may be modified to collect a new key/value pair, and that key/value automatically ends up passed to data consumers who have not chosen to filter out the key/value pairs using queries. The instrumentation can be, in many cases, modified even while the data is collected and streamed to data consumers. Note that the phrase "instrumentation" refers to code or circuitry that is added to the instructions already present in a working script, routine, program, or circuit. Instrumentation code is added to already functional code and circuitry, in an orthogonal fashion, and is intended only to transmit data to the data-collection subsystem. The term "instrumentation" is used in the same sense that is used to describe special, additional statements added to a program for debugging and optimization purposes.

Figure 14:
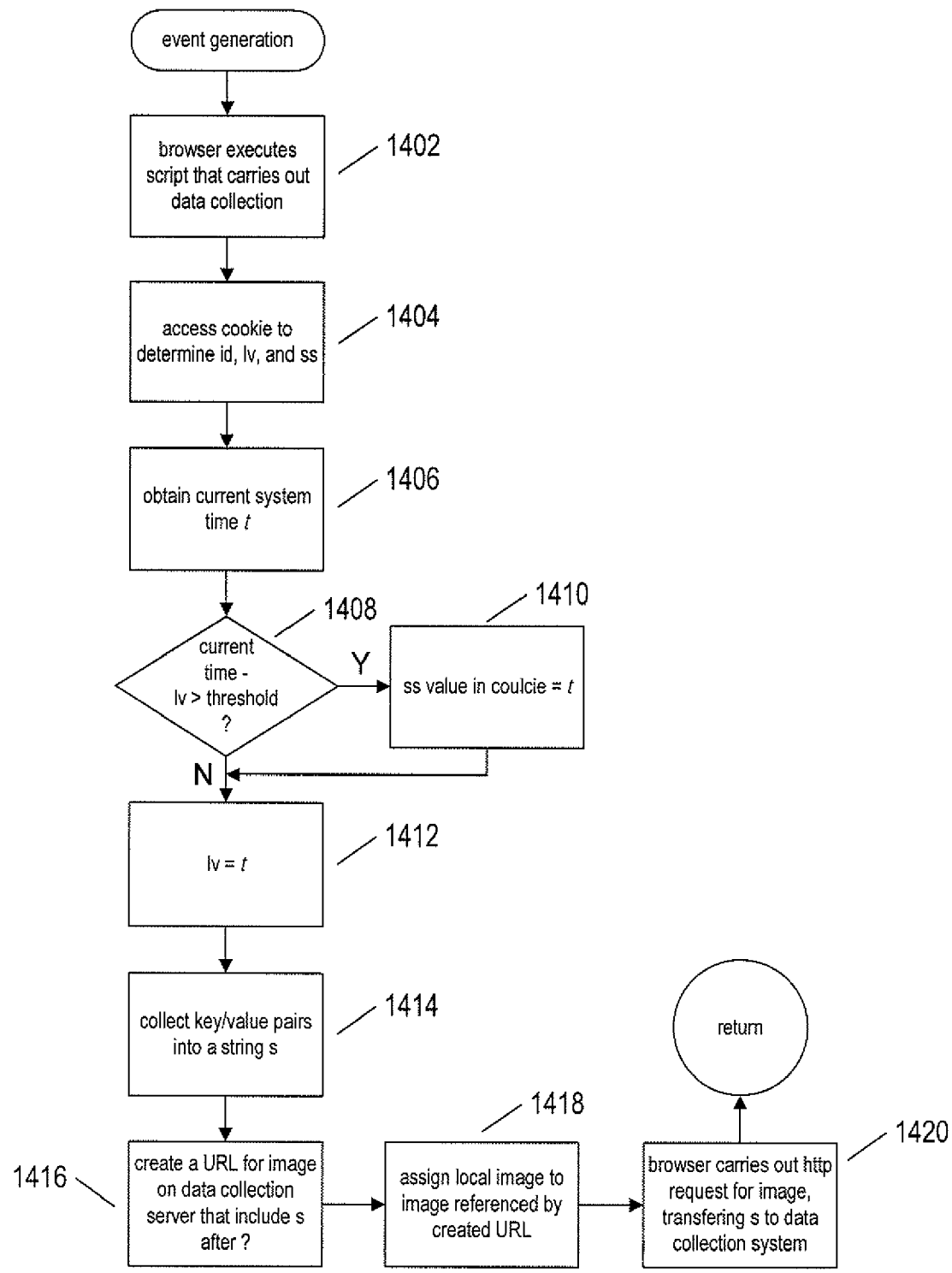
FIG. 14 provides a control-flow diagram that describes the event-generation process within the browser, discussed above with reference to FIGS. 13A-B.

FIG. 14 provides a control-flow diagram that describes the event-generation process within the browser, discussed above with reference to FIGS. 13A-B. In step 1402, the browser executes a script that carries out the data collection. In step 1404, the data-collection code accesses the cookie stored within the processor-controlled user appliance to determine the identifier, last-visit, and session-start values, id, lv, and ss, discussed above with reference to FIG. 6. In step 1406, the browser script obtains the current system time t. When the difference between the current time t and the value lv is greater than a threshold value, as determined in step 1408, then, in step 1410, the value ss stored in the cookie is set to the current system time t to indicate start of a new session. As discussed above, and further discussed below, a session is a group of events related to a particular user/processor-controlled user appliance that all occur within a specified time window. A new session begins when the difference between the current time and the last-visit time stamp is greater than the threshold value. In step 1412, the value lv is set to the current system time t and stored in the cookie. In step 1414, a set of key/value pairs that represent data collected by the instrumentation is collected and formed into a string s that is placed, following the symbol "?," into a URL created for an image resource in step 1416. In step 1418, the browser script executes an assignment or some other statement that results in the browser using an HTTP GET request to fetch the resource specified by the URL from a data-collection subsystem, in step 1420.

Figure 15:
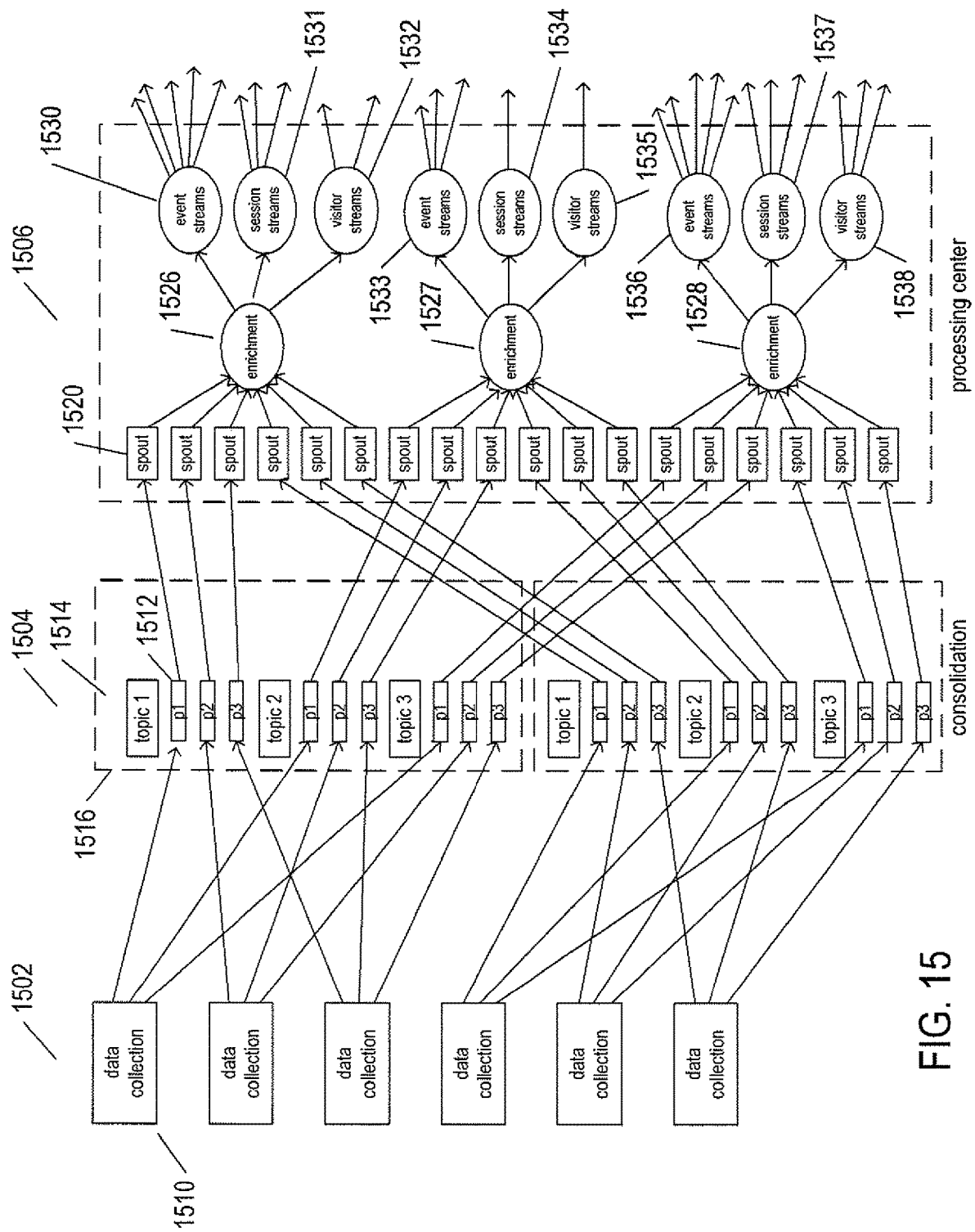
FIG. 15 illustrates one implementation of the real-time processed-data-message streaming system and methods to which the current document is directed.

FIG. 15 illustrates one implementation of the real-time processed-data-message streaming system and methods to which the current document is directed. As discussed above, the system includes a set of data-collection subsystems, represented by column 1502 in FIG. 15, a number of consolidation systems, represented by column 1504 in FIG. 15, and one or more processing centers, represented by column 1506 in FIG. 15. Each data-collection subsystem, such as data-collection subsystem 1510, transmits event messages to a particular partition within each topic of a particular consolidation system, such as partition 1512 within topic 1514 of consolidation system 1516. In general, the data-collection subsystems may collect data for each of multiple clients/topics. Within the processing center 1506, a spout is associated with each partition within a data-consolidation subsystem, such as spout 1520 associated with partition 1512. The spouts pull event messages from the consolidation systems and emit them to first-level enrichment bolts 1526-1528. The enrichment bolts may carry out a coarse, general filtering and also compute and determine the various enrichment values that are added to an event message to create an enriched event message. The enriched event messages are then passed from the enrichment bolt 1526-1528 to downstream bolts 1530-1538. Each enrichment bolt 1526-1528 is associated with a particular client. Clients may receive a stream of enriched event messages from an event-streams bolt, such as event-streams bolt 1530. The event-streams bolt carries out query-based filtering specific for particular clients prior to emitting a stream of enriched event messages through open sockets to client applications. Session-stream bolts, such as session-stream bolt 1531, carry out additional processing to group data extracted from enriched event messages into session messages, and emit session messages through communications sockets to client applications. Visitor-stream bolts, such as visitor-stream bolt 1532, also aggregate and process enriched event messages to generate visitor data messages, which describe the activities of particular visitors, in real time, within a web site. Other types of bolts produce other types of processed-data messages. These other types of bolts may perform various types of data aggregation to allow a client application to display various types of aggregate and collective data representing, in general, multiple events associated with multiple web-site users. In certain systems, when the data collected for a particular session exceeds a threshold amount, the session if partitioned into two or more different sessions, to facilitate downstream processing.

Many other collections of component systems, organizations of component systems, and message-passing topologies may be used to produce alternative implementations of the real-time processed-data streaming subsystem. Many different topologies may be used within the Storm distributed system for implementing enrichment, filtering, and aggregation.

Figure 16:
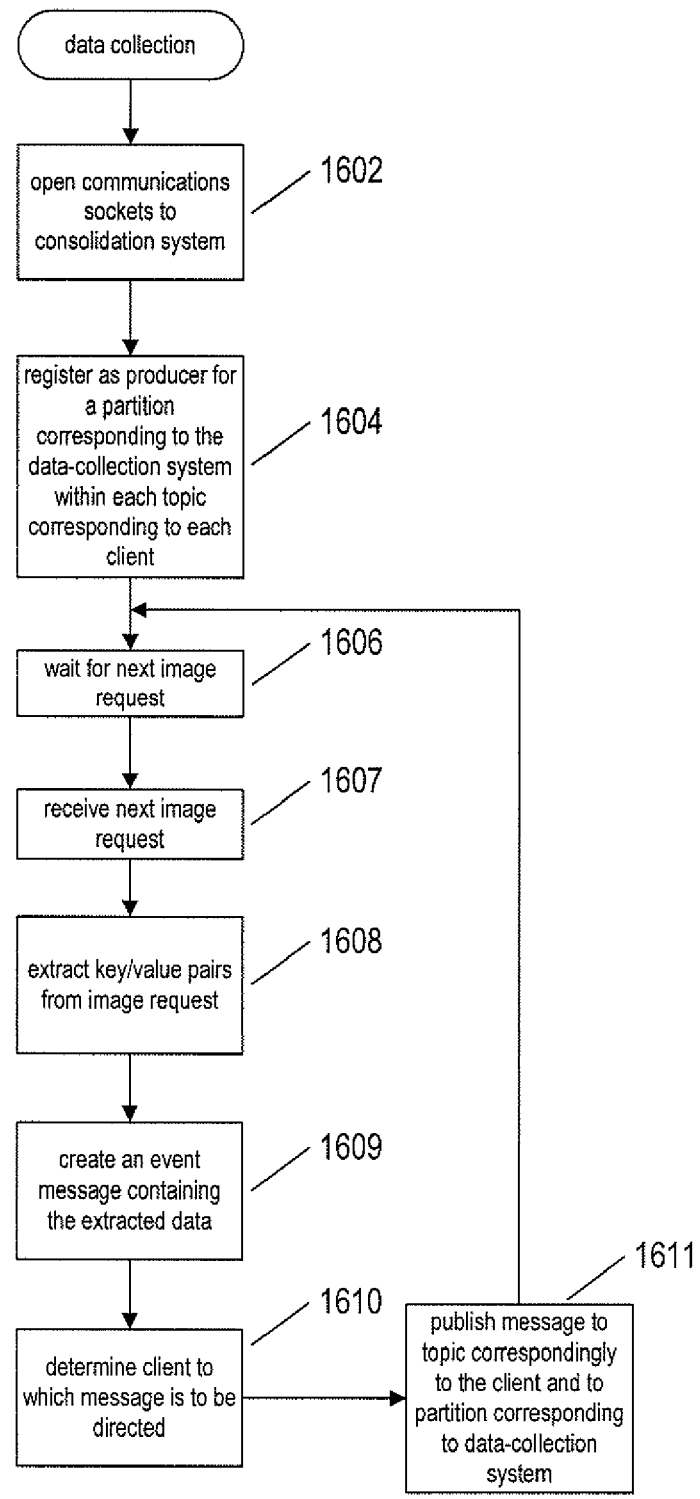
FIG. 16 illustrates operation of a data-collection subsystem.

FIG. 16 illustrates operation of a data-collection subsystem. In step 1602, the data-collection subsystem opens a set of communications sockets to a consolidation system. In step 1604, the data-collection subsystem registers as a producer for a partition corresponding to the data-collection subsystem within each topic corresponding to each client receiving real-time processed-data-message streams. Then, in the continuous loop of steps 1606-1611, the data-collection subsystem waits for a next image request, in step 1606, receives a next image request in step 1607, extracts the key/value pairs from the image request in step 1608, creates a JSON-encoded event message containing the extracted data in step 1609, determines, from the extracted data, the client to which the message is to be directed, in step 1610 and, in step 1611, publishes the JSON-encoded event message to the topic corresponding to the client and to the partition corresponding to the data-collection subsystem within a consolidation system. Note that the waiting step 1606 does not imply, in this control-flow diagram, that a separate wait operation is executed prior to receiving each image request. Instead, when image requests are received continuously, batches of image requests may be processed following each wait operation, similar to the methods by which operating systems field hardware interrupts and invoke corresponding interrupt handlers.

Figure 17:
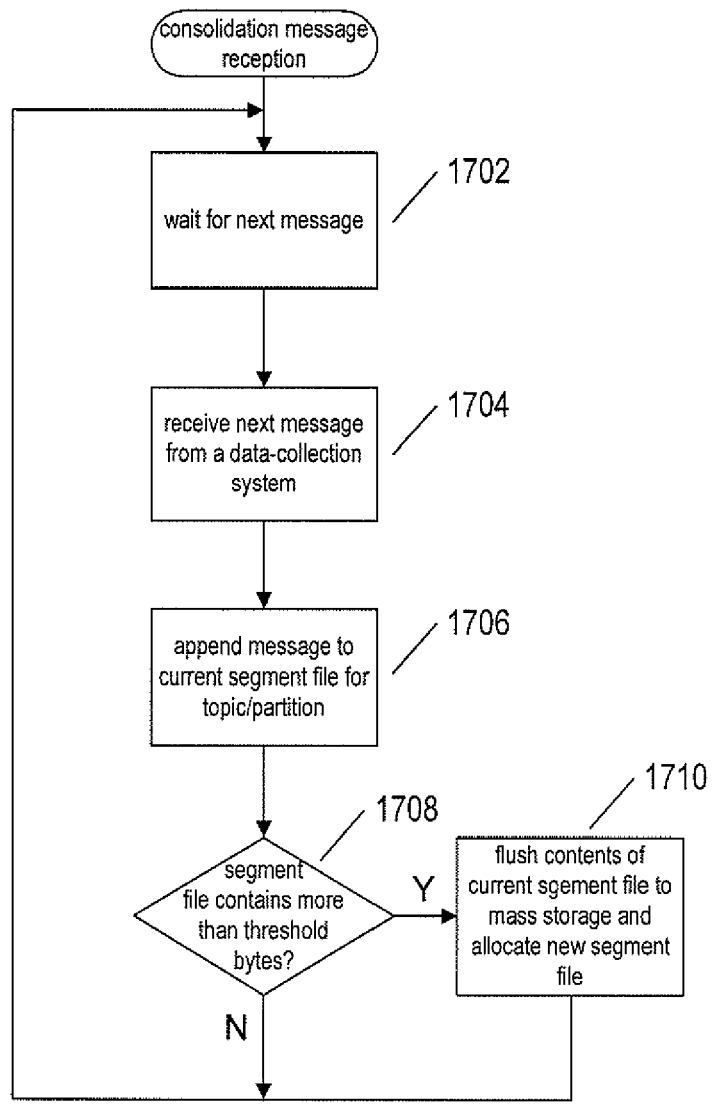
FIGS. 17-18 provide control-flow diagrams that illustrate operation of a consolidation system.
Figure 18:
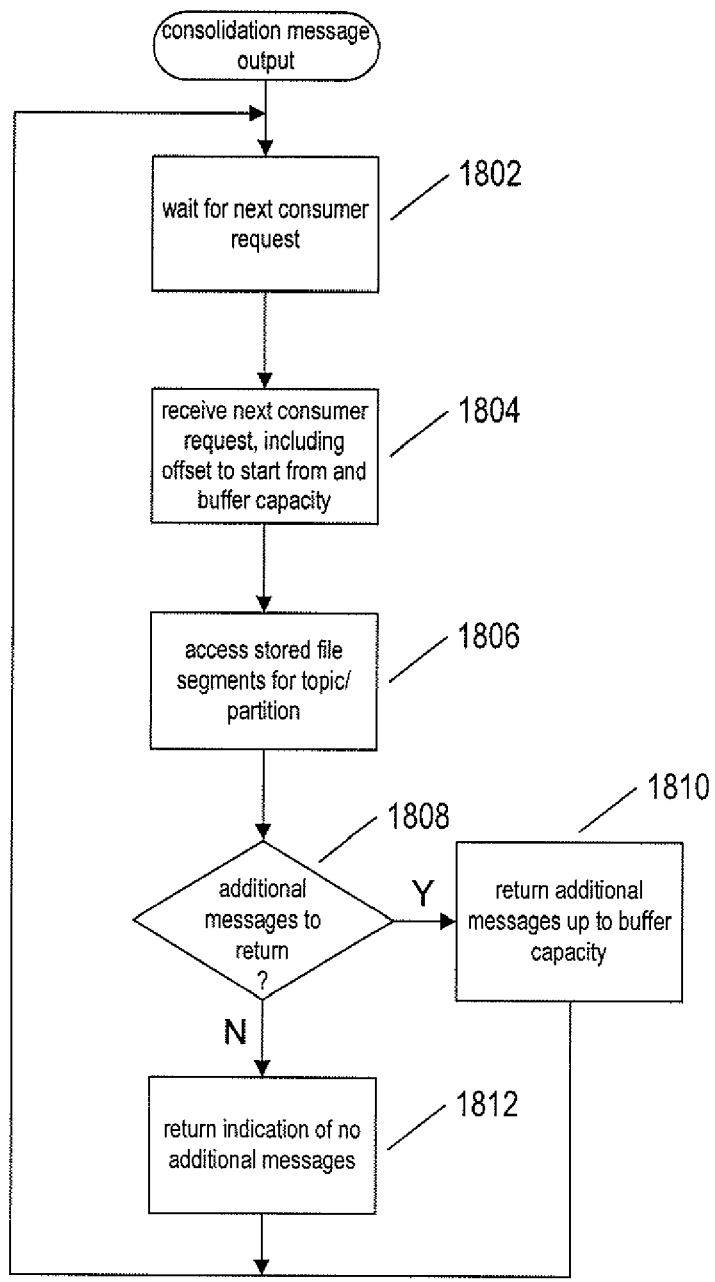

FIGS. 17-18 provide control-flow diagrams that illustrate operation of a consolidation system. FIG. 17 shows a message-reception portion of consolidation-system operation. In step 1702, the consolidation system waits for a next JSON-encoded event message from a data-collection subsystem. Again, as with the data-collection subsystems, actual waiting for message-arrival events may occur only rarely when messages are received continuously by the consolidation system. In step 1704, the consolidation system receives a next JSON-encoded event message from a data-collection subsystem. In step 1706, the consolidation-message system appends the received message to a current segment file for the topic/partition to which the message was directed. The segment file contains more than a threshold number of bytes, as determined in step 1708, and the contents of the segment file are flushed to mass storage and a new segment file allocated for reception of subsequent messages directed to the topic/partition, in step 1710.

FIG. 18 illustrates the output side of a consolidation system. In step 1802, the consolidation system waits for a next consumer request. In step 1804, a next consumer request is received. Consumer requests generally include an offset within a segment file from which to start outputting messages and a buffer capacity of the consumer for storing messages. In step 1806, the consolidation system accesses one or more stored segment files that store messages starting from the offset up to a number of successive messages that would fill the buffer capacity. When there are additional messages stored in those segment files, as determined in step 1808, then additional messages up to the buffer capacity are returned to the requesting consumer in step 1810. Otherwise, an indication of no additional messages is returned to the consumer in step 1812.

Figure 19:
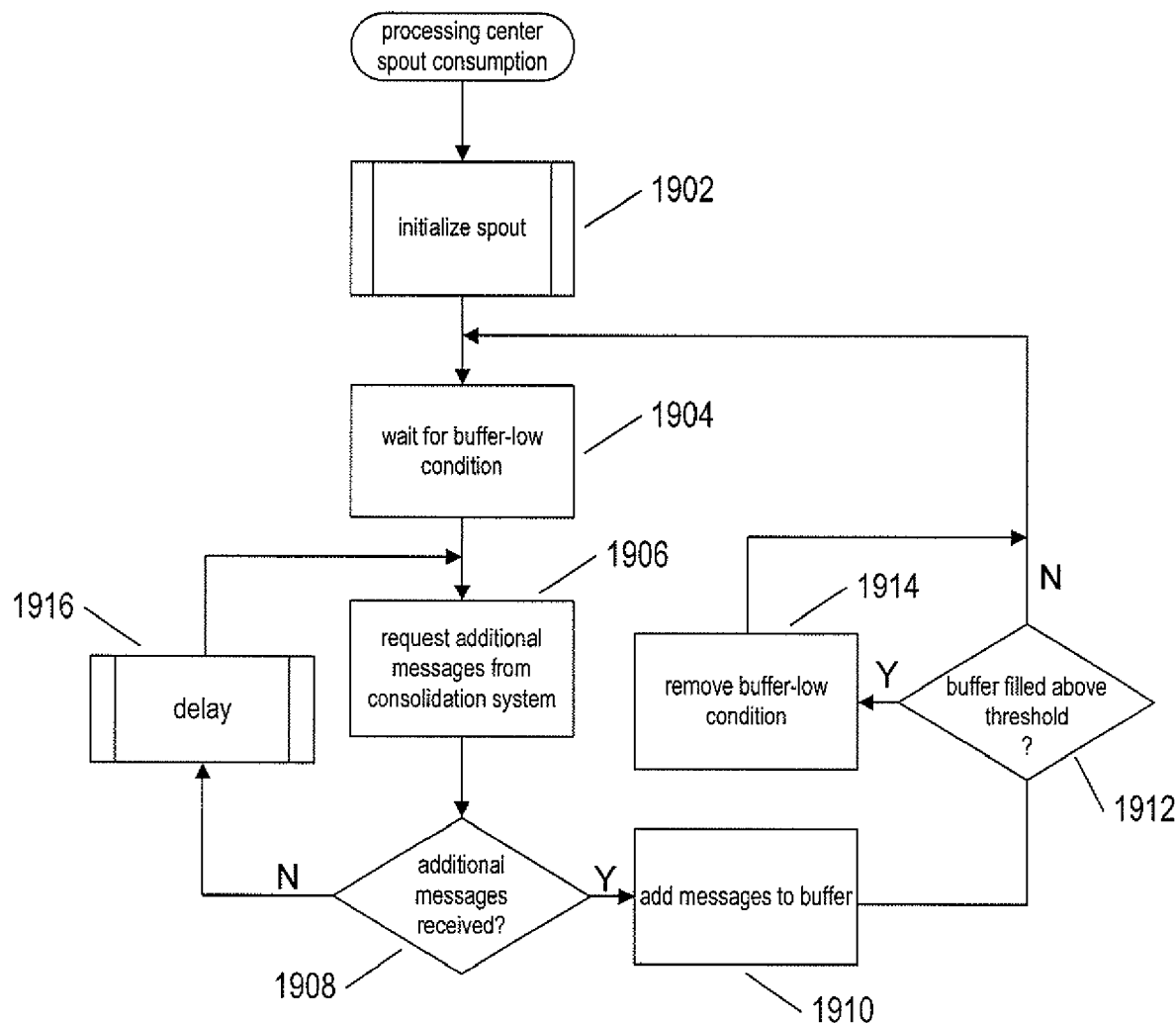
FIGS. 19-23 illustrate operation of the processing center.

FIGS. 19-23 illustrate operation of the processing center. FIG. 19 illustrates spout consumption of JSON-encoded event messages supplied by consolidation systems. In step 1902, the spout is initialized. In step 1904, the spout waits for a buffer-low condition indicating that the spout can solicit and store additional messages. In step 1906, the spout requests additional messages from the consolidation system. If additional messages are received, as determined in step 1908, then the additional messages are added to the buffer in step 1910. When the buffer now contains more than a threshold amount of data, as determined in step 1912, the buffer-low condition is removed in step 1914. When no additional messages are received, then the spout may delay, in step 1916, before again requesting messages from the consolidation system in step 1906.

Figure 20:
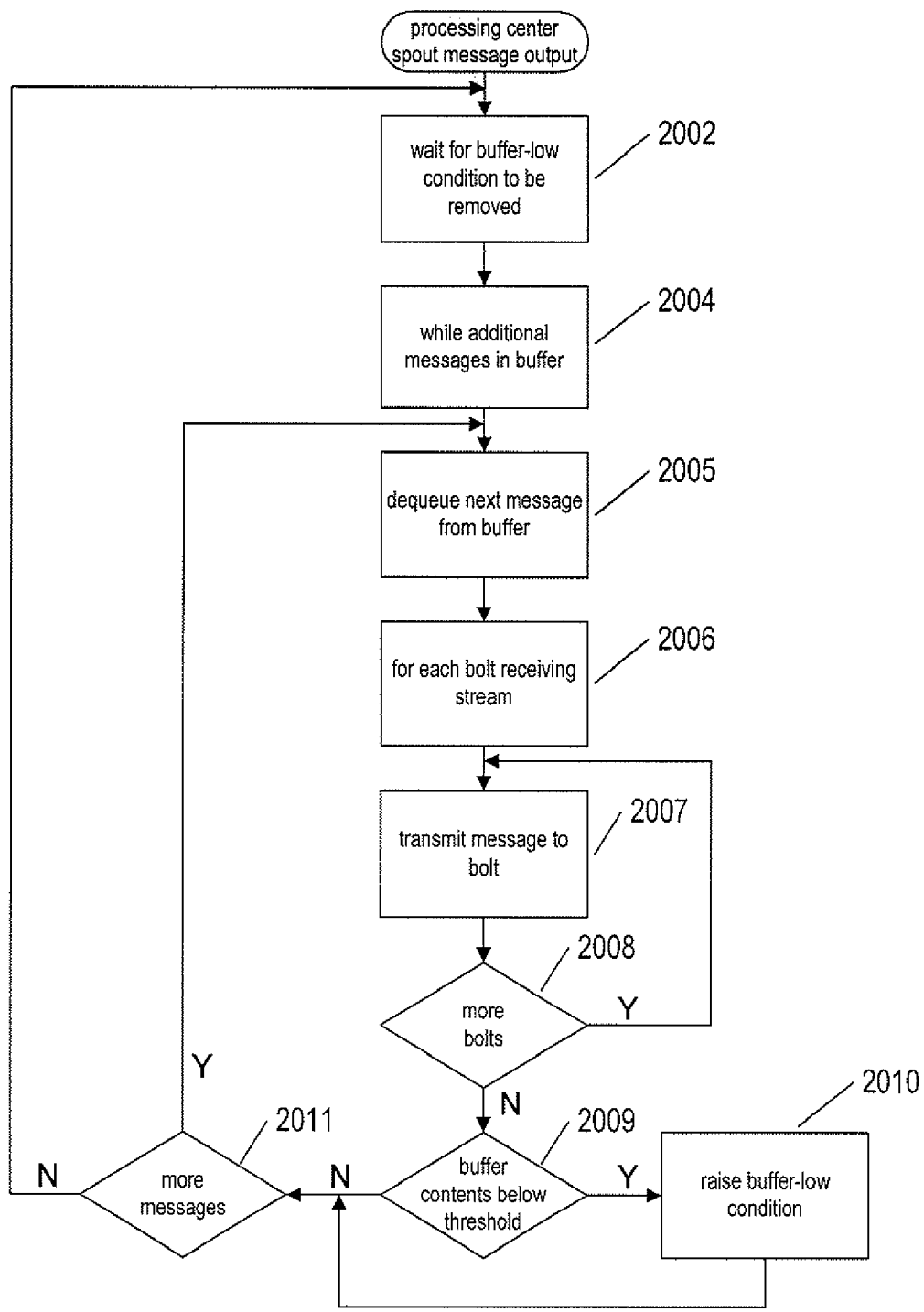

FIG. 20 illustrates the output function of the spout within a processing center. In step 2002, the spout waits for a buffer-low condition to be removed. Then, while there are additional messages in the buffer, the spout carries out the while-loop of steps 2004-2011. In step 2005, the spout dequeues the next message from the buffer and then, in the inner for-loop of steps 2006-2008, transmits the message to each bolt that receives messages from the spout. When the buffer contents are below a threshold value, after processing of the next message, as determined in step 2009, the spout raises the buffer-low condition in step 2010. When there are more messages to retrieve from the buffer, as determined in step 2011, control returns to step 2005. Otherwise, control returns to step 2002.

Figure 21:
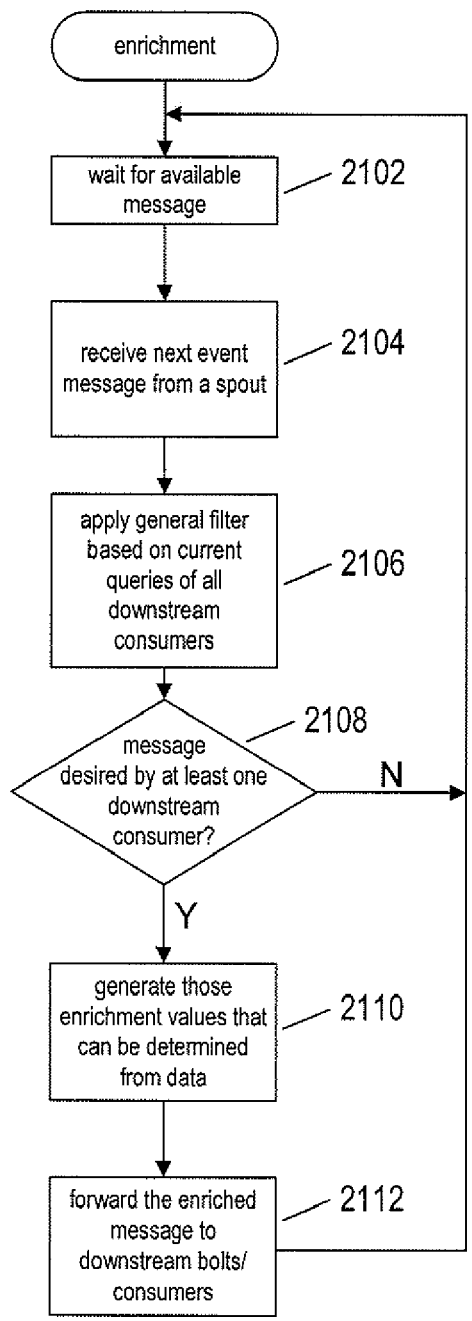

FIG. 21 illustrates operation of an enrichment bolt. In step 2102, the bolt waits for a next available message to process. In step 2104, the bolt receives the next message from a spout. In step 2106, the enrichment bolt applies a general filter based on the current queries for downstream consumers of messages emitted by the enrichment bolt in order to discard messages that would not survive downstream filtering based on specific queries. When the message is desired by at least one downstream consumer, as determined in step 2108, then, in step 2110, the enrichment bolt generates the enrichment values that can be determined from data included in the received event message as well as other sources of information and accessible to the bolt and computation undertaken by the bolt. Following enrichment, in which the generated data values are included in the "ext" object of the enrichment message, the enriched message is forwarded to downstream bolts and consumers in step 2112.

Figure 22:
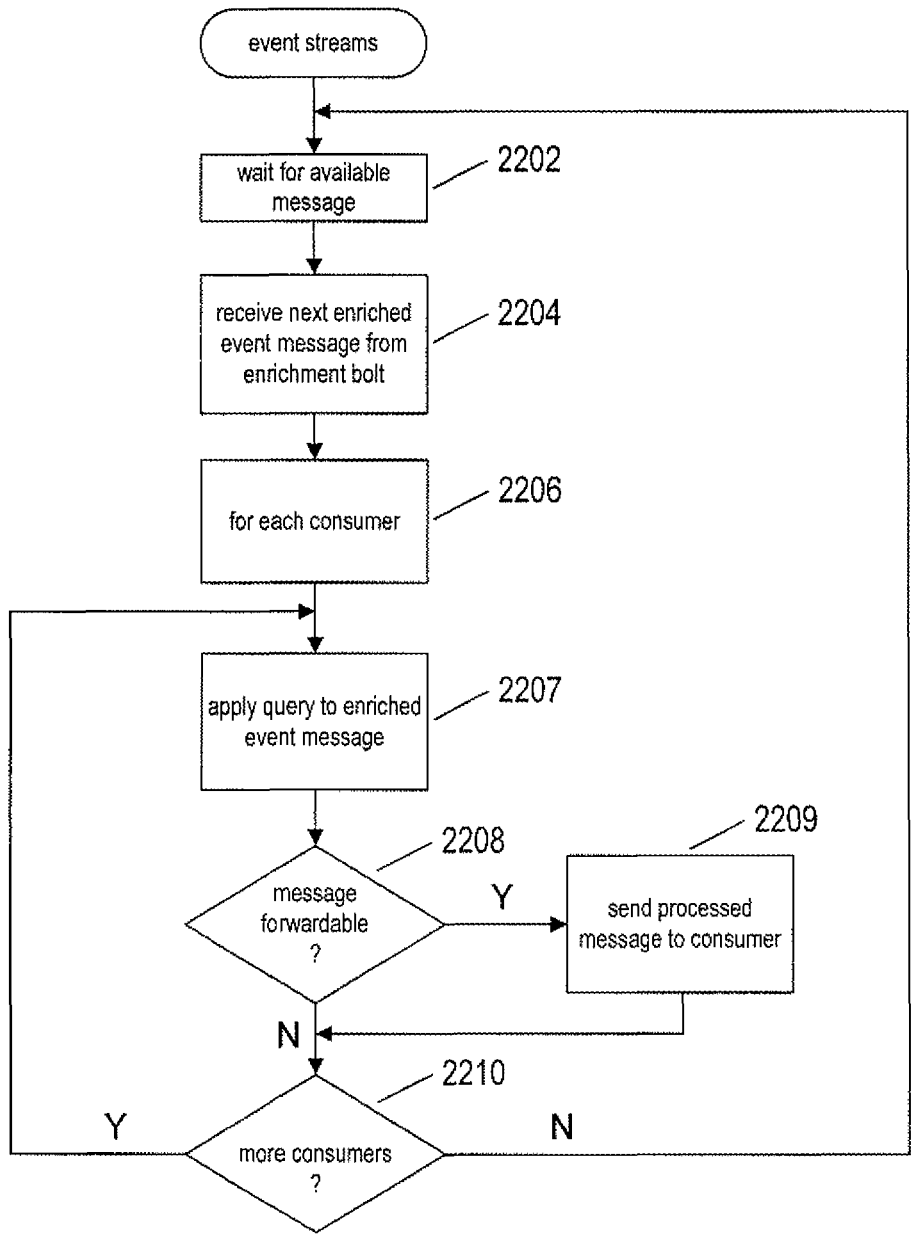

FIG. 22 illustrates operation of an event-stream bolt. In step 2202, the event-stream bolt waits for a next message from an enrichment bolt. In step 2204, the event-stream bolt receives a next enriched event message from an enrichment bolt. Then, in the for-loop of steps 2206-2210, the event-stream bolt applies a consumer-specific query for each consumer to the enriched event message, in step 2207 and, when, following application of the query, the message remains forwardable to the specific consumer, as determined in step 2208, sends the processed and filtered message to the consumer in step 2209.

As discussed above, instrumentation may be modified while data is being collected from remote processor-controlled user appliances and streamed to data consumers. When instrumentation is altered, or modified within a particular remote processor-controlled user appliance to collect new types of data, as one example, and when data collection from the remote processor-controlled user appliance is resumed, the new types of data collected by the instrumentation is directed into the ongoing data-collection, data-consolidation, data-processing, and processed-data stream, without interrupting or reconfiguring the ongoing processed-data stream. In a similar fashion, a query specified by a data-consumer may be modified by the data consumer during data collection from remote processor-controlled user appliances and streaming of corresponding processed data to the data consumer. In certain implementations, an out-of-band query-modification protocol allows a data-consumer to modify a query currently being applied by the data-processing center on behalf of the data consumer. In alternative implementations, the data consumer, while receiving processed data through an initially opened socket, opens a new socket/connection to the data-processing center using a new or modified query, and, once processed begins to be received through the new socket/connection, closes the initially opened socket and carries out, if needed, a temporary de-duplication on processed data received while both the initially opened socket and the new socket were open. This same principle applies throughout the real-time processed-data-message streaming system. Once instrumentation is activated on one or more remote processor-controlled user appliances, data is continuously transmitted from the one or more remote processor-controlled user appliances to one or more data-collection subsystems, from which the data traverses the remaining component systems of the real-time processed-data-message streaming system, finally ending up in one or more processed-data streams. Should a data-collection subsystem be brought down for any of various reasons, data can be automatically rerouted to other or new data-collections systems. Similar considerations apply to the other systems and subsystems within the real-time processed-data-message streaming system. In a case in which all data-processing centers temporarily go offline, the data can accumulate in data-consolidation subsystems and can then subsequently be transferred to a data-processing center that is restarted, without data loss and with only a temporary interruption in processed-data streaming. The various functionalities within each of the components of the real-time processed-data-message streaming system may be modified, on the fly, without interrupting data collection and data streaming, providing that other systems remain functional during modification of the functionality on a particular component system.

Figure 23:
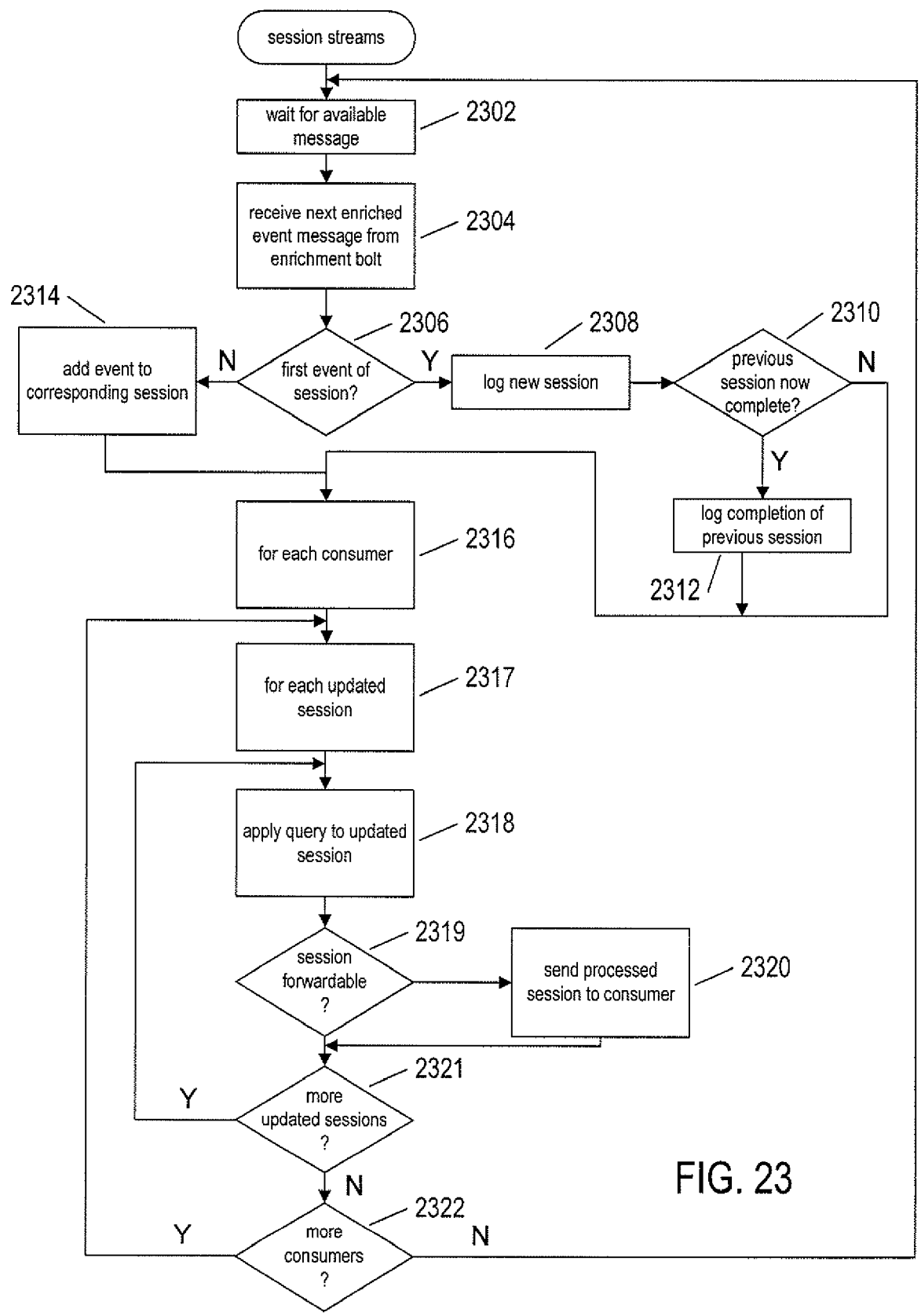

FIG. 23 provides a control-flow diagram that illustrates operation of a session-stream bolt. In step 2302, the session-stream bolt waits for a next available message from an upstream enrichment bolt. In step 2304, the session-stream bolt receives a next enriched event message from the enrichment bolt. When the enriched event message corresponds to the first event of a session, as determined in step 2306, a session-stream bolt logs a new session for the user/processor-controlled user appliance identified by the id value in step 2308. When logging of the new session results in a previous session now being complete, as determined in step 2310, completion of the previous session is logged in step 2312. Otherwise, when the received enriched event message does not correspond to the first event of a session, the data in the received enriched event message is added to a corresponding current session in step 2314. Next, in the nested for-loops of steps 2316-2322, the session-stream bolt considers each updated session currently managed by the session-stream bolt and, for each consumer of session streams, applies the consumer's query to the updated session, in step 2318, to determine, in step 2319, whether the session is forwardable to the consumer following filtering. If so, then a session message corresponding to the updated session is generated and transmitted to the consumer in step 2320. The session-stream bolt may also consider, in a separate loop, those sessions that have not been updated to detect sessions that have terminated due to the elapse of a greater than threshold amount of time, and log those sessions as complete prior to undertaking the nested for-loop of steps 2316-2322.

Figure 24:
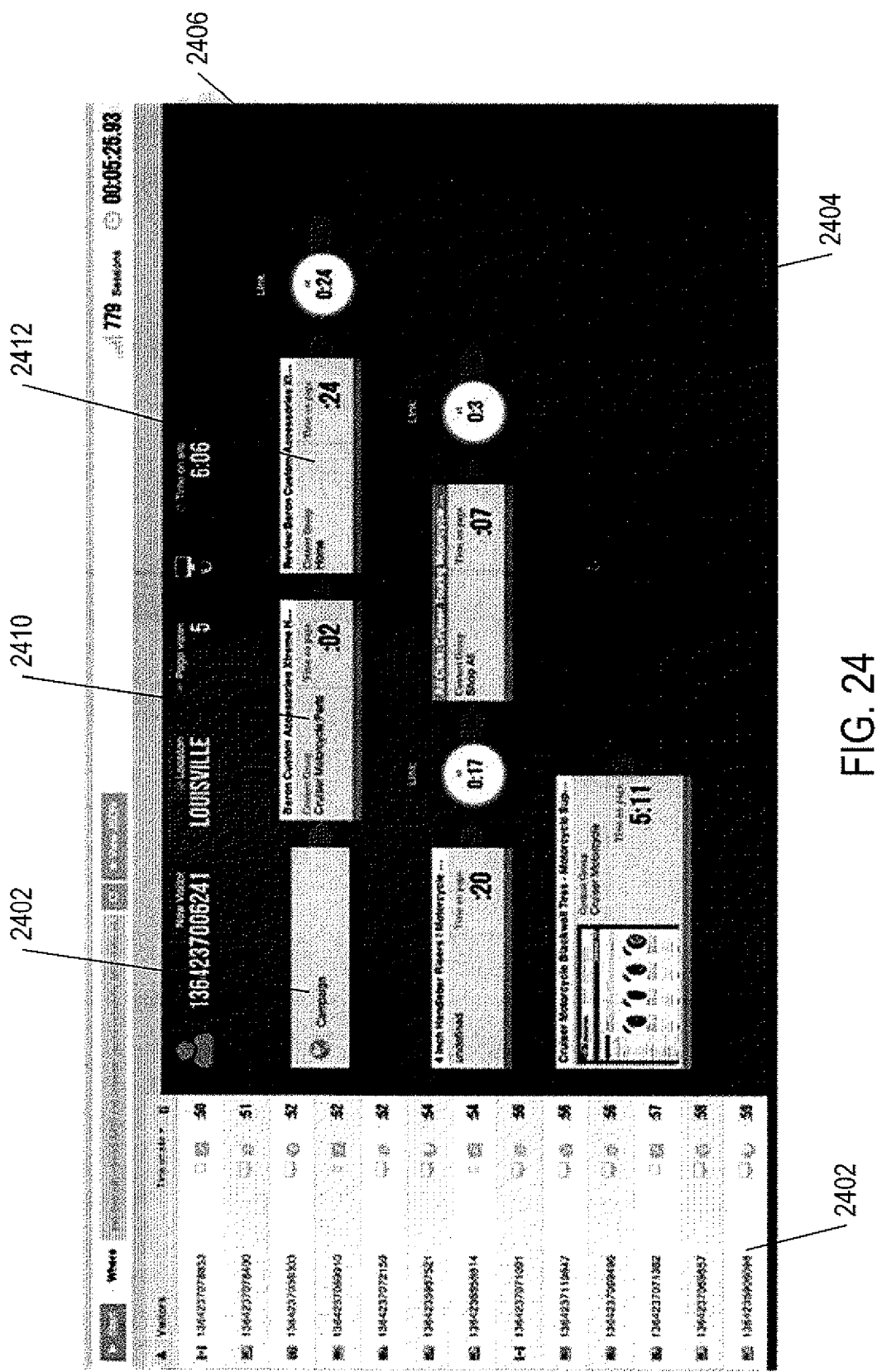
FIG. 24 shows an example monitor display for a web site that visually represents current visitors.

As discussed above, in addition to event streams and session streams, various additional types of streams may be generated by one or more bolts within the processing center and emitted to consumer applications. One such additional type of stream is a visitor stream, which provides information about each current visitor within a web site. FIG. 24 shows an example monitor display for a web site that visually represents current visitors. Current visitors are identified by ID and country in a left-hand column 2402. In a central display panel 2404, progress of a visitor through the web site is graphically illustrated for each of a subset of the current visitors. For example, timeline 2406 illustrates that a particular current visitor arrived at the web site through a campaign 2408, such as an email sent by the website owner to the visitor, initially accessed a Baron custom accessories page 2410, and then, after 24 seconds, accessed a review Baron custom accessories page 2412. A visitor-message data stream thus allows a website owner to, in real time, monitor visitor activities within a web site. This may allow the web site owner to, in real time, alter the content of the web site or produce visitor-specific information to specific visitors in order to direct the visitor to web pages, products, and services that the web site owner may believe to be most conducive for encouraging purchases, as one example.

The real-time processed-data-message streaming system and methods to which the current document is directed provide many additional opportunities for web site monitoring and dynamic adaptation. It is possible that this system and corresponding methods may provide the foundation for providing unique and completely dynamic customer-specific web-site experiences to customers. The real-time data may also provide the basis for many types of predictions and for initiation of actions and processes based on the predictions.

Next, a few examples are provided of various types of queries that provide filtered, processed data streams to support particular types of applications and other data consumers. In certain these examples, a plugin is used for generating data in processor-controlled devices, rather than instrumentation. Plugins may provide significantly more device-side logic and computational complexity than that provided by instrumentation. In general, the processed-data-streaming subsystem is agnostic to how the data is generated by the devices that furnish data for data collection and processing. In many cases, instrumentation provides the lowest impact, easiest to deploy, and easiest to reconfigure source of data for the processed-data-streaming subsystem. However, plugins and other alternative data-generating entities and methods can be used to furnish data to the processed-data-streaming subsystem.

In a first example, an application program consumes streaming data from remote processor-controlled user appliances in order to display a heat map of a web-site web page indicating the frequency of user input to each portion of the web page. In order to produce the processed-data stream for supporting the heat-map display, a heat map plugin is loaded into each of one or more remote processor-controlled user appliances. This plugin tracks mouse movements and sends coordinates of the locations of a mouse-controlled cursor and tracks mouse and/or touch events. The plugin sends the collected information to one or more data-collection subsystems. The real-time processed-data-message streaming system streams the information to the heat-map application, which uses the data to overlay a user-activity heat map on top of page. The data stream is filtered using a query such as:

ANY(ext.geo.region='Oregon' and data.wt.mc_id='10001') AND data.cs-uri-stem='/products/bikes/helmets.asp' which produces a stream of data related to visitors to a target web page where the visitor is from Oregon, the visitor arrived via Campaign ID: 10001, and the visitor is viewing and interacting with the 'helmets' page.

As another example, Facebook application users are monitored, with information about particular types of users returned to Facebook, a monitoring subsystem, or an application-development organization to track application usage and modify or dynamically alter the Facebook application or information used by the Facebook application in order to best serve current Facebook application users. In order to produce the processed-data stream for supporting the modification or dynamically alteration of the Facebook application, a Facebook plugin is loaded into each of one or more remote processor-controlled user appliances. This plugin asynchronously pulls Facebook graph data to include in data sent to one or more data-collection servers and, as each Facebook application page renders and/or each Facebook application click event occurs, sends event and user data to one or more data-collection servers. The real-time processed-data-message streaming system streams data back to make it available for an optimization or application-development system which, in turn, ensure that subsequent Facebook application pages offer more relevance information to particular visitors. The data stream is filtered using a query such as:

ANY (ext.source.name='Facebook' and data.wt.mc_id='10001') AND data.wt.fb.user_gender='m'

This query produces a data stream describing visitors to a target Facebook application where the visitor arrived via Campaign ID: 10001 and the visitor is male.

As yet another example, an organization that has launched an advertising campaign on various websites tracks certain classes of web-site users who arrive at websites through the campaign, such as users who initiate product selection and purchase, but who fail to carry out a purchase. In certain cases, the organization can intervene, in real time, to provide additional information to such users to encourage them to complete transactions. Campaign efficacy for visitors using mobile device campaigns are created with specialized campaign data included on the URL used to reach a particular web site. A visitor clicks on one of these links and arrives on the web site using a mobile device and then proceeds to click on several other pages on the web site. The visitor then places an item in the visitor's shopping cart. While some visitors make purchases, other visitors abandon their shopping carts. The organization wants to optimize the campaign by understanding what is effective and what is not effective in encouraging visitors to complete purchases. The data stream is filtered using a query such as:

ANY(ext.source.name='Campaign' and process_number='1') and
ANY(data.wt.tx_e='a') and
ALL(data.wt.tx_e!='p') and session.closed='True' and ext.device.type!='Computer'

The query produces a data stream that describes visitors to a web site where the visitor's first event is noted as arriving from a Campaign, the visitor is using a mobile device, the visitor has put an item in their shopping cart, the visitor has not yet made a purchase, the visitor's visit has reached a "closed" threshold target, and the cart is considered abandoned.

While the above discussion has focused on streaming the collected and processed data to data consumers, the collected data, both prior to processing and following processing, can also be stored within the processing center for non-real time purposes, including subsequent accesses, replay of dynamic data generation by instrumented appliances, and for many other purposes. The data may be compressed for more efficient storage. In certain implementations, the data may be stored for up to a maximum storage time, after which the data may be selectively archived or deleted.

Query-As-A-Service System

Figure 25:
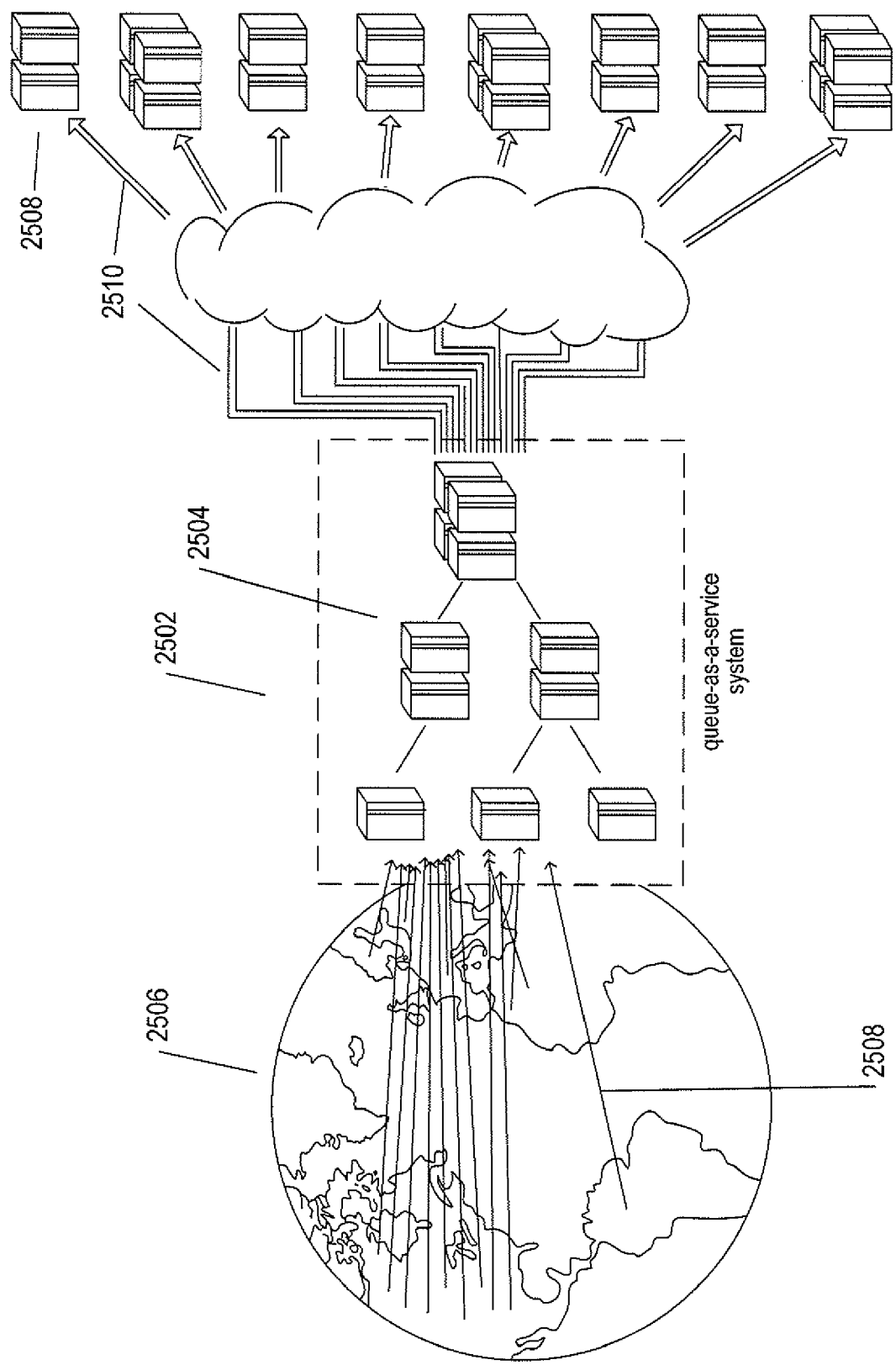
FIG. 25 provides an overview of the QAAS system that incorporates the above-described real-time, processed-data-streaming subsystem.

The above-described real-time processed-data-streaming subsystem was initially designed and developed to address large-scale web-analytics applications, among other applications, as a complete system. However, as time has progressed and computing systems have further evolved, the above-described real-time, processed-data-streaming subsystem has now been incorporated into a much larger and more capable query-as-a-service system ("QAAS system"). FIG. 25 provides an overview of the QAAS system that incorporates the above-described real-time, processed-data-streaming subsystem. In addition to incorporating the previously described real-time, processed-data-streaming subsystem 2504, the QAAS system 2502 includes additional components and functionalities that expand that previously described system into a much larger-scale system that harvests data from a much larger variety of processor-controlled devices and networked entities in order to continuously and/or intermittently execute queries on the harvested data on behalf of remote clients and provide query-results to the remote clients in near real time or as intermittent batched query results. The depiction of the earth 2506 and the many arrows directed from points on the surface of the earth to the QAAS system, such as arrow 2508, are intended to illustrate that the QAAS system can receive event messages and other data from an enormous number of network-connected entities distributed throughout the world. The QAAS system essentially serves as a global data-collection-and-query-processing system for the things referenced in the phrase "Internet of Things." These things may be processor-controlled appliances and computer systems, including laptops, tablets, PCs, smartphones, personal computers, and other relatively high-end devices, but may also include any of a myriad of different types of machines, systems, appliances, and objects that include network-connected sensors, electronics, and/or processors that allow the objects to generate and transmit event messages. The objects may vary from clothes, furniture, and other consumer items labeled with RFID tags to automobiles, trains, airplanes, machine tools, home appliances, and many other types of objects that, as computing evolves, either already are, or soon will be, Internet-connected as a matter of course. These things of the Internet of Things will generate enormous volumes of data, potentially up to terabytes of data or more data every second. Therefore, the QAAS system needs to be highly scalable and capable of processing the enormous volumes of data in real time, but also capable of persisting that data for sufficient periods of time to allow the data to be initially processed by the QAAS system and then transmitted to a variety of different organizations, distributed computer systems, cloud-computing facilities, and individual computer systems for input to a variety of different types of applications and services that use the data for a wide variety of organization-specific purposes. As one example, the QAAS system can be used to collect power-meter data across large geographical regions by electric utility companies. As another example, the QAAS system may provide real-time monitoring of commercial-airline fleets and even private automobiles. The QAAS system collects the data, persists the data, stores queries submitted by remote client systems, and executes those queries on a continuous basis against the harvested data to provide continuous streaming or batch transmission of query results to the remote computer systems. Thus, in FIG. 25, the remote systems, such as remote system 2508, receives a continuous stream or batch transmission 2510 of query results from the QAAS system 2502 in response to a submitted query that may be continuously executed by the QAAS system over very long periods of time.

Figure 26:
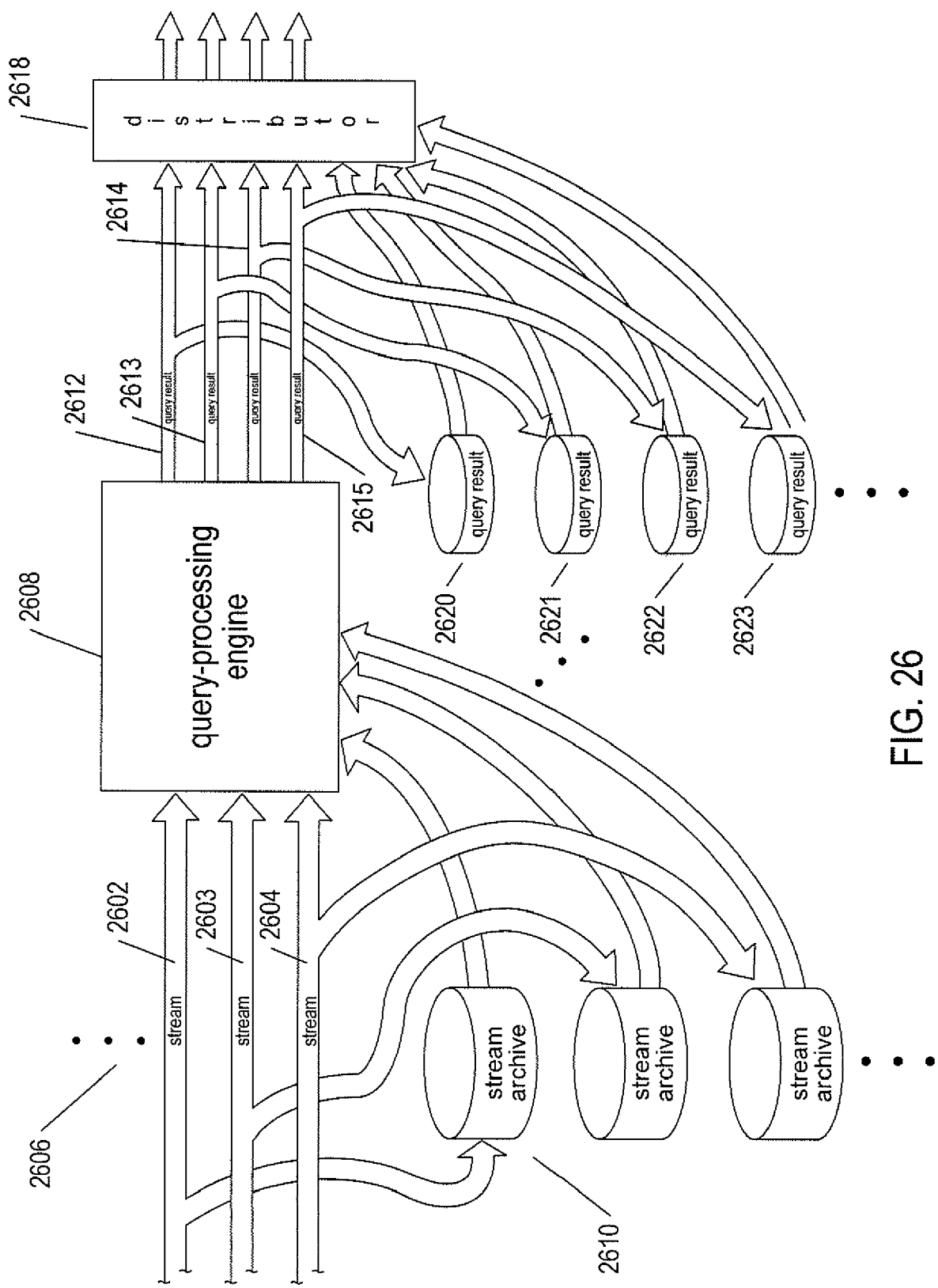
FIG. 26 illustrates the persistent storage of data by the QAAS system.

FIG. 26 illustrates the persistent storage of data by the QAAS system. As discussed above, the real-time, processed-data-streaming component of the QAAS system collects data and processes data from a large number of data sources to produce multiple processed-data streams 2602-2604, with the ellipses in FIG. 26, such as ellipses 2606, indicating that, as discussed above, there may be a large number of streams. The processed data streamed from the real-time, processed-data-streaming-subsystem component of the QAAS is both directed to one or more query-processing engines 2608 as well as to persistent storage 2610 so that the data may be processed both in real time by the query processing engine as well as at subsequent points in time by accessing the persistently stored data.

The query-processing engine 2608 is an elaboration of the types of query processing discussed above with respect to the real-time, processed-data-streaming subsystem. An Internet-of-Things query-processing language has been developed to allow users of remote client systems and organizations to formulate queries in order to harvest an essentially limitless number of different query-specified data sets from the various streams input to the query-processing engine either in real time or from archival storage. The processed-data streams and underlying raw data are carefully controlled with various types of access permissions and robust authorization and authentication, so that a particular organization can strictly protect confidential organization-owned information and isolate the use of that information for query execution and reception of query responses to only the organization itself or to allow the organization to share its data with only specific and carefully controlled additional users. The query-processing engine 2608 continuously executes queries submitted by remote clients and organizations to generate query-result streams 2612-2615 that are both transmitted in real time to a distributor component 2618 as well as persistently stored in query-result buffers 2620-2623. Query results are stored, in general, for a much shorter period of time than the underlying processed data received from the processed-data streams 2602-2604. In general, should query results that are no longer available from the query-result persistence storage subsequently desired, a client or organization may resubmit a query for execution against the persisted processed-data streams in order to regenerate the query results. The distributor component of the QAAS 2618 directs query results to client computer systems through the Internet or other communications systems. In certain implementations, query results are first persistently stored and the distributed component 2618 reads query results from the persistent-storage buffers 2620-2623 for transmission to clients. In other implementations, certain clients may wish to receive real-time data, in which case the distributor receives and transmits real-time query results produced by the query-processing engine as well as accessing the persistent-storage buffers 2620-2623 in order to retrieve and transmit batches of query results to other clients. In certain implementations, query results may be generated from both streamlining data and archived data.

Figure 27:
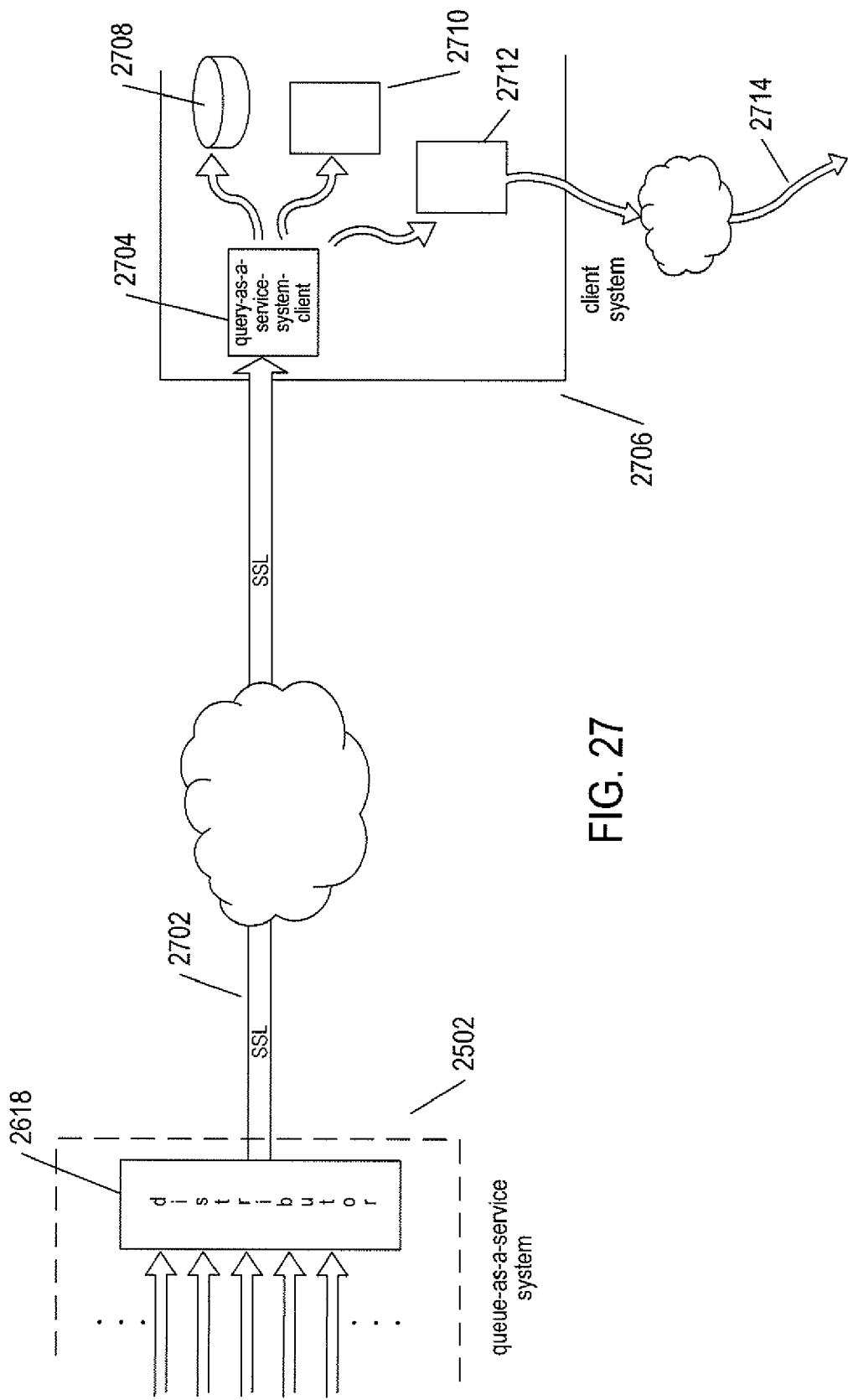
FIG. 27 illustrates transmission of query results to a QAAS remote client within a remote client system.

FIG. 27 illustrates transmission of query results to a QAAS remote client within a remote client system. In FIG. 27, the distributor component 2618 of the QAAS system 2502 transmits query results over a transport-layer-security ("TLS") or secure socket layer ("SSL") secure tunnel 2702 to a QAAS remote client 2704 within a remote client system 2706. The query results are transmitted in any of many different specified formats, including XML, JSON, the comma-separated-value format ("CSV"), the optimized-row-column format ("ORC"), and other formats. The data formats may be specified as part of the query that is continuously executed by the QAAS system, in certain implementations, and, in other implementations, may be controlled by various client attributes and parameters that are established within the QAAS system by interaction of a user with the QAAS remote client through a user interface. The QAAS remote client 2704 then carries out additional query-response-data translation or reformatting, as necessary, in order to furnish the query data to any of various different types of data sinks, applications, or remote systems accessible from the client system. For example, the data may be transmitted by the QAAS remote client to a file system or data-storage appliance within the client system 2708 or forwarded to any of many different data-processing subsystems and applications, such as Hadoop or client-developed business applications 2710. Alternatively, the QAAS remote client 2704 may forward the data to a staging and communications subsystem 2712 for client-controlled distribution of the data to remote systems 2714. Not only does the QAAS remote client translate received data to formats expected by the various data sinks from the client system, the QAAS remote client, in many implementations, also manages the necessary data-transmission protocols, data buffering, timing and synchronization, and other issues related to distributing received query-result data within the client system.

Figure 28:
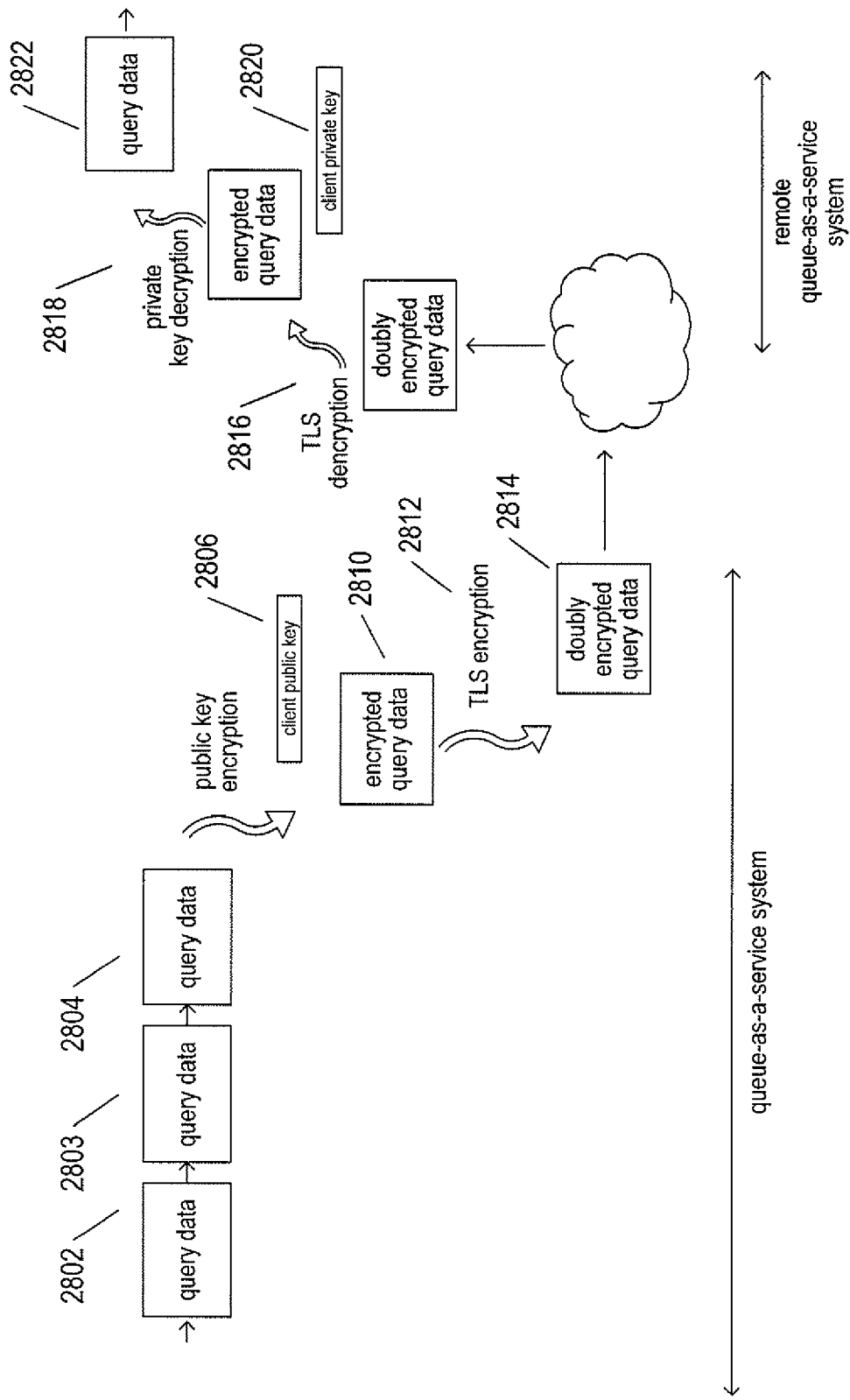
FIG. 28 illustrates secure transmission of query-result data from the QAAS system to a QAAS remote client.

FIG. 28 illustrates secure transmission of query-result data from the QAAS system to a QAAS remote client. The query data is packaged into communications messages 2802-2804 for transmission by the distributor component 2618 of the QAAS system. In a first security step, the distributor component employs a public encryption key furnished by secure communications to the QAAS system by the client system in order to encrypt the data within each query-result-data message to produce an encrypted query-data message 2810. The encrypted query-data message is re-encrypted by the underlying secure communications tunnel 2812 to produce a doubly encrypted query-result-data message 2814 that is transmitted through the secure tunnel to the QAAS remote client within the client system. A first decryption 2816 is carried out by the secure tunnel and the QAAS remote client running within the client system then carries out an additional private-key decryption 2818 using a client private encryption key 2820 to produce a clear-text query-response-data message 2822. A multi-way authentication and authorization protocol is employed within the secure-tunnel system to authenticate both the QAAS system and the QAAS remote client prior to data transmission using authentication certificates provided by a third-party certification organization. The client private key 2820 is generated by the client computer and stored securely within the QAAS remote client. It is not transmitted either to the QAAS system or, in most cases, any other remote system by the client. Thus, query-result data is fully secured within the QAAS system prior to transmission over the Internet or other communications systems.

As discussed above, many additional types of security measures are undertaken by the real-time, processed-data-streaming-system component of the QAAS system to ensure that a client computer can only generate queries to access processed data that the client organization is authorized to execute queries against. This type of authorization may occur at multiple levels. For example, in the case of medical data, strict controls may be applied to prevent any raw data that contains patient identifiers from being accessible to any organization other than the medical organization within which the data is generated. However, query results that are guaranteed to clean all patient information from the query-result may be allowed to be executed by a larger number of organizations. For example, the larger number of organizations cannot execute queries that would reveal specific treatments provided to, or conditions of, patients, but may be authorized to execute queries that return aggregate statistical data, such as the distribution of particular pathologies or conditions among age groups, ethnicities, and residents of various different geographical regions. Thus, not only are the query-result data secured and securely transmitted, the underlying raw data is also secured, through many layers of access controls, to prevent unauthorized clients from executing queries against data that is confidential and owned by other organizations.

Figure 29:
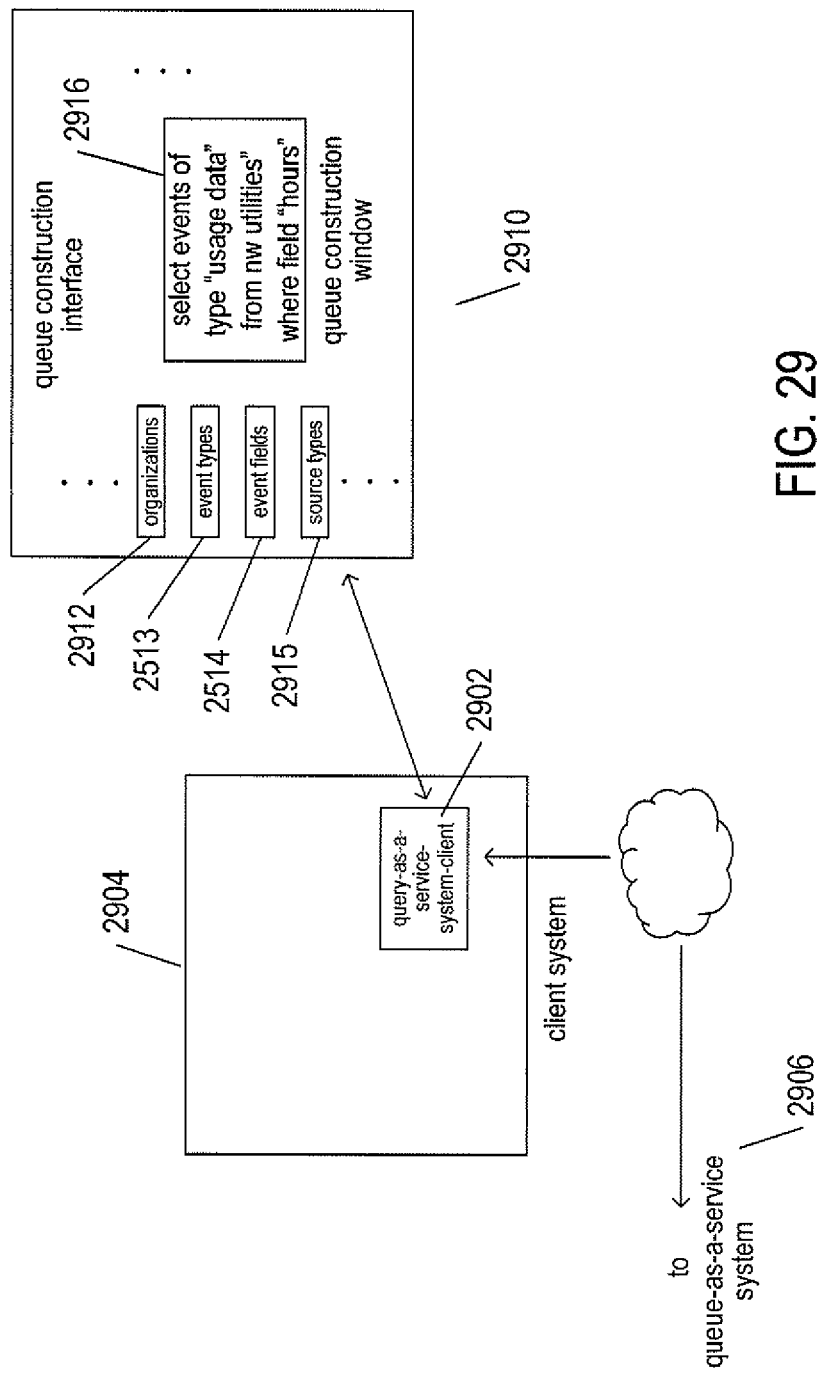
FIG. 29 illustrates user-interface provision by the QAAS remote client.

The QAAS remote client provides a rich and capable user interface to users of client computer systems to allow the users to browse lists of types of data and events accessible to the client, configure client-specific data collection, and to formulate queries for accessing the data. FIG. 29 illustrates user-interface provision by the QAAS remote client. As shown in FIG. 29, the QAAS remote client 2902 within a remote client system 2904 communicates with the QAAS system 2906 to obtain information about the types of data available to the client from the QAAS system as well as to configure collection of specific information on behalf of the client. This information may be displayed in one or more pages of the user interface. The user interface 2910 provides input features to allow a user to browse this information 2912-2915. In addition, the user interface generally provides a query-construction window or page 2916 and various tools to allow a user to formulate, edit, and manage queries as well as to launch query execution.

Figure 30:
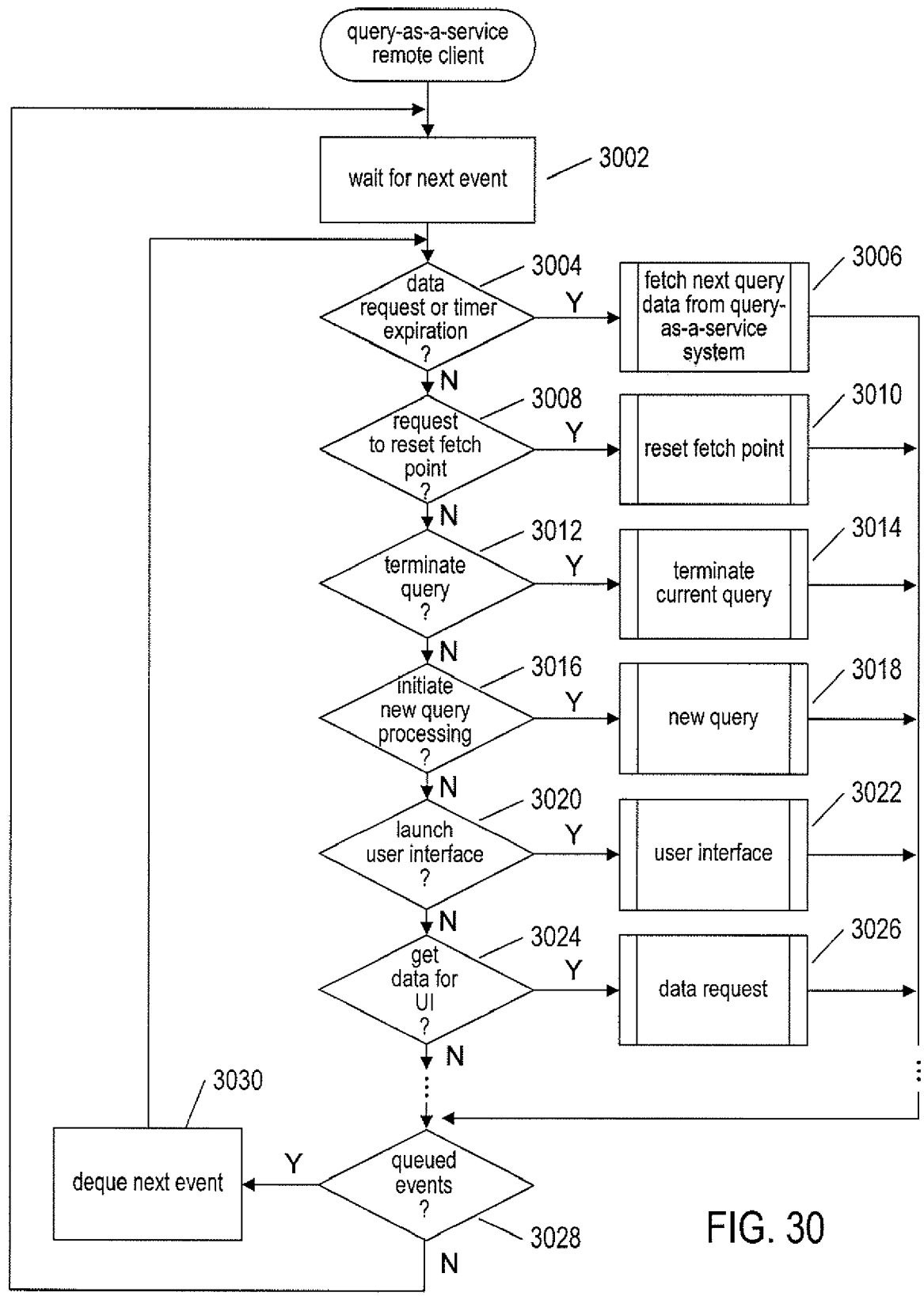
FIG. 30 provides a control-flow diagram for the main event loop that implements the QAAS remote client.

FIG. 30 provides a control-flow diagram for the main event loop that implements the QAAS remote client. In step 3002, the event loop waits for a next event. Then, in a series of conditional statements, the event loop determines what type of event has occurred and calls an appropriate handler. For example, when the next-occurring event is a data-request or data-request-timer expiration, as determined in step 3004, a handler is called, in step 3006, to fetch a next batch of data from the QAAS system. The QAAS remote client is controlled through the user interface to determine the data-fetch interval and maximum volume for any particular interval. In certain implementations, the system may dynamically adjust both the data volume and interval for data fetching, depending on how quickly the client system is able to process the data. In yet additional implementations, the data may be pushed from the QAAS system to the QAAS remote client, rather than pulled by the client. When the next-occurring event is a request to reset the fetch point for a query-result data stream, as determined in step 3008, then a fetch-point reset handler is called in step 3010. In general, the client system views the query-result data as a data sequence to which the QAAS system continuously appends new data. The QAAS remote client application maintains a next-fetch address or indication, as does the distributor on the QAAS system, to enable the client to iteratively pull data from the QAAS system via the QAAS remote client. However, in certain cases, including various types of system failures, the received query-result data may be lost to the client, in which case the client can reset the fetch point to an earlier position within the query-result data sequence in order to have the lost data retransmitted. When the desired query-result data is no longer available from the QAAS system, the client can elect to resubmit the query for execution against archived processed data as well as real-time data, in essence setting a processed-data fetch point much further back in time than possible with the query-result data-fetch point reset. When the next-occurring event is a terminate-query request, as determined in step 3012, then a terminate-query handler is called in step 3014. The QAAS remote client transmits a terminate-query request back to the QAAS system which undertakes many steps involved in shutting down a continuously executing query and deallocating resources allocated to that query. When the next-occurring event is a request for initiating query processing, as determined in step 3016, then a new-query handler is called in step 3018. The QAAS remote client transmits a new-query execution request back to the QAAS system which allocates the necessary resources, carries out any additional authorization and authentication steps not already carried out prior to query submissions, allocates needed resources, and initiates application of the new query to the processed-data streams. When the next-occurring event is a request to launch the user interface, as determined in step 3020, the QAAS remote client executes user-interface logic in order to display the user interface to a user of the client computer system on a display device in step 3022. In certain cases, a user interface may be displayed by local processing alone, but, in the general case, the QAAS remote client communicates with the QAAS system in order to provide information about the types of data, data attributes, fields, and other information needed by users to formulate queries. When the next-occurring event is a request to obtain data for the user interface, as determined in step 3024, a data-request handler is called, in step 3026, to interact with the QAAS system to obtain the requested data. When there are additional queued events to handle, as determined in step 3028, then a next event is dequeued from the queue in step 3030 and control returns to step 3004. Otherwise, control returns to step 3002 where the event handler waits for the occurrence of a next event.

Figure 31:
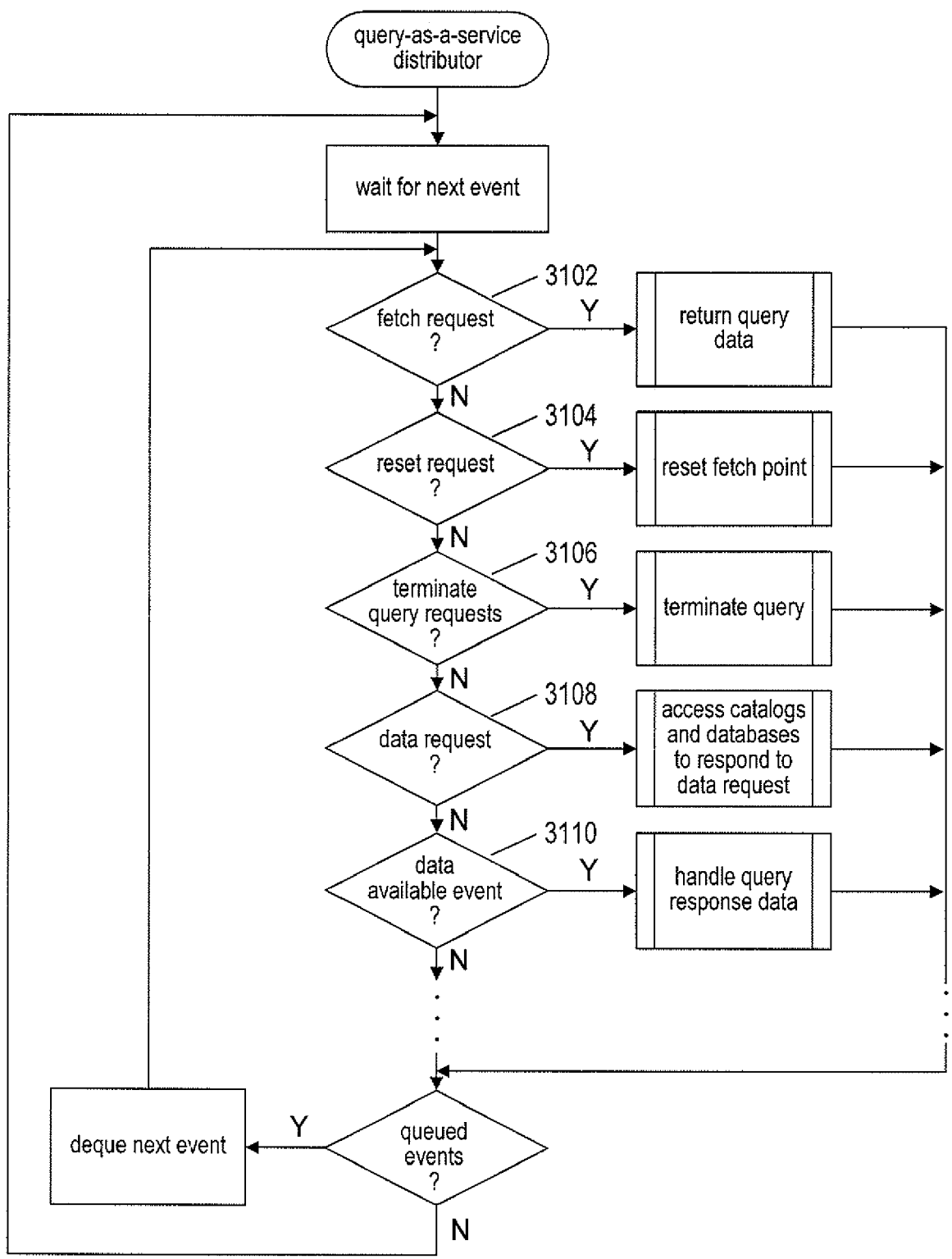
FIG. 31 provides a control-flow diagram for the event loop of the distributed component of the QAAS system.

FIG. 31 provides a control-flow diagram for the event loop of the distributed component of the QAAS system. This event loop is similar to the event loop for the QAAS remote client. For example, the event loop may handle data-fetch requests 3102, fetch-point-reset requests 3104, query-termination requests 3106, data requests 3108, as well as handling data-available events 3110 generated by the query-execution engine.

Figure 32:
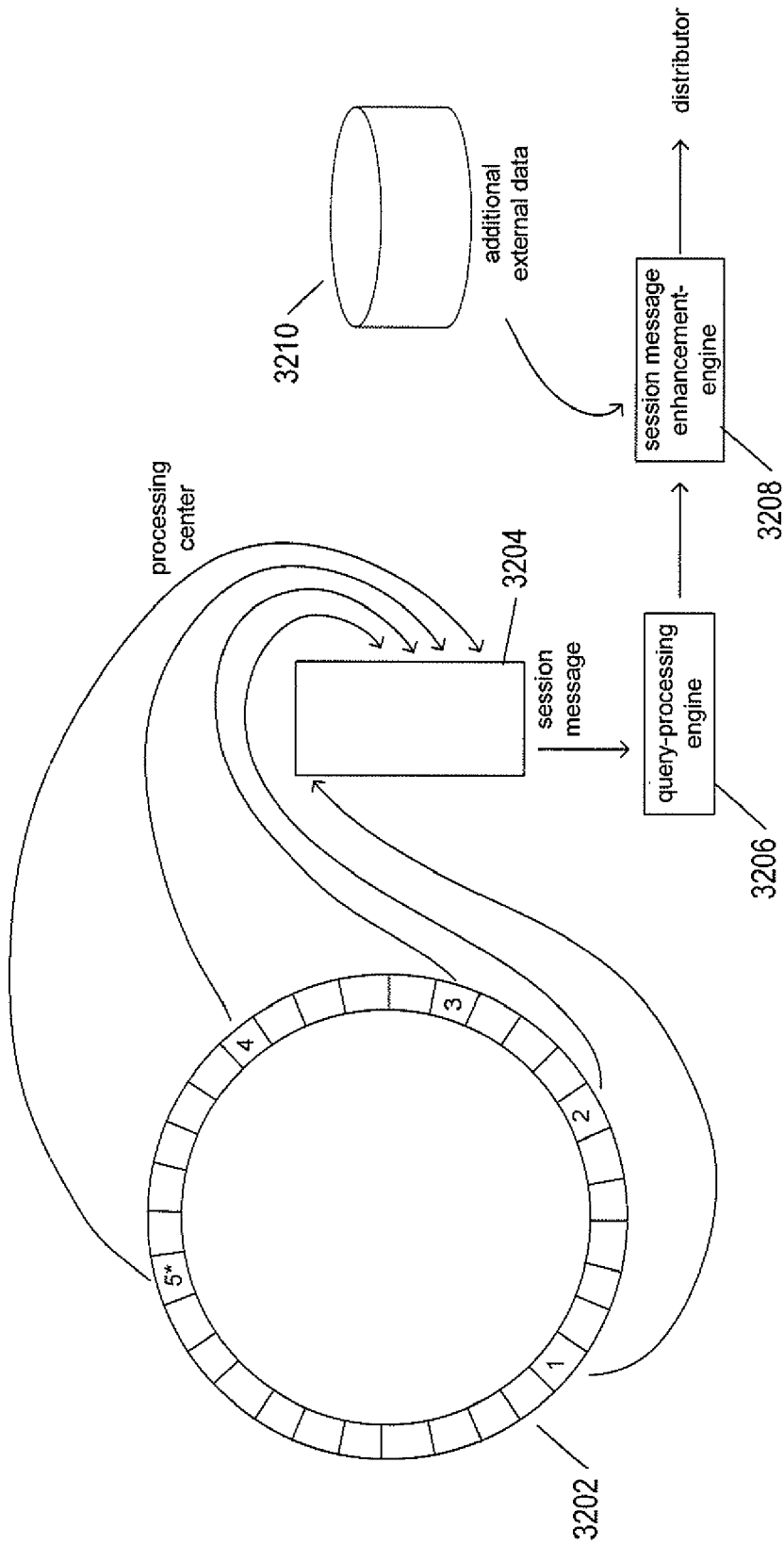
FIG. 32 provides an overview of query processing by the query-processing engine.

FIG. 32 provides an overview of query processing by the query-processing engine. As shown in FIG. 32, the data-collection and data-consolidation subsystems of processed-data-streaming subsystem, previously described with reference to FIGS. 11-24, can be visualized as a large output queue 3202 into which the data-collection and data-consolidation subsystems input event messages. The processing center continuously collects event messages related to particular session IDs from the output queue in order to compose session messages 3204, producing an output stream of session messages. The session messages are then input to the query-processing engine 3206, which filters, aggregates, and carries out other query-processing activities in order to generate a stream of query results corresponding to the input session messages. As discussed further, below, and as discussed previously with reference to FIG. 26, the query-processing engine may receive session messages directly from the processing center, may receive session messages retrieved from stored session-message-stream data, or both. The query results may be numerical data, filtered and selected event messages or portions of event messages, derived data, or a combination of these types of data. The query results are transmitted to a session-message-enhancement engine 3208 which carries out join-like combinations of the query results with additional external data 3210 that is accessible to the session-message-enhancement engine. In many cases, the additional external data 3210 is provided by the client receiving the query results via the query-construction interface (2910 in FIG. 29). The join-like processing carried out by the session-message-enhancement engine produces a final query-result data stream that is passed to the distributor (2618 in FIG. 26) for transmission to the QAAS-system client (2704 in FIG. 27).

Figure 33:
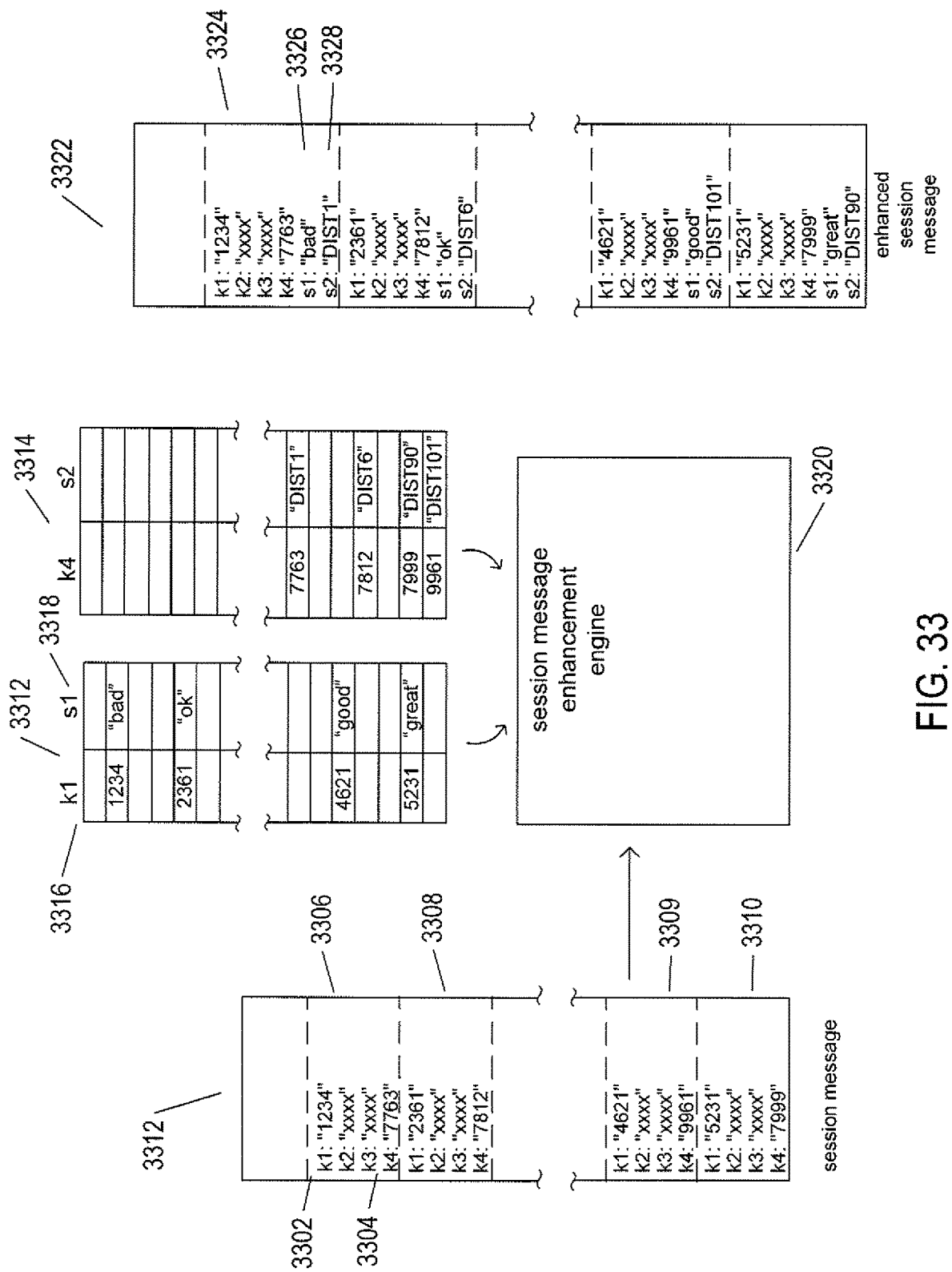
FIG. 33 illustrates a join-like combination of a session message with external data, carried out by the session-message-enhancement engine.

FIG. 33 illustrates a join-like combination of a session message with external data, carried out by the session-message-enhancement engine. On the left side of FIG. 33, data values within a session message output from the query-processing engine are shown using the same illustration conventions as used for the example session message shown in FIGS. 8D1-D3. Explicit data values are shown for data fields k1 3302 and k4 3304 in event message 3306 as well as in the remaining event messages 3308-3310 of an example session message 3312 that represents a query result emitted by the query-execution engine. The external data with which the query results are joined comprises two tables 3312 and 3314. The first table 3312 includes a first column 3316 containing values of the data field k1 and a second column s1 3318 containing a corresponding symbol string for each different value of the data field k1. Similarly, the second table 3314 includes symbol strings corresponding to data values for the data field k4. The session-message-enhancement engine 3320 is instructed, by the query-processing engine, to match k1 and k4 data values in the session message 3312 and append the corresponding symbol strings from tables 3312 and 3314 to each event message. The session-message-enhancement engine 3320 produces an enhanced session message 3322 in which each event message, such as event message 3324, is supplemented to include the corresponding symbol string for the k1 data field 3326 and the corresponding symbol string for the k4 data field 3328. Of course, this is a very simple example of session-message-enhancement engine join-like operations. The session-message-enhancement engine is capable of carrying out relatively complex, SQL-like joins between a wide variety of different types of external data and session messages comprising results from the query-execution engine. Note that, for example, the session message 3312 may have only very few of the total number of data fields present in the unprocessed session messages streamed to the query-execution engine. The query-execution engine may carry out SQL-like select statements to select only a desired subset of the data fields and the event messages, and may carry out many other types of SQL-like query-processing steps to generate derived data as well as to generate numeric values for aggregated fields of session messages and event messages. The query-result enhancement carried out by the session-message-enhancement engine following initial query processing provides an additional efficient and powerful query-result processing step to incorporate a wide variety of different types of external data, in addition to the data collected by the processed-data-streaming subsystem, to produce query results tailored for ingestion by the remote client. This type of processing represents an offload of much downstream query-result-processing computational overheads from client systems to the QAAS system.

Figure 34:
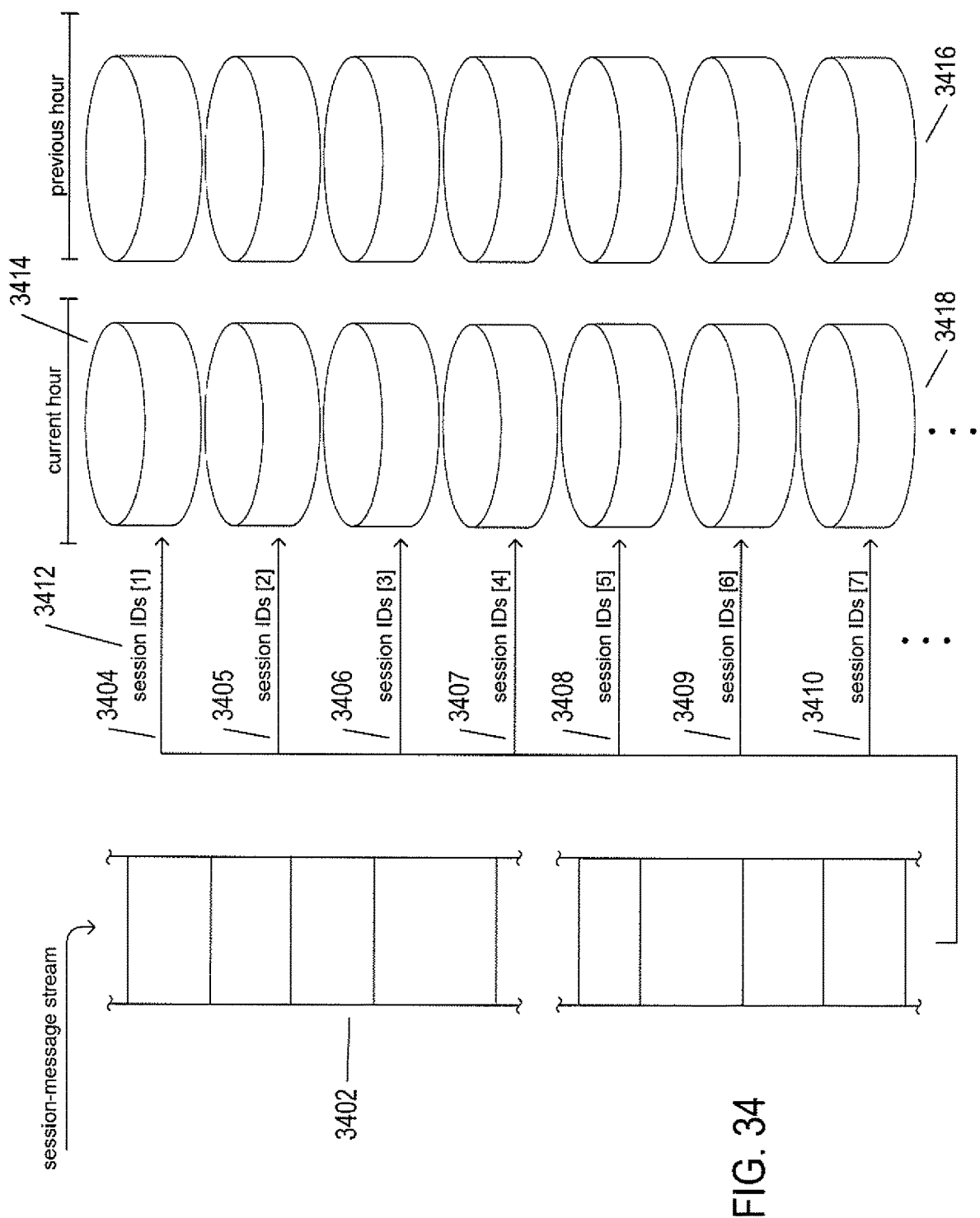
Figure 35:
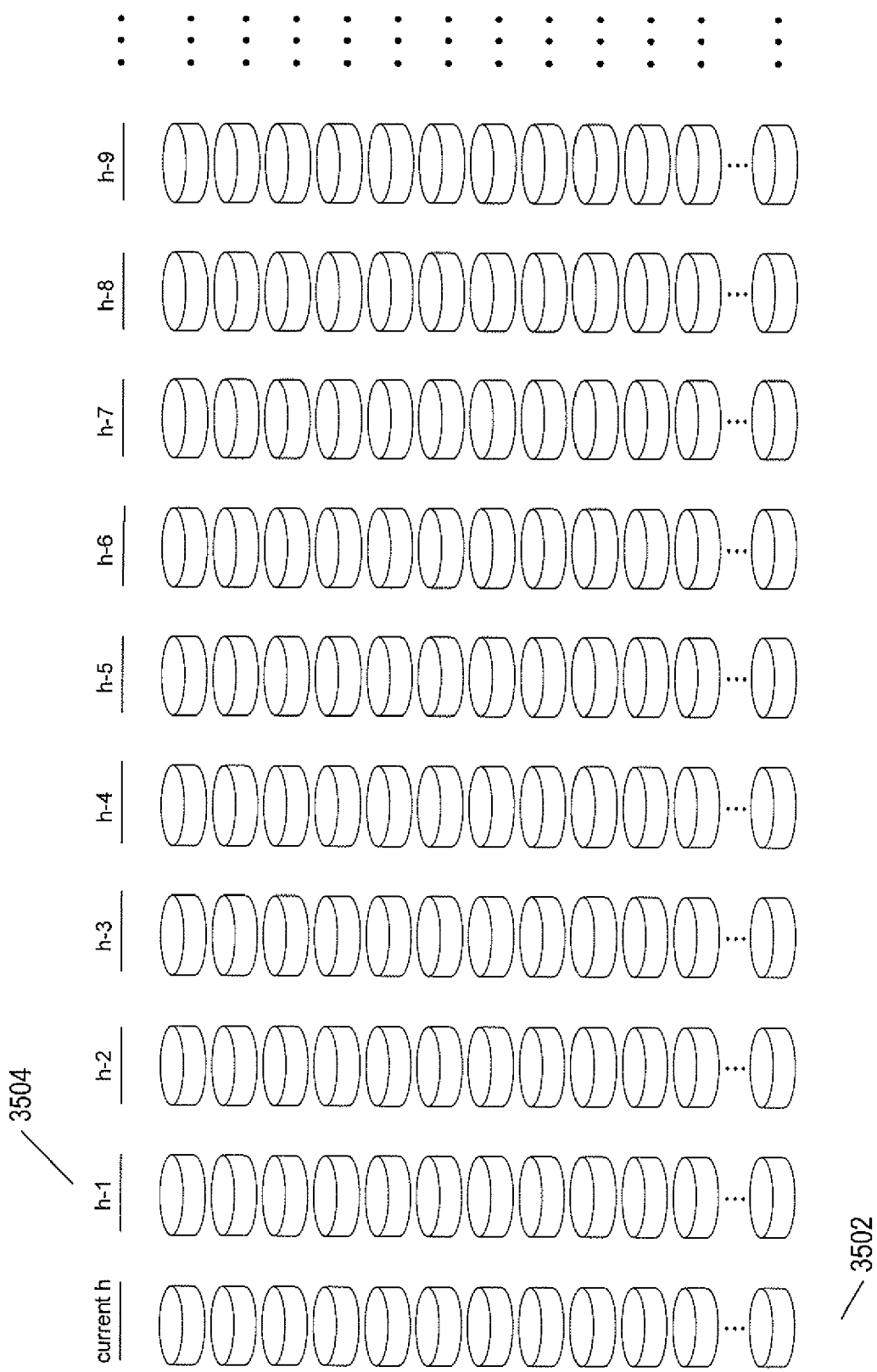

FIGS. 34-36 illustrate how session-message streams produced by the processing center are stored, or archived, for subsequent use in query processing. In FIG. 34, a session-message stream 3402 is shown to be partitioned into substreams 3404-3410, which are each directed to a different data-storage device, commonly a disk or virtual disk within the QAAS system. The notation "session IDs [1]" 3412 in FIG. 34 indicates a list or a set of session IDs that are stored in the disk or virtual disk 3414. The contents of the list are mutually exclusive with the contents of the other lists associated with other data streams, in the currently described implementation. Each disk or virtual disk accumulates session messages from the session-message substream associated with the disk or virtual disk for a defined period of time. In the currently described implementation, each disk or virtual disk receives session-messages through a session-message substream over the course of one hour. At the end of the hour, the disk or virtual disk is considered to be filled or complete, and subsequent session-messages from the session-message stream associated with session ID values that are stored in the now complete disk or vestural disk is directed to a different disk or virtual disk for the next hour. In FIG. 34, the complete or filled disks or virtual disks for the previous hour are shown in column 3416, and the disks or virtual disks to which session-messages are currently streamed are shown in column 3418.

FIG. 35 illustrates the archived session-message data stored within the QAAS system. A column of disks or virtual disks to which session messages are currently being streamed 3502 is shown underneath the heading "current h," representing the current hour. Following columns, such as column 3504, of disks or virtual disks represent the stored session-message data for each preceding hour, stretching back to a preceding hour that represents the final hour in the maximum time period for session-message-stream data storage.

FIG. 36 illustrates details of data storage within each of the disks or virtual disks discussed above with reference to FIGS. 34-35. Although each session-message substream is shown, in FIG. 34, as being directed to a single disk or virtual disk, the QAAS system redundantly stores the session-message substream in three different disks or virtual disks, for fault-tolerance and high-availability purposes. Thus, in FIG. 36, the single disk or virtual disk 3602 to which a session-message substream is directed in FIG. 34 actually comprises three disks or virtual disks 3604-3606.

Within each disk or virtual disk, the data is stored in one or more files 3608-3609. The session-message data can be viewed as entries in a relational-database table, with each row representing a session-message, and each column corresponding to a data field. In the QAAS system, this relational-database-table-like organization of session-message data is stored as successive columns 3610-3613 in the file, to which a header 3614 is prepended. The data corresponding to each column, or, in other words, the values for a particular data field for each of the session-messages, are stored in a compressed form, while the header is generally not compressed. The header 3614 is shown with expanded detail 3616 in FIG. 36. The header includes indications of the particular hour and date during which data was stored in the file 3618, various other types of information, including version information, client information, header size, and other such information. In addition, the header includes an indication of the number of compressed columns 3620 followed by a list of column descriptors 3622-3625. FIG. 36 shows an expanded version of a column descriptor 3626. The column descriptor includes an indication of the length of the compressed column 3628, an offset within the file to the compressed column 3630, a column ID 3632, an indication of the compression technique used to compress the column 3634, an indication of the type of data stored in the column 3636, and other information 3638. The file header further includes an indication of the number of session IDs 3640 for which data is stored in the file, and a list of the session IDs 3642-3649. As indicated by broken cell 3650, the file header may contain additional data. The file-header structure shown in FIG. 36 is intended to illustrate the types of file data stored in a file header. Actual file headers may be differently formatted and organized, and may contain additional types of information, as well as information different from the information indicated in FIG. 36. The header is intended to provide sufficient information for processing of the file contents during query processing carried out by the query-processing-execution engine. In addition, certain of this information may be stored externally to the file in various tables or other forms of stored data that can be accessed by the query-processing engine to identify the disks, virtual disks, and files that need to be accessed and at least partially decompressed during query processing.

A number of important points can now be made with respect to storage of session-message streams by the QAAS system. Because session-message data is stored by column, rather than by session-message, it is quite efficient for the QAAS system to extract and decompress only that data needed for processing a specific query. For example, a query may select only two or three data fields from among twenty or more possible data fields within event messages of a set of session messages specified by the query. In this case, only the few selected data fields, each corresponding to a different column, need be extracted and decompressed from the files storing the specified session-messages.

Another important point is that the QAAS system does not index the files containing storage session-messages, as in most commonly encountered database management systems. Because of the volumes of data and the rates at which these volumes of data are received and processed by the processed-data-streaming subsystem, the computational overhead for indexing the data would be onerous. Because the data-values are stored in separate compressed columns, the QAAS system is able to efficiently extract and compress only that data needed to produce the query results.

Yet another important point to note is that, during query processing, as further discussed below, data files and data extracted from data files do not need to be internally moved or transferred between processing systems within the QAAS system. Instead, query-execution-processing of the data is carried out by worker computer systems associated with the disks or virtual disks. Enormous computational efficiency is obtained by eliminating the need for transmitting and re-transmitting decompressed data among different worker servers and computer systems within the QAAS system.

Figure 37A:
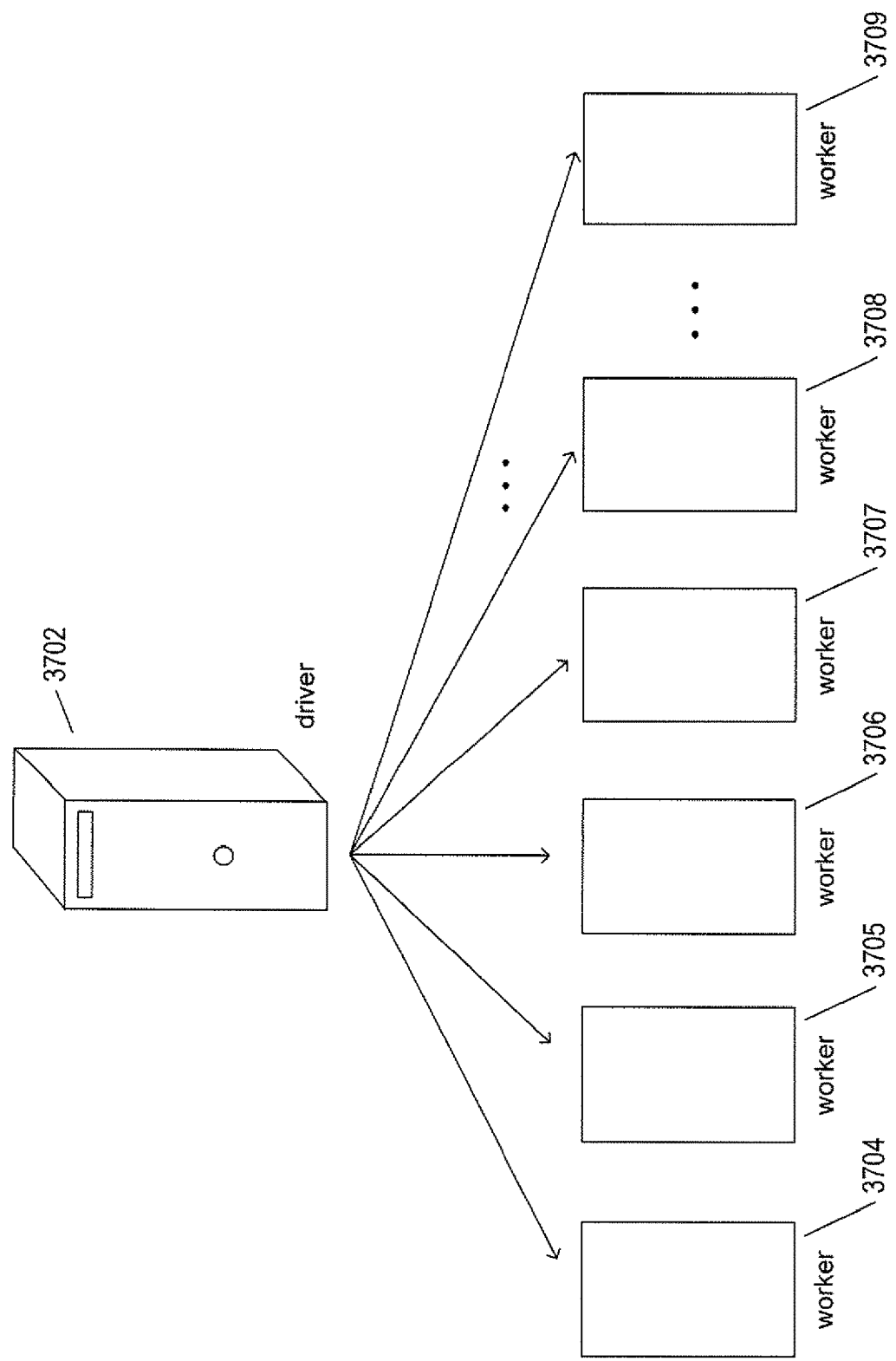
FIGS. 37A-D illustrate operation of the query-processing engine. In general, the query-processing engine instantiates a query-processing subsystem for each query that it performs on behalf of a remote client.

FIGS. 37A-D illustrate operation of the query-processing engine. In general, the query-processing engine instantiates a query-processing subsystem for each query that it performs on behalf of a remote client. The query-processing subsystem, as shown in FIG. 37A, comprises a driver computer system 3702 and generally comprises multiple worker computer systems 3704-3709. As further discussed below, the driver assembles the worker computer systems in accordance with the estimated computational bandwidth needed to process the query for which the query-processing subsystem is instantiated, in view of the available worker-computer-system resources. The query, for example, may be associated with a start time and an end time that defines a time period within which session messages, specified by the query, were received. This information, along with additional information, allows the driver to compute the number of disks or virtual disks, each corresponding to an hour of session-message substream data, which need to be accessed and processed in order to process the query. Note that in certain implementations, a certain number of workers may also be assigned to process real-time streamed session-messages or event messages in addition to, or instead of, disks or virtual disks containing stored session-messages.

Figure 37B:
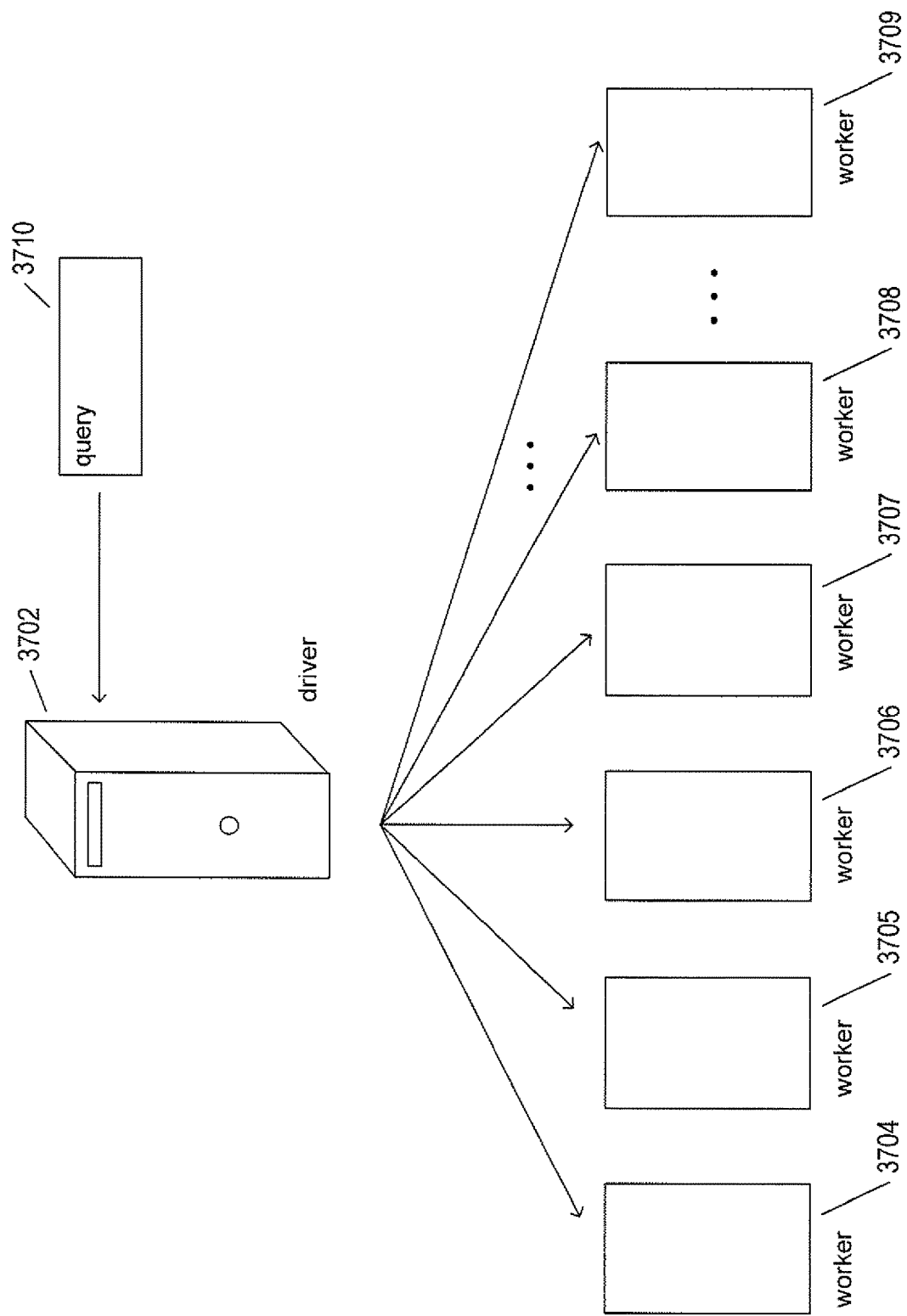
Figure 37C:
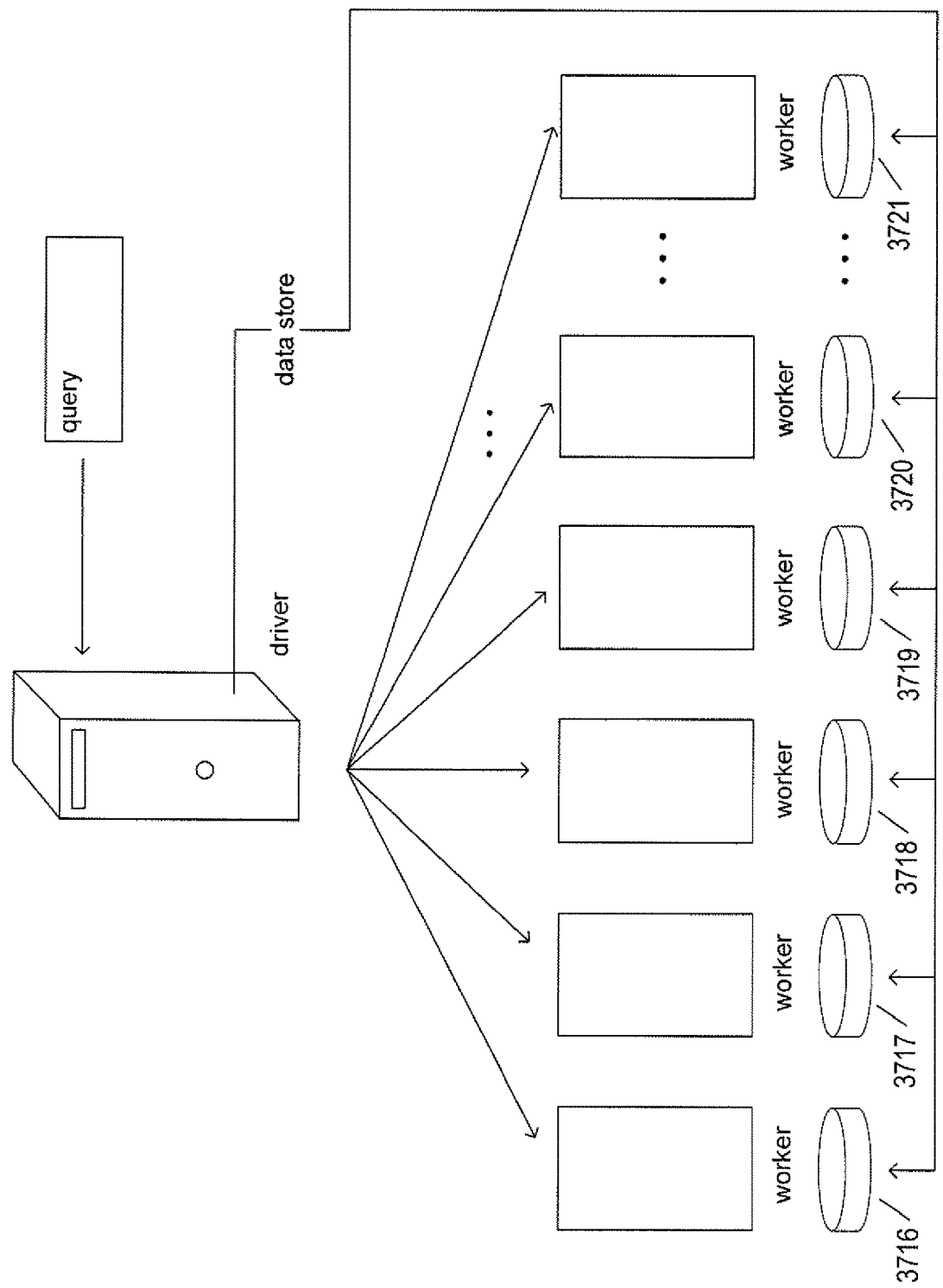

As shown in FIG. 37B, initial processing of the query 3710 by the driver 3702 allows the driver to establish an optimal or near-optimal set of worker systems 3704-3709, constrained by worker availability and computational load on the QAAS system. As shown in FIG. 37C, using information extracted from the query, the driver identifies the disks or virtual disks containing session-message data that need to be processed, referred to as partitions, and distributes these partitions, 3716-3721 to the workers. As shown in FIG. 37, a single partition is distributed to each worker, although the driver may elect to distribute two or more partitions to each or to selected workers, indication of which are placed in local queues associates with the workers.

Figure 37D:
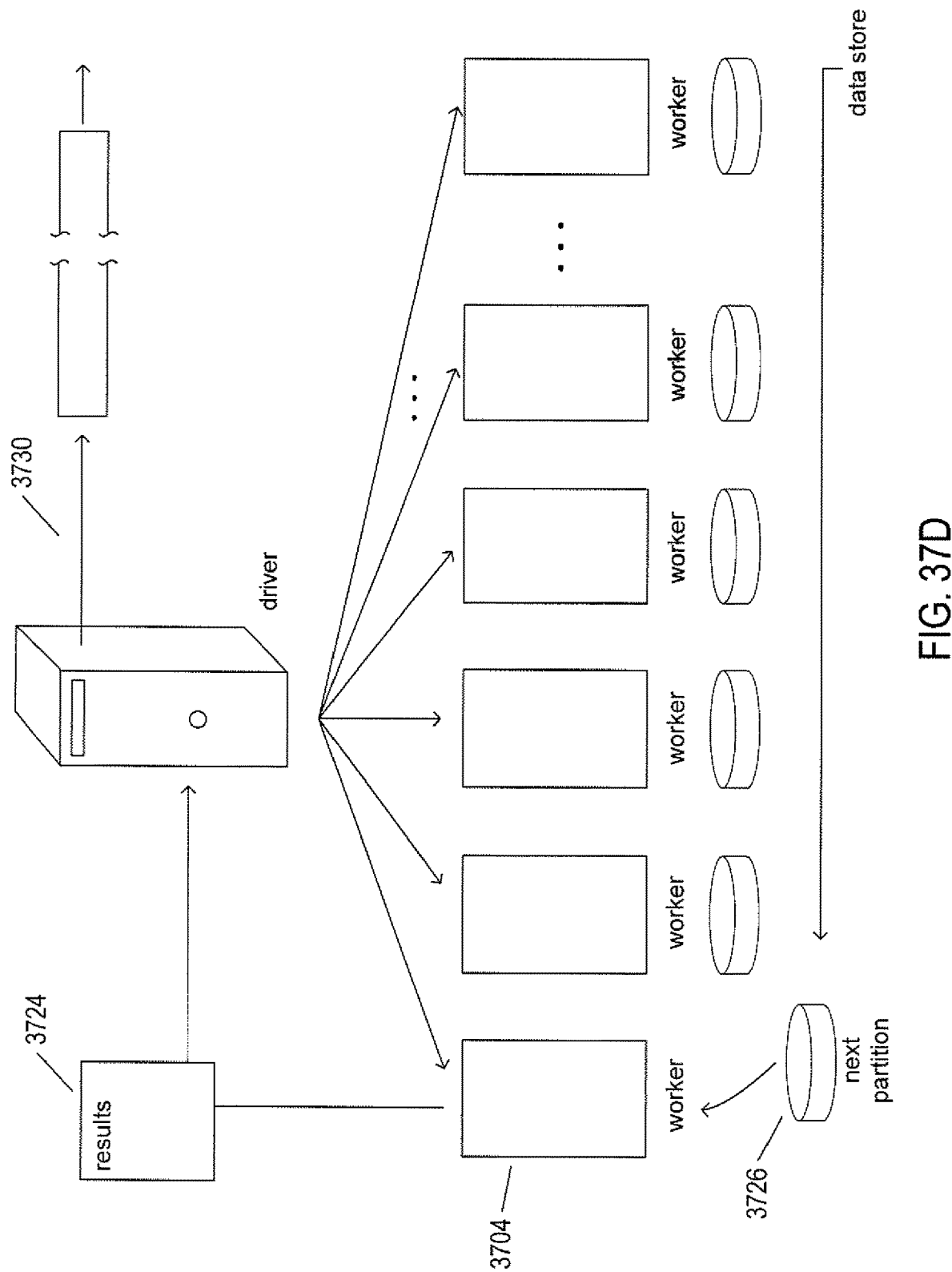

As shown in FIG. 37D, when worker 3704 finishes processing the first partition 3716 assigned to the worker, the worker transmits results 3724 of query-processing of the partition to the driver. This set of results 3724 is generally referred to as a "partial result." The worker may then begin processing a next partition 3726 when there is an indication of the next partition in the worker's local queue or when there are additional partitions to process, in which case the driver forwards an indication of the next partition for the worker to process to the worker. The driver may emit 3730 the partial results 3724 to the session-message-enhancement engine and distributor as soon as the results are received. In particular, for select-type queries, the partial results may be streamed to the remote query-as-a-service client as quickly as they are produced by workers and as quickly as they can be routed within the remote client to their destinations.

Query processing carried out by the query-processing engine is a highly parallel operation, in general, in which each of many different worker systems processes a subset of the total data set that is needed to be processed to return the desired results. As discussed above, this highly-parallel multi-worker-system processing is not burdened with inter-worker-system communications overheads and thus uses a large fraction of the aggregate computational bandwidth of the worker systems for query processing rather than losing significant computational bandwidth to inter-worker communications overheads.

In addition to select-type queries, the QAAS system can also process aggregate-type queries. These queries count the number of distinct values in the processed data for a particular data field, as one example. FIG. 38 shows an example aggregate query in which the number of distinct visitor_ID values received in instrumentation-collected data for each city are counted. In many cases, aggregate queries can be exactly processed by accumulating counts provided in partial results returned by worker systems to the driver. However, in the case of the visitor_ID field, this is generally not possible. The problem is that the same visitor_ID value may occur in event messages of session-messages with different session_ID values. Therefore, a given visitor_ID value may be distributed across multiple partitions, despite the fact that each partition contains all of the session-messages for any particular session_ID. Because execution of an aggregation query returns a computed number, rather than a list of the distinct visitor_ID values processed by a worker system, the aggregate-number partial results returned by the worker systems cannot be additively combined, since the aggregate numbers in the partial results may reflect multiple occurrences of a particular visitor_ID value in two or more partitions.

In order to solve the aggregation-query processing problems associated with data fields, such as the visitor_ID field that cannot be cumulatively enumerated by multiple worker systems, the QAAS system uses a variant of the HyperLogLog cardinality-determination method. The QAAS system employs the HyperLogLog method across multiple worker systems and across the time span during which the worker systems emit partial results to the driver.

FIG. 38 shows an example aggregation-type query. The query seeks a count of the unique visitor_ID values associated with session messages that are, in turn, associated with particular cities. There are many possible ways to express aggregation-type queries in various alternative query-specification languages. In many implementations, aggregation-type queries may be embedded in more complex queries.

Figure 39:
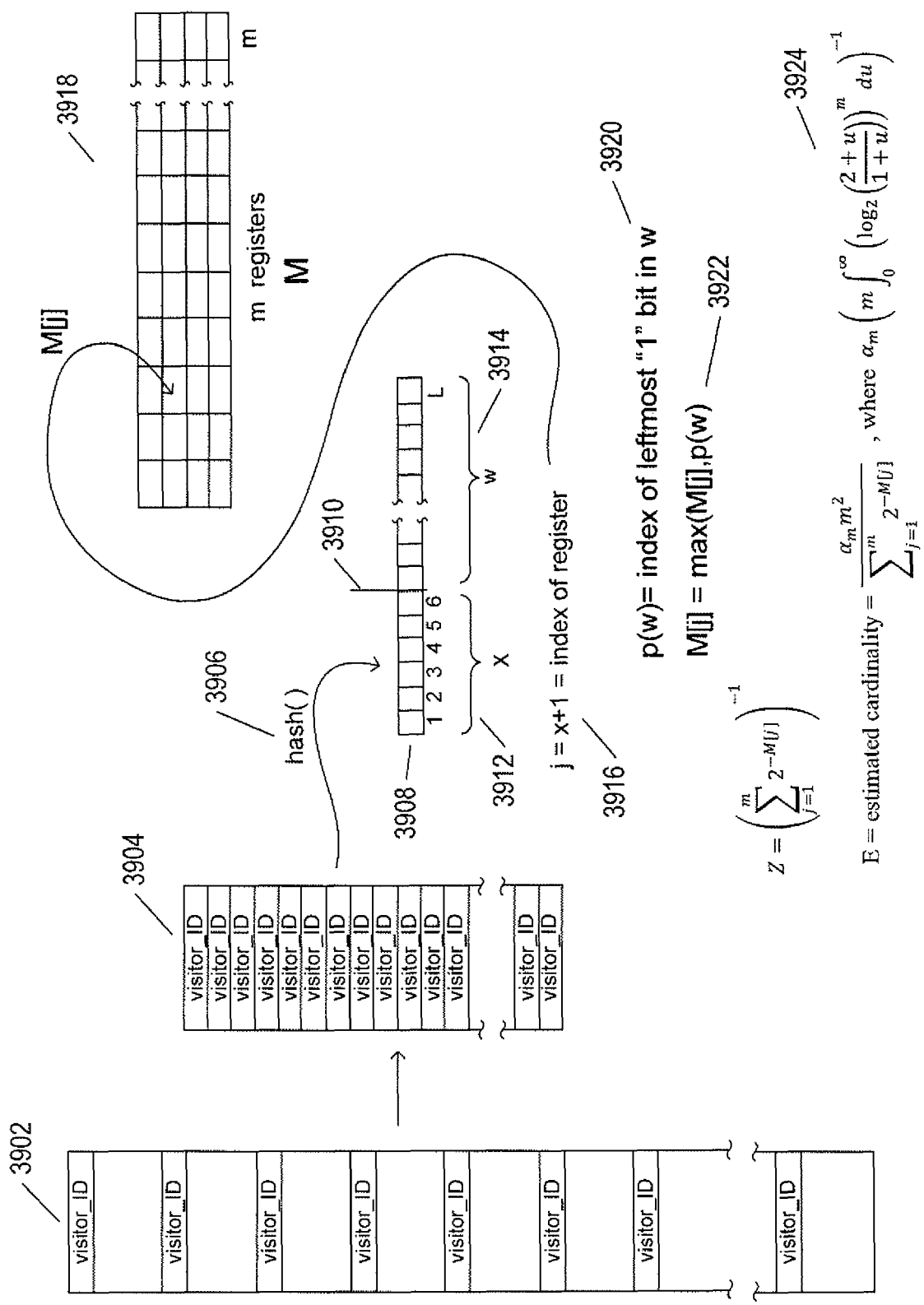
FIG. 39 illustrates use of the HyperLogLog method by the QAAS system.

FIG. 39 illustrates use of the HyperLogLog method by the QAAS system. As shown in a first column 3902, the set of session messages within the partition processed by a particular worker system can be thought of as a set of blocks of data, each block including a visitor_ID field. For the purpose of an aggregation query on the visitor_ID field, the processed data can be viewed as a set of visitor_ID values 3904. This is a multiset, which means that, unlike a mathematical set, the set may contain multiple elements that each have the same visitor_ID value.

Each visitor_ID value is hashed using a cryptographic hash 3906 that produces hash values uniformly distributed across the hash-value space. In the example shown in FIG. 39, the hash values each have L bits. The hash value 3908 is partitioned, as indicated by vertical line 3910, into two portions x 3912 and w 3914. An index j is computed as the integer value of the x portion plus 1 3916. The index j is an index into a set of m registers 3918, referred to as a "hasmap," that are initialized to all have the value "0." A function p(w) 3920 returns the index of the left-most bit in the w portion of the binary hash value 3908 with the value "1." For a given hash value of a given visitor_ID value, the register indexed by the computed index j is set to the maximum of the current value in the register and the value returned by the function p(w) 3922. Once all the visitor_ID values in the multiset have been processed, an estimate E of the number of unique visitor_ID values in the multiset 3904 can be computed from the harmonic mean of the m register values 3924.

Figure 40:
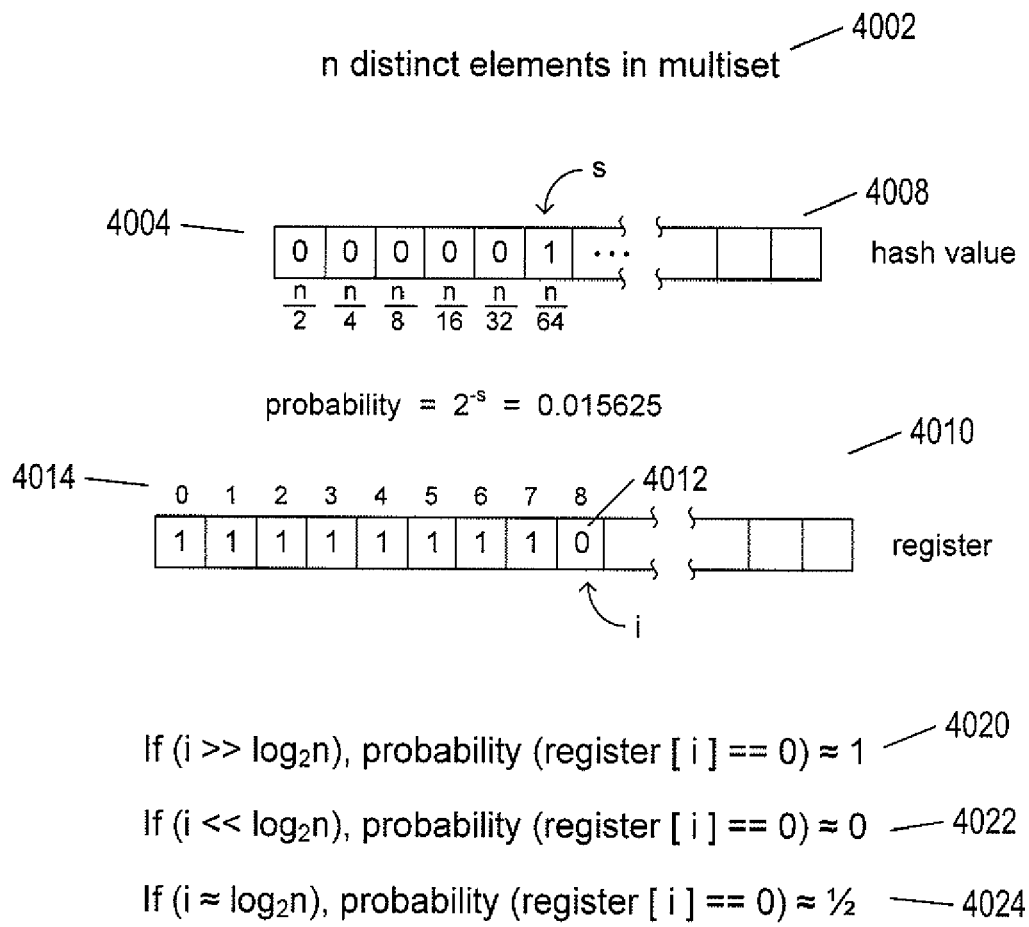
FIG. 40 illustrates the general principle behind the HyperLogLog method. Consider a multi-set with n distinct elements 4002.

FIG. 40 illustrates the general principle behind the HyperLogLog method. Consider a multi-set with n distinct elements 4002. Then, consider the hash values generated for the elements in the multiset. Note that, for any particular hash value, the cryptographic hash function generates the same hash value. The hash value 4004 is expressed as a binary value with least significant bit 4006 and most significant bit 4008. Because the cryptographic hash function uniformly distributes visitor_ID values over the range of values that can be expressed in a hash value with L bits, it can be expected that about half of the distinct hash values, n/2, will have a "0" bit in the least significant bit. However, given that the value of the least significant bit 4006 is "0," then only a quarter, n/4, of the n distinct hash values with have a "0" value in both the least significant bit 4006 and the next most significant bit 4009. The probability of the binary hash value having five leading "0" valued bits and a sixth "1" bit is thus equal to $2^{-6}$. More generally, the probability of a distinct hash value with a least significant "1" bit occurring at index s is $2^{-s}$.

Each of the m registers contains a value that indicates the index of the highest bit in the observed hash values that has the value "1" for at least one of the observed hash values. Thus, were a register to contain a value that, when added to the partition index, equals bit-index value "8," then none of the observed hash values had a bit value of "1" in the ninth bit. The register index value i can be thought of as the index of the first bit 4012 in the observed hash values that always had the value of "0" with the bits now indexed beginning with 0 4014. If i is much greater than $\log_2 n$, the probability that the ith bit of the observed hash values is always "0" is nearly 1 (4020). On the other hand, if i is much less than $\log_2 n$, the probability that the bit indexed by i is "0" in all the observed hash values is close to 0 (4022). If i is approximately equal to $\log_2(n)$, the probability that the bit indexed by i is always 0 in the observed hash values falls somewhere between 0.0 and 1.0 (4024). Thus, the register value i serves as an indication of the cardinality n of the unique values in the multiset. The computation (3924 in FIG. 39) of the estimated cardinality n of the unique values in the multiset, discussed above, computes a harmonic mean of the register values and includes a correction factor.

Figure 41:
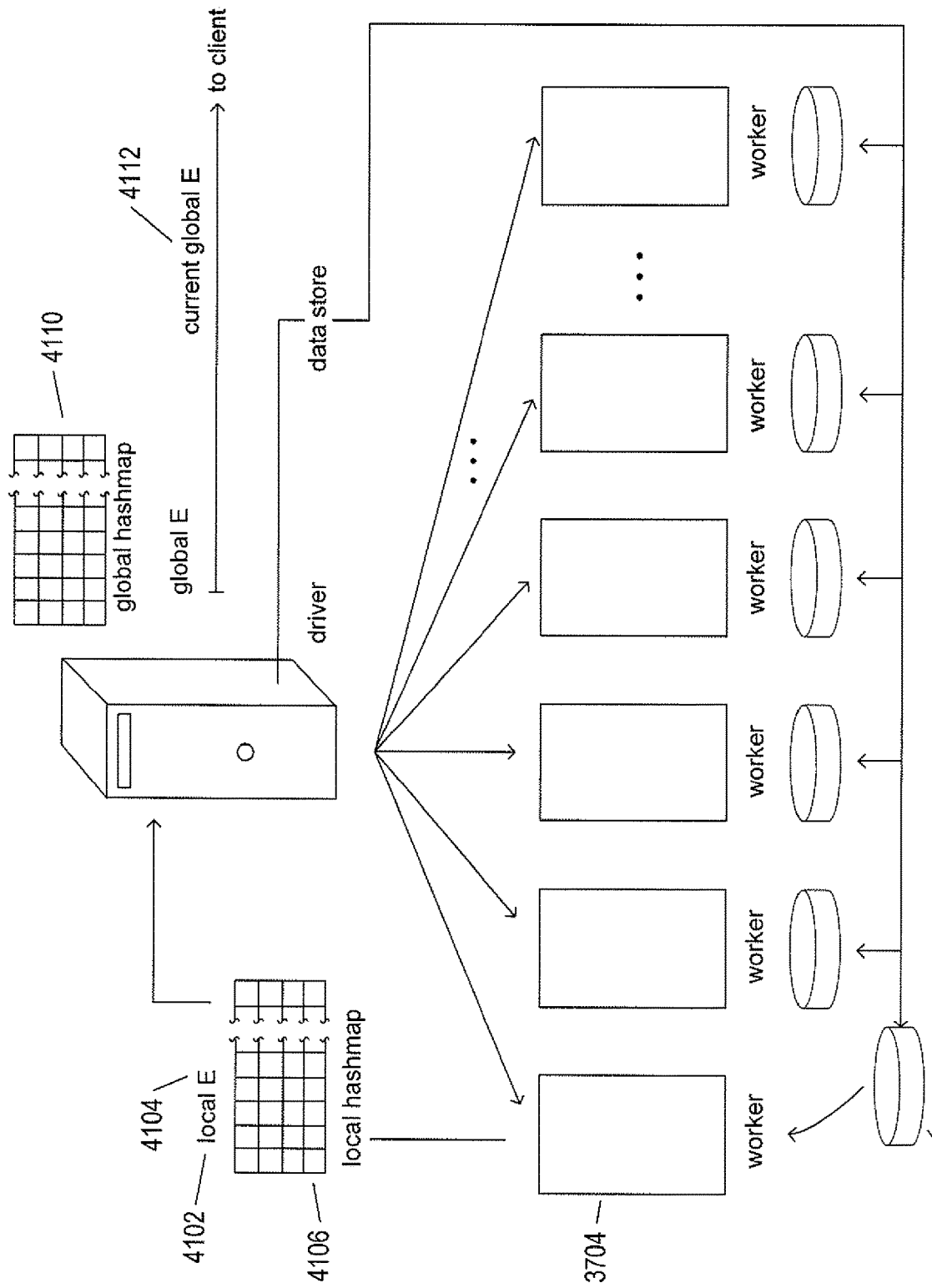
FIGS. 41-43 illustrate how the HyperLogLog method is employed in the currently described QAAS system to compute aggregation values.
Figure 42:
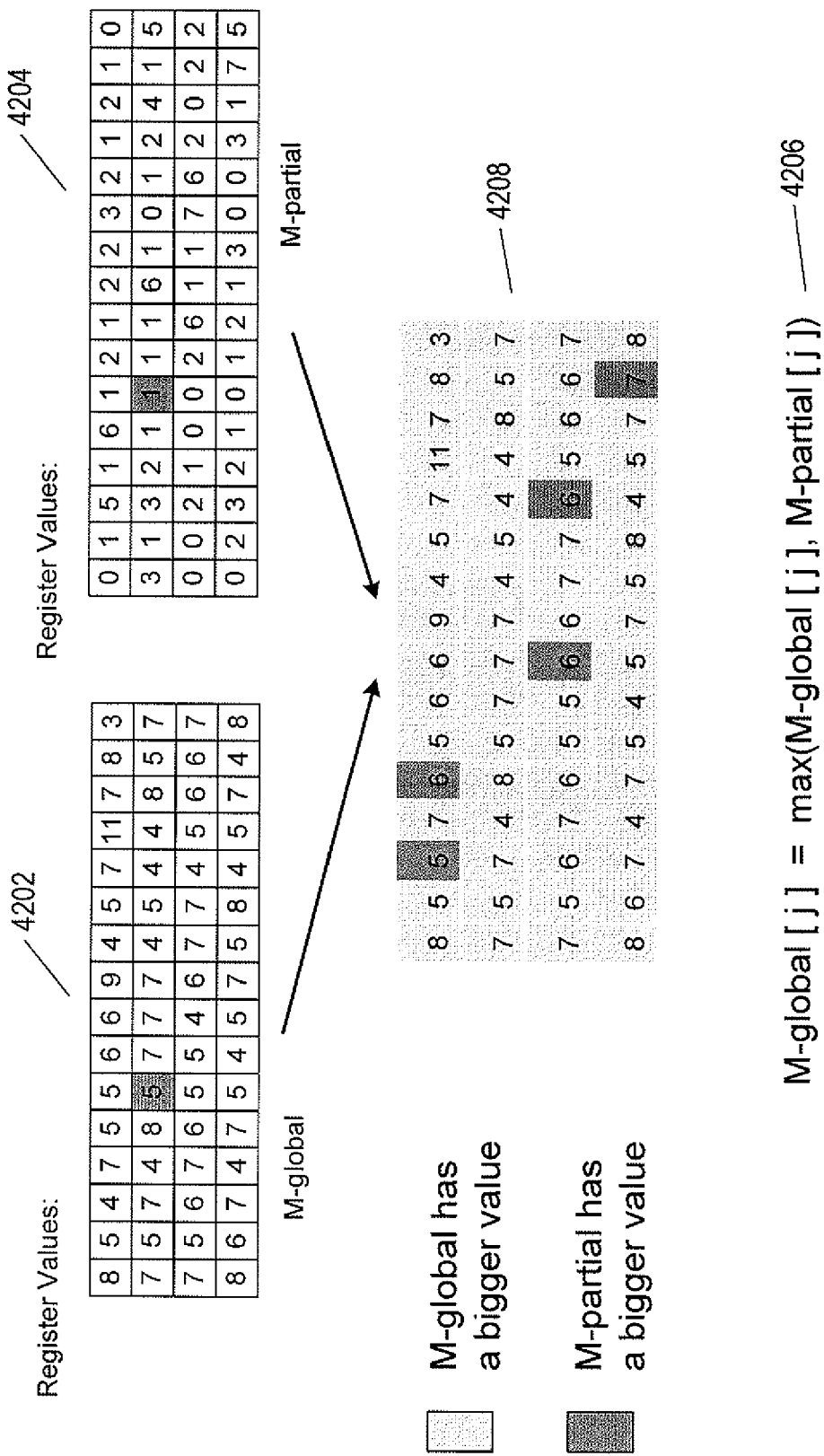
Figure 43:
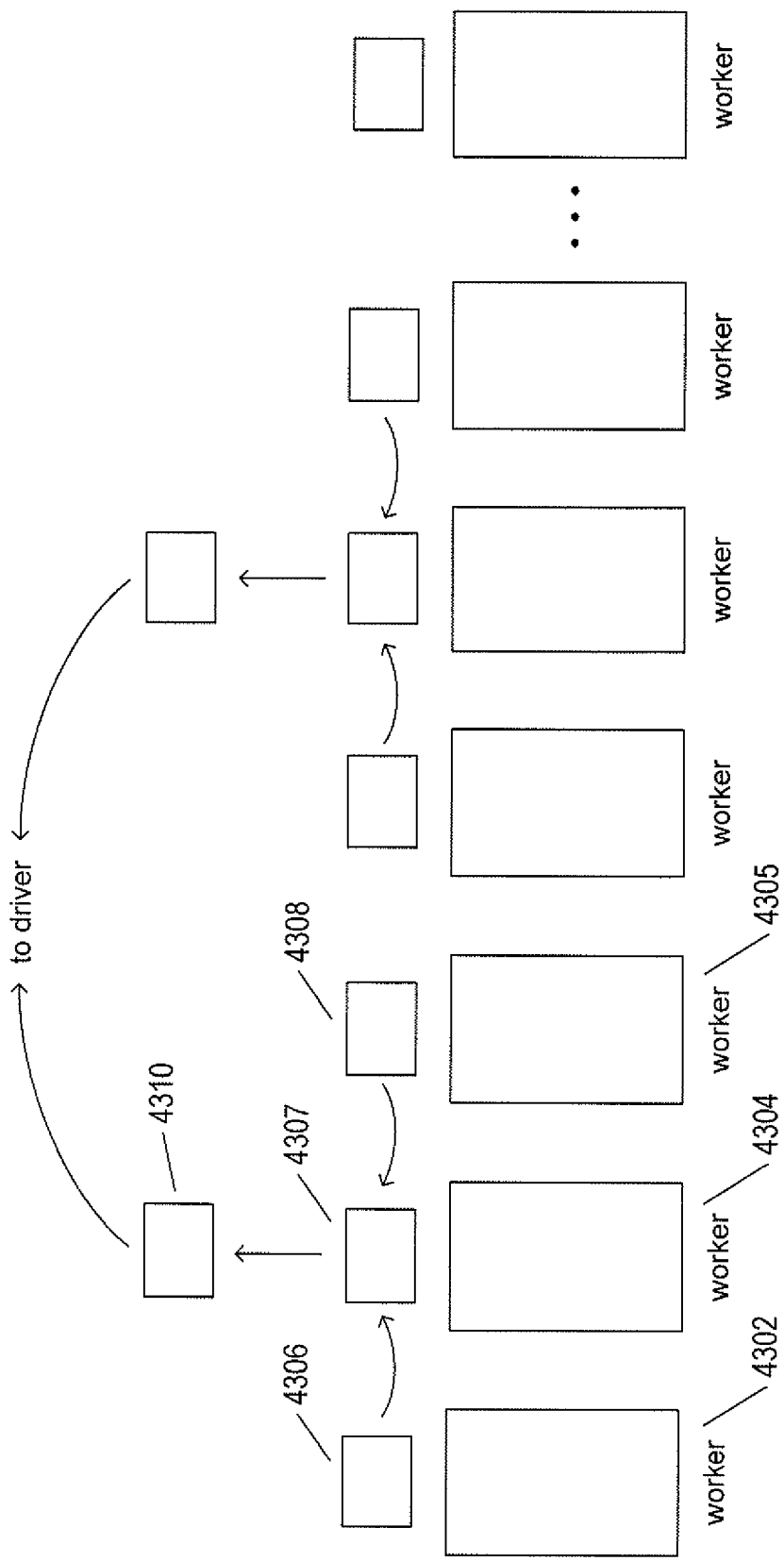

FIGS. 41-43 illustrate how the HyperLogLog method is employed in the currently described QAAS system to compute aggregation values. FIG. 41 uses the same illustration conventions as FIGS. 37A-D. FIG. 41 is an alternative figure for FIG. 37D, like FIG. 37D following FIG. 37C in the description of query-execution. FIG. 41 illustrates the case in which an aggregation query is being executed. When worker 3704 finishes processing of one partition, worker 3704 returns a partial result 4102 comprising the locally estimated unique visitor ID cardinality 4104 and the hash map, or register table, generated by the HyperLogLog method for the just completed partition 4106. As in FIG. 37D, the driver furnishes the worker 3704 with a next partition 4108 when the worker's queue is empty and when there are more partitions to process, in which case the worker reinitializes the hashmap to prepare for processing the next partition. The driver keeps a global hash map, or register set 4110, in order to accumulate global-hash map register values, based on returned local hash maps by worker systems. When the driver receives local hash map 4106, the driver merges the local hash map with the global hash map 4110 and can then compute a current global estimate of the cardinality of unique visitor_ID values for transmission to the client 4112.

FIG. 42 illustrates merging of a local hash map with a global hash map. In FIG. 42, hash map 4202 is the global hash map and hash map 4204 is a partial-result, local hash map transmitted by a worker system to the driver. In the merge operation, each register is set to the maximum value of the register in the global hash map and local hash map 4206 to create the merged hash map 4208. Thus, the HyperLogLog method can be partitioned over multiple workers, each processing a subset of the total data, and can be partitioned over the entire processing time. At any given point in time, the remote client can be furnished with the best current estimate of the cardinality of unique visitor_ID values or another aggregated data field that cannot be additively computed from partial results.

FIG. 43 shows a hierarchical hash map merging. In FIG. 43, groups of workers, such as workers 4302-4305, locally merge their hash maps 4306-4308 to produce an intermediate hash map 4310 that is sent to the driver, which merges the intermediate hash map with the global hash map. Different hierarchical organizations can be used for the local merges among an arbitrary number of worker systems. Local merges offset some of the computational burden of hash map merging from the driver.

Of course, although the use of the HyperLogLog method in the QAAS system is discussed with respect to the visitor ID values, unique instances of which cannot be efficiently counted in the parallel query processing approaches used by the QAAS system, the HyperLogLog method discussed above with reference to FIGS. 39-43 can be employed for any other data field, unique values of which are distributed across multiple partitions. The HyperLogLog method can be used in combination with other types of query processing, in order to handle more complex types of queries.

Figure 44A:
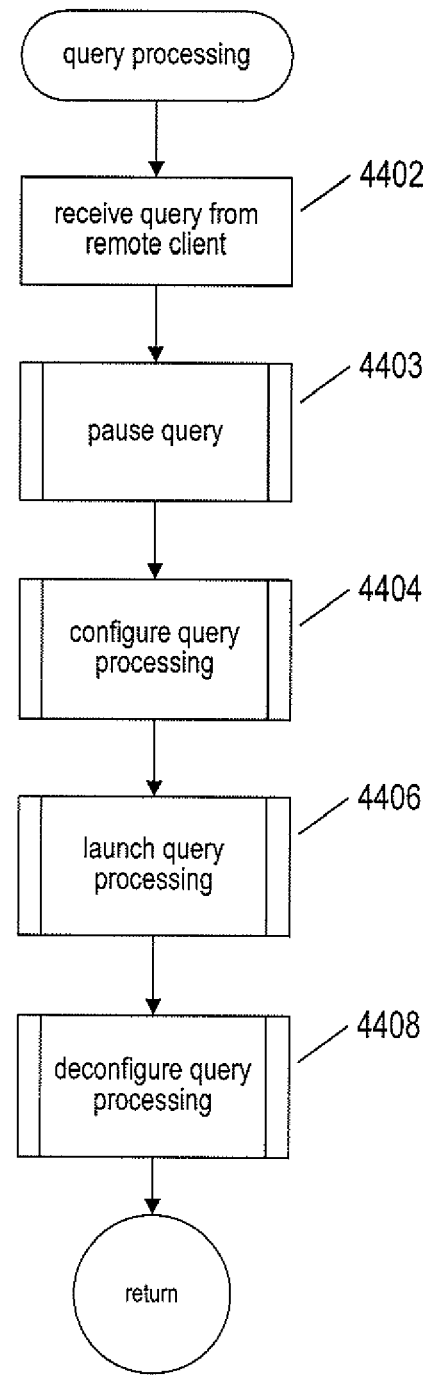
FIGS. 44A-E provide control-flow diagrams for the query processing carried out by the query-processing engine of the QAAS system

FIGS. 44A-E provide control-flow diagrams for the query processing carried out by the query-processing engine of the QAAS system. FIG. 44A provides a highest-level control-flow diagram. In a first step 4402, a query is received by the query-processing engine from a remote client. A driver is selected to manage the remaining steps of the process. In step 4403, the driver parses the query via a call to the routine "parse query." In step 4404, the driver configures a query-processing subsystem to execute the query via a call to the routine "configure query processing." In step 4406, the driver launches query processing via a call to the routine "launch query processing." In step 4408, once query processing has finished, the driver deconfigures the query processing subsystem via a call to the routine "deconfigure query processing."

Figure 44B:
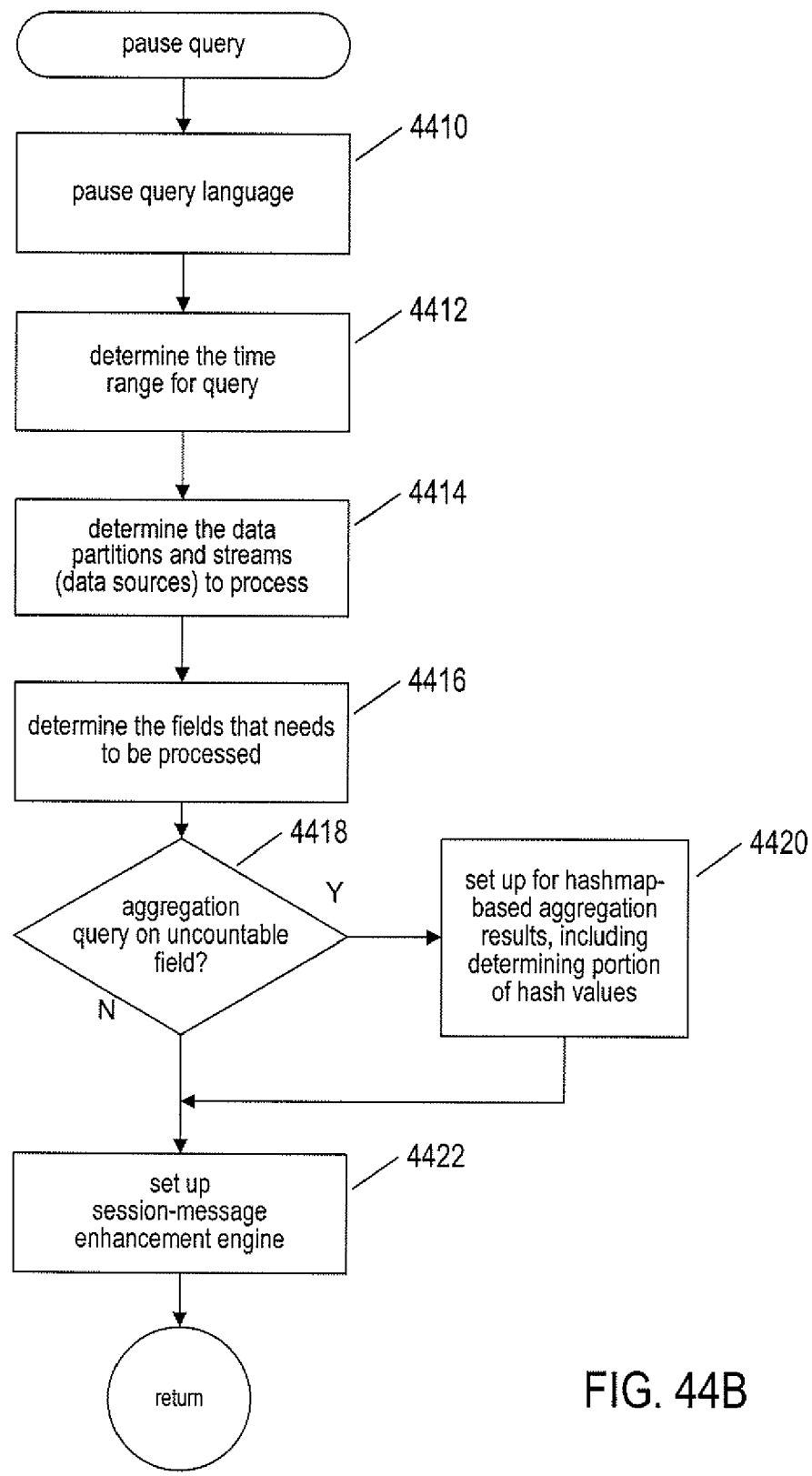

FIG. 44B provides a control-flow diagram for the routine "parse query," called in step 4403 of FIG. 44A. In step 4410, the routine "parse query" parses through the language of the query in order to generate an executable query plan. In step 4412, the routine "parse query" determines the time range for the query, or, in other words, the time range of the stored data that needs to be processed in order to execute the query. In step 4414, the routine "parse query" determines the data partitions and data streams, referred to collectively as "data sources," to process. In step 4416, the routine "parse query" determines the fields that needs to be processed in order to process the query, the fields corresponding to columns in stored data files within partitions. When the query involves aggregation on a field that cannot be counted by adding partial results, such as the visitor_ID field of the above described example, as determined in step 4418, then, in step

4420, the driver sets up data structures for hash map-based aggregation results, including the global hash map, or register set, as well as the bit index for partitioning hash values in x and w sections. Finally, in step 4422, the routine "parse query" configures the session-message-enhancement engine to provide join-like processing of query results prior to forwarding the enhanced query results to the distributor.

Figure 44C:
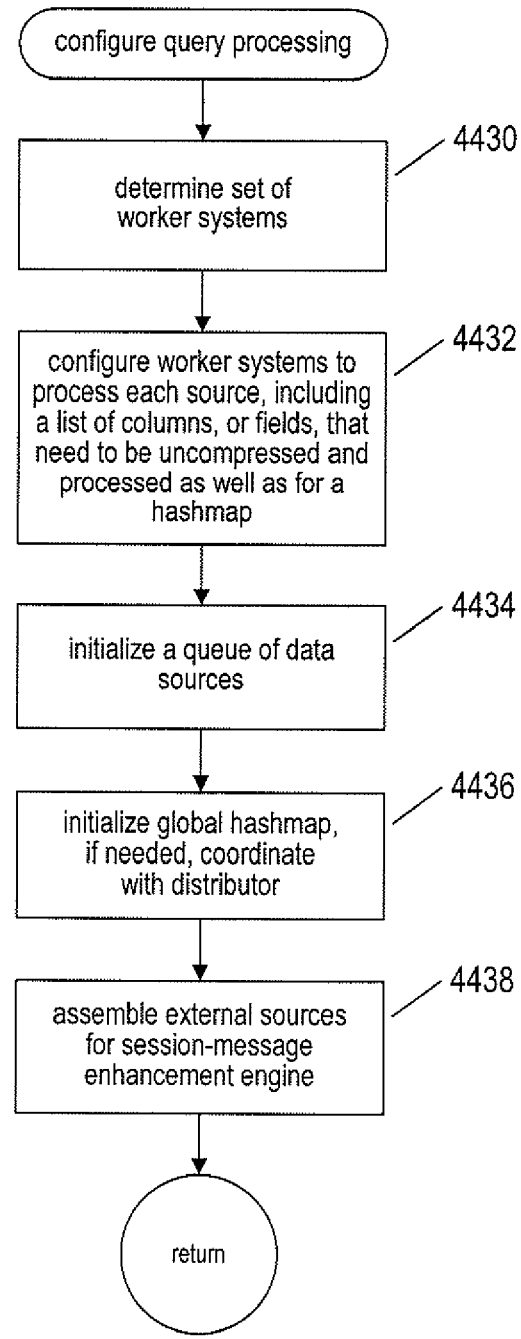

FIG. 44C provides a control-flow diagram for the routine "configure query processing," called in step 4404 of FIG. 44A. In step 4430, the routine "configure query processing" determines an optimal or near-optimal set of worker systems for processing the query. This determination may involve estimating the overall computational bandwidth needed for query processing and balancing the estimated computational overhead with the available worker-system resources within the QAAS system. Other factors may involve the data-stream bandwidth desired by the client, the bandwidth of the communications systems between the QAAS system and the remote client, and the number of partitions and data sources that need to be processed. In step 4432, the "configure query processing" routine configures the worker systems to process each source, providing the worker systems with a list of columns or fields that need to be uncompressed and processed, as well providing the worker systems with an indication of whether or not a local hash map needs to be maintained. In step 4434, the routine "configure query processing" initializes a global queue of data sources and, in certain implementations, may initialize local queues of data sources associated with each of the worker systems. Of course, the global and local queues do not contain the partitions themselves, but instead contain indications of how the partitions can be accessed by the worker systems. In step 4436, the routine "configure query processing" initializes a global hash map, if needed, and coordinates with the distributor for query-result transmission to the remote client. Finally, in step 4438, the routine "configure query processing" assembles the external data sources needed by the session-message-management engine. These data sources may be locally stored within the QAAS system or may be accessed, during query processing, by the session-message-enhancement engine.

Figure 44D:
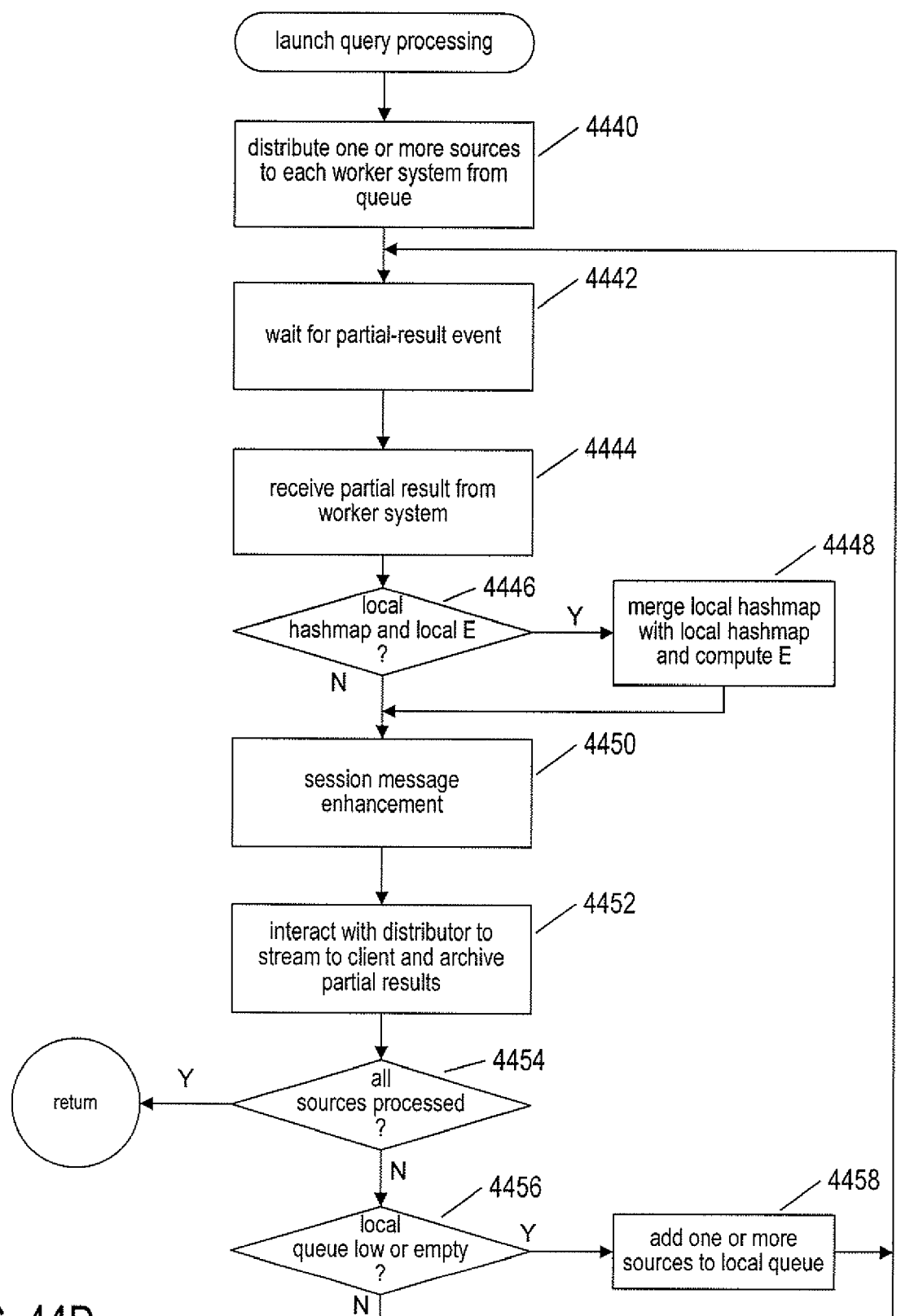

FIG. 44D provides a control-flow diagram for the routine "launch query processing," called in step 4406 or FIG. 44A. In step 4440, the routine "launch query processing" initiates local query processing on worker systems and distributes one or more sources to each worker system from the global queue. In step 4442, the routine "launch query processing" waits for a next partial-result event to occur. Partial-result events occur when, as discussed with reference to FIGS. 37D and 41, a worker system completes processing of a data source. In step 4444, the routine "launch query processing" receives a partial result from a worker system. When the partial result includes a local hash map and a local estimated unique-valued cardinality, as determined in step 4446, the routine "launch query processing," in step 4448, merges the local hash map with the global hash map and computes a current estimate of the cardinality of unique data values for an aggregation data field. In step 4450, the partial results are forwarded to the session-management engine for any join-like post processing. In step 4452, the routine "launch query processing" interacts with the distributor to stream current partial results to the client as well as to the local archiving mechanisms. When all data sources have been processed, as determined in step 4454, the routine "launch query processing" returns. Otherwise, when the local queue of the worker system that generated the partial result event is low or empty, as determined in step 4456, the driver adds one or more additional sources to the local queue of the worker system in step 4458. Control then returns to step 4442, where the routine "launch query processing" waits for a next partial-result event.

Figure 44E:
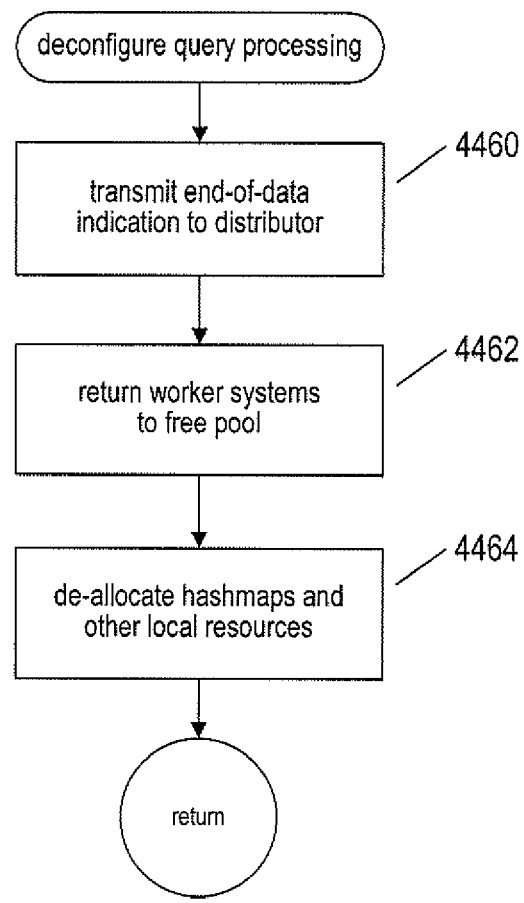

FIG. 44E provides a control-flow diagram for the routine "deconfigure query processing," called in step 4408 of FIG. 44A. In step 4460, the routine "deconfigure query processing" transmits an end-of-data indication to the distributor. In step 4462, the routine "deconfigure query processing" deconfigures the worker systems within the query-processing subsystem initiated for processing the current query, and returns the worker systems to a free-flow worker system, for processing other queries. In step 4464, the routine "deconfigure query processing" deallocates global hash maps and other resources local to the driver, preparing the driver for receiving and executing a next query.

Although the present invention has been described in terms of particular embodiments, it is not intended that the invention be limited to these embodiments. Modifications within the spirit of the invention will be apparent to those skilled in the art. For example, real-time processed-data-message streaming systems and QAAS systems may be implemented in various different ways by varying any of many different design and implementation parameters, including the types and organizations of component systems and subsystems, the type of hardware, operating systems, and other components, programming language, modular organization of code, data structures, control structures, and a wealth of additional design and implementation parameters. The QAAS system may produce hundreds of processed-data streams from enormous volumes of incoming data and execute large numbers of queries against the processes-data streams and persisted processed-data stream on behalf of a very large numbers of client.

It is appreciated that the previous description of the embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A query-as-a-service system comprising:
 a distributed data-streaming service that comprises a one or more computer systems, wherein the one or more computer systems include:
 one or more processors; and
 one or more memories that include one or more instructions that when executed by the one or more processors, cause the one or more processors to perform operations including:
 receiving a first query from a first remote client computer, the first query including:
 an identification of a first stream type from a plurality of stream types;
 first client-specific filters, comprising one or more structured-query-language ("SQL") queries; and
 a first public encryption key;
 receiving a second query from a second remote client computer, the second query including:
 an identification of a second stream type from the plurality of stream types;

second client-specific filters, comprising one or more SQL queries; and a second public encryption key;

receiving, from each of a plurality of internet-of-things (IOT) devices, one or more communications through one or more networks, each communication of the one or more communications including unstructured data associated with a function the IOT device;

aggregating the one or more communications, comprising publishing the one or more communications to a topic, wherein the topic is a category used to partition the one or more communications;

processing the aggregated communications to generate a set of processed data for use in generating one or more data streams, comprising appending, to the aggregated communications, additional data specified by the first remote client computer and the second remote client computer, wherein the additional data is obtained by modifying instrumentation code stored by one or more IoT devices of the plurality of IoT devices, wherein modifying the instrumentation code causes the one or more IoT devices to collect one or more particular data values that are not included in the unstructured data;

generating a first IOT data stream and a second IOT data stream using the set of processed data, wherein the first IOT data stream includes the first stream type and the second IOT data stream includes the second stream type;

packaging the first IOT data stream and the second IOT data stream into a plurality of communications messages for transmission by a distributor component;

filtering, based on the first client-specific filters received with the first query and the second client-specific filters received with the second query, one or more first filtered communications messages and one or more second filtered communications messages from the plurality of communications messages, wherein the filtering is based on the one or more SQL queries of the first client-specific filters and the one or more SQL queries of the second client-specific filters;

performing a first encryption, using the first public encryption key received with the first query, of the first filtered communications messages and a second encryption, using the second public encryption key received with the second query, of the second filtered communications messages;

re-encrypting, using a secure communications tunnel, the first and second encrypted filtered communications messages to generate first and second doubly encrypted communications messages;

transmitting, in response to the first query, the first doubly encrypted communications messages to the first remote client computer; and transmitting, in response to the second query, the second doubly encrypted communications messages to the second remote client computer.

2. The system of claim 1, wherein the operations further include:

deleting the first IOT data stream, the first filtered communications messages, the first encrypted filtered communications messages, and the first doubly encrypted communications messages, so that the one or more communications received from the plurality of IOT devices through one or more networks is stored longer than the first IOT data stream, the first filtered communications messages, the first encrypted filtered communications messages, and the first doubly encrypted communications messages.

3. The query-as-a-service system of claim 1, wherein the IoT devices include one or more of:

network-connected processor-controlled computers;
network-connected processor-controlled devices;
network-connected processor-controlled appliances; and
network-connected devices controlled by logic circuitry.

4. The query-as-a-service system of claim 1, wherein:

each of the one or more communications comprises event messages that include data values associated with one or more data fields;

the event messages are enriched, by the distributed data-streaming service, to include additional data values corresponding to additional fields; and the enriched event messages are assembled into session messages by the distributed data-streaming service, each session message including data values corresponding to one or more event messages that are each associated with a particular session identifier.

5. The query-as-a-service system of claim 4, wherein each IoT data stream is partitioned based on time into one or more time partitions, with the data streamed during a particular time partition of the one or more time partitions being stored in a mass-storage device that is associated with the particular time partition.

6. The query-as-a-service system of claim 5, wherein the data stored in a mass-storage device is stored as separated compressed columns, each column containing the data values for a particular data field of a particular session message of the session messages, wherein the query-as-a-service system does not create and maintain indexes for the data stored in compressed columns.

7. The system of claim 1, wherein the operations further include:

modifying the first query, by the first remote client computer, wherein the modification includes one or more changes to the first client-specific filters; and filtering, based on the modified first client-specific filters, one or more third filtered communications messages from the plurality of communications messages.

8. A computer-program product tangibly embodied in a non-transitory machine-readable storage medium of a computing device, including instructions configured to cause one or more data processors to perform operations including:

receiving a first query from a first remote client computer, the first query including:

an identification of a first stream type from a plurality of stream types;

first client-specific filters, comprising one or more structured-query-language ("SQL") queries; and a first public encryption key;

receiving a second query from a second remote client computer, the second query including:

an identification of a second stream type from the plurality of stream types;

second client-specific filters, comprising one or more SQL queries; and a second public encryption key;

receiving, from each of a plurality of internet-of-things (IOT) devices, one or more communications through one or more networks, each communication of the one or more communications including unstructured data associated with a function the IOT device;

aggregating the one or more communications, comprising publishing the one or more communications to a topic, wherein the topic is a category used to partition the one or more communications;

processing the aggregated communications to generate a set of processed data for use in generating one or more data streams, comprising appending, to the aggregated communications, additional data specified by the first remote client computer and the second remote client computer, wherein the additional data is obtained by modifying instrumentation code stored by one or more IoT devices of the plurality of IoT devices, wherein modifying the instrumentation code causes the one or more IoT devices to collect one or more particular data values that are not included in the unstructured data;

generating a first IOT data stream and a second IOT data stream using the set of processed data, wherein the first IOT data stream includes the first stream type and the second IOT data stream includes the second stream type;

packaging the first IOT data stream and the second IOT data stream into a plurality of communications messages for transmission by a distributor component;

filtering, based on the first client-specific filters received with the first query and the second client-specific filters received with the second query, one or more first filtered communications messages and one or more second filtered communications messages from the plurality of communications messages, wherein the filtering is based on the one or more SQL queries of the first client-specific filters and the one or more SQL queries of the second client-specific filters;

performing a first encryption, using the first public encryption key received with the first query, of the first filtered communications messages and a second encryption, using the second public encryption key received with the second query, of the second filtered communications messages;

re-encrypting, using a secure communications tunnel, the first and second encrypted filtered communications messages to generate first and second doubly encrypted communications messages;

transmitting, in response to the first query, the first doubly encrypted communications messages to the first remote client computer; and transmitting, in response to the second query, the second doubly encrypted communications messages to the second remote client computer.

9. The computer-program product of claim 8, wherein the operations further include:
deleting the first IOT data stream, the first filtered communications messages, the first encrypted filtered communications messages, and the first doubly encrypted communications messages, so that the one or more communications received from the plurality of IOT devices through one or more networks is stored longer than the first IOT data stream, the first filtered communications messages, the first encrypted filtered communications messages, and the first doubly encrypted communications messages.

10. The computer-program product of claim 8, wherein the IoT devices include one or more of:
network-connected processor-controlled computers;
network-connected processor-controlled devices;
network-connected processor-controlled appliances; and
network-connected devices controlled by logic circuitry.

11. The computer-program product of claim 8, wherein:
each of the one or more communications comprises event messages that include data values associated with one or more data fields;
the event messages are enriched to include additional data values corresponding to additional fields; and
the enriched event messages are assembled into session messages, each session message including data values corresponding to one or more event messages that are each associated with a particular session identifier.

12. The computer-program product of claim 11, wherein each IoT data stream is partitioned based on time into one or more time partitions, with the data streamed during a particular time partition of the one or more time partitions being stored in a mass-storage device that is associated with the particular time partition.

13. The computer-program product of claim 12, wherein the data stored in a mass-storage device is stored as separated compressed columns, each column containing the data values for a particular data field of a particular session message of the session messages.

14. The computer-program product of claim 8, wherein the operations further include:
modifying the first query, by the first remote client computer, wherein the modification includes one or more changes to the SQL queries of the first client-specific filters; and
filtering, based on the modified SQL queries of the first client-specific filters, one or more third filtered communications messages from the plurality of communications messages.

15. A computer-implemented method, comprising:
receiving a first query from a first remote client computer, the first query including:
an identification of a first stream type from a plurality of stream types;
first client-specific filters, comprising one or more structured-query-language ("SQL") queries; and
a first public encryption key;
receiving a second query from a second remote client computer, the second query including:
an identification of a second stream type from the plurality of stream types;
second client-specific filters, comprising one or more SQL queries; and
a second public encryption key;
receiving, from each of a plurality of internet-of-things (IOT) devices, one or more communications through one or more networks, each communication of the one or more communications including unstructured data associated with a function the IOT device;
aggregating the one or more communications, comprising publishing the one or more communications to a topic, wherein the topic is a category used to partition the one or more communications;
processing the aggregated communications to generate a set of processed data for use in generating one or more data streams, comprising appending, to the aggregated communications, additional data specified by the first remote client computer and the second remote client computer, wherein the additional data is obtained by modifying instrumentation code stored by one or more IoT devices of the plurality of IoT devices, wherein modifying the instrumentation code causes the one or more IoT devices to collect one or more particular data values that are not included in the unstructured data;
generating a first IOT data stream and a second IOT data stream using the set of processed data, wherein the first IOT data stream includes the first stream type and the second IOT data stream includes the second stream type;

packaging the first IOT data stream and the second IOT data stream into a plurality of communications messages for transmission by a distributor component;

filtering, based on the first client-specific filters received with the first query and the second client-specific filters received with the second query, one or more first filtered communications messages and one or more second filtered communications messages from the plurality of communications messages, wherein the filtering is based on the one or more SQL queries of the first client-specific filters and the one or more SQL queries of the second client-specific filters;

performing a first encryption, using the first public encryption key received with the first query, of the first filtered communications messages and a second encryption, using the second public encryption key received with the second query, of the second filtered communications messages;

re-encrypting, using a secure communications tunnel, the first and second encrypted filtered communications messages to generate first and second doubly encrypted communications messages;

transmitting, in response to the first query, the first doubly encrypted communications messages to the first remote client computer; and transmitting, in response to the second query, the second doubly encrypted communications messages to the second remote client computer.

16. The method of claim 15, further comprising:

deleting the first IOT data stream, the first filtered communications messages, the first encrypted filtered communications messages, and the first doubly encrypted communications messages, so that the one or more communications received from the plurality of IOT devices through one or more networks is stored longer than the first IOT data stream, the first filtered communications messages, the first encrypted filtered communications messages, and the first doubly encrypted communications messages.

17. The method of claim 15, wherein:

each of the one or more communications comprises event messages that include data values associated with one or more data fields;

the event messages are enriched to include additional data values corresponding to additional fields; and the enriched event messages are assembled into session messages, each session message including data values corresponding to one or more event messages that are each associated with a particular session identifier.

18. The method of claim 17, wherein the IoT data stream is partitioned based on time into one or more time partitions, with the data streamed during a particular time partition of the one or more time partitions being stored in a mass-storage device that is associated with the particular time partition.

19. The method of claim 18, wherein the data stored in a mass-storage device is stored as separated compressed columns, each column containing the data values for a particular data field of a particular session message of the session messages.

20. The method of claim 15, further comprising:

modifying the first query and the second query, by a third remote client computer, wherein the modification includes one or more changes to the first and second client-specific filters; and filtering, based on the modified first and second client-specific filters, one or more third filtered communications messages from the plurality of communications messages.

* * * * *

UNITED STATES PATENT AND TRADEMARK OFFICE
CERTIFICATE OF CORRECTION

| | |
|---|---|
| PATENT NO. | : 11,775,492 B2 |
| APPLICATION NO. | : 17/401222 |
| DATED | : October 3, 2023 |
| INVENTOR(S) | : Crossley et al. |

It is certified that error appears in the above-identified patent and that said Letters Patent is hereby corrected as shown below:

On the Title Page

Column 1, item [73], Line 2, delete "Redwood Shores (CA)" and insert -- Redwood Shores, CA (US) --, therefor.

On page 2, Column 2, item [56], Line 3, delete "Corrputing" and insert -- Computing --, therefor.

On page 2, Column 2, item [56], Line 5, delete "Streem:" and insert -- Stream: --, therefor.

On page 2, Column 2, item [56], Line 5, delete "Corrputer," and insert -- Computer, --, therefor.

On page 2, Column 2, item [56], Line 10, delete "177388832," and insert -- 17738883.2, --, therefor.

On page 2, Column 2, item [56], Line 12, delete "177388832," and insert -- 17738883.2, --, therefor.

In the Drawings

On sheet 8 of 62, in FIG. 5, under Reference Numeral 510, Line 2, delete "even/session" and insert -- event/session --, therefor.

On sheet 25 of 62, in FIG. 14, under Reference Numeral 1410, Line 1, delete "coulcie" and insert -- cookie --, therefor.

On sheet 25 of 62, in FIG. 14, under Reference Numeral 1420, Line 3, delete "transfering" and insert -- transferring --, therefor.

On sheet 28 of 62, in FIG. 17, under Reference Numeral 1710, Line 2, delete "sgement" and insert -- segment --, therefor.

Signed and Sealed this
Twenty-fifth Day of June, 2024

Katherine Kelly Vidal
*Director of the United States Patent and Trademark Office*

CERTIFICATE OF CORRECTION (continued)
U.S. Pat. No. 11,775,492 B2

On sheet 39 of 62, in FIG. 28, under Reference Numeral 2816, Line 2, delete "dencryption" and insert -- decryption --, therefor.

On sheet 40 of 62, in FIG. 29, under Reference Numeral 2916, Line 3, delete "nw" and insert -- "nw --, therefor.

On sheet 41 of 62, in FIG. 30, under Reference Numeral 3030, Line 1, delete "deque" and insert -- dequeue --, therefor.

On sheet 42 of 62, in FIG. 31, Line 18, delete "deque" and insert -- dequeue --, therefor.

In the Specification

In Column 4, Line 4, delete "system" and insert -- system. --, therefor.

In Column 12, Line 25, delete "8D1-D3" and insert -- 8D-1-8D-3 --, therefor.

In Column 28, Line 43, delete "8D1-D3." and insert -- 8D-1-8D-3. --, therefor.

In Column 32, Line 61, delete ""hasmap,"" and insert -- "hashmap," --, therefor.